US008180872B1

(12) United States Patent
Marinelli et al.

(10) Patent No.: US 8,180,872 B1
(45) Date of Patent: May 15, 2012

(54) COMMON DATA MODEL FOR HETEROGENEOUS SAN COMPONENTS

(75) Inventors: Robert J. Marinelli, Palo Alto, CA (US); Leonid M. Yaroslavsky, Redwood City, CA (US); Sung-Wook Ryu, Mountain View, CA (US); Paul A. Scammell, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2997 days.

(21) Appl. No.: 10/180,803

(22) Filed: Jun. 26, 2002

Related U.S. Application Data

(60) Provisional application No. 60/302,343, filed on Jun. 29, 2001, provisional application No. 60/385,492, filed on Jun. 4, 2002.

(51) Int. Cl.
*G06F 15/173* (2006.01)
*G06F 7/00* (2006.01)
(52) U.S. Cl. ........................................ 709/223; 707/603
(58) Field of Classification Search .................. 709/223; 707/100, 603
See application file for complete search history.

(56) References Cited

U.S. PATENT DOCUMENTS

| | | | | |
|---|---|---|---|---|
| 6,070,244 A * | 5/2000 | Orchier et al. | ................... | 726/1 |
| 6,085,200 A | 7/2000 | Hill et al. | | |
| 6,204,782 B1 | 3/2001 | Gonzales | | |
| 6,253,240 B1 * | 6/2001 | Axberg et al. | ............... | 709/223 |
| 6,279,037 B1 * | 8/2001 | Tams et al. | ................... | 709/224 |
| 6,317,743 B1 * | 11/2001 | Heck | .............................. | 707/10 |
| 6,347,342 B1 | 2/2002 | Marcos et al. | | |
| 6,389,432 B1 | 5/2002 | Pothapragada et al. | | |
| 6,389,464 B1 * | 5/2002 | Krishnamurthy et al. | ..... | 709/220 |
| 6,400,730 B1 * | 6/2002 | Latif et al. | ................... | 370/466 |
| 6,407,680 B1 | 6/2002 | Lai et al. | | |
| 6,593,860 B2 | 7/2003 | Lai et al. | | |
| 6,601,187 B1 | 7/2003 | Sicola et al. | | |
| 6,636,239 B1 | 10/2003 | Arquie | | |
| 6,640,278 B1 * | 10/2003 | Nolan et al. | ..................... | 711/6 |
| 6,654,747 B1 | 11/2003 | Van Huben et al. | | |
| 6,671,776 B1 | 12/2003 | DeKoning | | |
| 6,697,924 B2 | 2/2004 | Swank | | |
| 6,714,952 B2 | 3/2004 | Dunham et al. | | |
| 6,738,821 B1 | 5/2004 | Wilson et al. | | |
| 6,745,210 B1 * | 6/2004 | Scanlan et al. | ................ | 707/204 |

(Continued)

OTHER PUBLICATIONS

"QLDIRECT QLogic Optimizing and Multipath Driver for Windows NT V4.0 and Windows 2000," (5 Pages), 2000.

(Continued)

*Primary Examiner* — Asghar Bilgrami
(74) *Attorney, Agent, or Firm* — Robert C. Kowert; Meyertons, Hood, Kivlin, Kowert & Goetzel, P.C.

(57) ABSTRACT

System and method for providing a common data model for SAN discovery and/or SAN monitoring information collected from heterogeneous SAN components. In one embodiment, a SAN management server may execute on a host computer and may translate data in one or more vendor-specific languages obtained from a heterogeneous vendor population into canonical data in a uniform language. In one embodiment, the SAN management server may execute a set of rules to convert heterogeneous SAN data obtained from heterogeneous interfaces into canonical data conforming to the common data model. In one embodiment, the canonical data may be stored in a persistent store, which may be queried for information that may be provided to the requestor in the canonical form of the common data model.

55 Claims, 23 Drawing Sheets

U.S. PATENT DOCUMENTS

| | | |
|---|---|---|
| 6,769,022 B1 | 7/2004 | DeKoning et al. |
| 6,807,181 B1 | 10/2004 | Weschler |
| 6,826,580 B2 | 11/2004 | Harris et al. |
| 6,839,750 B1 | 1/2005 | Bauer et al. |
| 6,854,035 B2 | 2/2005 | Dunham et al. |
| 6,944,654 B1 | 9/2005 | Murphy et al. |
| 6,947,939 B2 | 9/2005 | Fujibayashi et al. |
| 2001/0054093 A1 | 12/2001 | Iwatani |
| 2002/0059263 A1* | 5/2002 | Shima et al. ............ 707/100 |
| 2002/0059397 A1 | 5/2002 | Feola et al. |
| 2002/0095602 A1 | 7/2002 | Pherson et al. |
| 2002/0095644 A1* | 7/2002 | Weiss ........................ 716/3 |
| 2002/0099914 A1 | 7/2002 | Matsunami et al. |
| 2002/0161871 A1 | 10/2002 | Shanthaveeraiah et al. |
| 2002/0194407 A1 | 12/2002 | Kim |
| 2003/0084076 A1 | 5/2003 | Sekiguchi et al. |
| 2003/0085914 A1 | 5/2003 | Takaoka et al. |
| 2003/0105830 A1 | 6/2003 | Pham et al. |
| 2003/0130821 A1 | 7/2003 | Anslow et al. |
| 2003/0140128 A1 | 7/2003 | Cox et al. |
| 2003/0154267 A1 | 8/2003 | Comacho et al. |
| 2003/0154268 A1 | 8/2003 | Sato |
| 2003/0204701 A1 | 10/2003 | Mimatsu et al. |
| 2003/0208589 A1 | 11/2003 | Yamamoto |
| 2003/0220991 A1 | 11/2003 | Soejima et al. |
| 2003/0225896 A1 | 12/2003 | Jain et al. |
| 2003/0225993 A1 | 12/2003 | Yagisawa et al. |
| 2004/0024984 A1 | 2/2004 | Lanzatella et al. |
| 2004/0025166 A1 | 2/2004 | Adlung et al. |

OTHER PUBLICATIONS

"QLogic Software Suite Streamlines SAN Management," FCIA Member Company Press Release, Nov. 9, 1999, (3 Pages).

"The Architecture of Veritas SANPoint Control tm 2.0," Veritas Software Corporation, 2001, (42 Pages).

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

\* cited by examiner

COMMON DATA MODEL FOR HETEROGENEOUS SAN COMPONENTS

PRIORITY INFORMATION

This application claims benefit of priority to U.S. Provisional Application Ser. No. 60/302,343 titled "Storage Area Network Access Layer" filed on Jun. 29, 2001.

This application claims benefit of priority to U.S. Provisional Application Ser. No. 60/385,492 titled "Central Management for Heterogeneous Storage Area Networks" filed on Jun. 4, 2002.

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

SCSI disk arrays must be located no more than 25 meters from the host server;

The parallel SCSI bus is susceptible to data errors resulting from slight timing discrepancies or improper port termination; and SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

Many SAN management offerings in today's marketplace offer the ability to understand the physical connectivity of the SAN through the discovery of device interconnects. By providing a one-sided view of the SAN, these offerings display only a switches perspective of physical connections.

Many adopters of the SAN storage model face the problem that accompanies every new technology and design: a scarcity of professionals experienced with the technology. The job of SAN administrator is often filled by people with various skill sets and work backgrounds: mainframe operators, traditional network administrators, system administrators, and others in the IT industry. Some of the roles typically expected of a SAN administrator are securing the SAN and developing a data protection strategy, provisioning and administering SAN resources, testing new vendors' hardware and integrating the hardware into the SAN, troubleshooting SAN elements, and managing day-to-day performance and SAN resource availability. Where external SAN security is an issue, the SAN administrator may work in conjunction with network administrators and others in the IT department. Internal SAN security, however, is often solely the SAN administrator's responsibility.

Keeping track of devices and their connections in the SAN is a daunting task. Today, many administrators track and provision their SAN using spreadsheets and inventory reports that are typically immediately outdated.

SUMMARY OF THE INVENTION

Embodiments of a system and method for providing a common data model for SAN discovery data and/or SAN monitoring information from heterogeneous SAN devices are described. SAN devices may be from a plurality of vendors, and each vendor may provide a vendor-specific interface mechanism (e.g. an Application Programming Interface (API)) to its devices. Further, vendors may provide different interface mechanisms for different types of devices or even for different models or versions of devices. Each interface mechanism may provide its own specific "language" for communicating with devices of the corresponding type, model or version. Data provided by the interface mechanism may conform to a particular data model supported by the corresponding device. Differences in data models may include one or more of different schemas, different data formats, different data representations, different data structures, and different data organizations, among others.

In one embodiment, a SAN management server may include a data conversion mechanism that may translate discovered and/or collected data in one or more different languages (data models) obtained from a heterogeneous population of SAN devices into canonical data in a uniform language ("common data model"). In one embodiment, the common data model may use a markup language for data representation in canonical data. In one embodiment, the markup language may be eXtensible Markup Language (XML). In one embodiment, the common data model may be defined by a set of rules. The SAN management server may execute the set of rules to convert heterogeneous SAN data obtained from heterogeneous interfaces into canonical data conforming to the common data model. In one embodiment, the rules may be specified using a markup language (e.g. XML). In one embodiment, the rules may be accessed from one or more rules files (e.g. XML files). In one embodiment, the rules may be stored in and accessed by the SAN management server from a data store.

In one embodiment, the data conversion mechanism may be a module or component of the SAN management server that receives heterogeneous data from one or more of explorers and/or collectors in one or more data streams and converts the heterogeneous data into canonical data in accordance with the rules. In another embodiment, at least some conversion of data into the common data model may be performed by one or more of the SAN management server's explorers and/or collectors.

In one embodiment, canonical data may be provided to the SAN manager or one or more components of the SAN management server (e.g. an alarm service or policy service) for use in monitoring and/or managing the SAN. In one embodiment, canonical data may be stored in a persistent data store that may be accessed, for example, by the SAN management server and/or SAN manager, to retrieve portions of the canonical data for use in monitoring and managing the SAN.

In one embodiment, the data conversion mechanism may also convert data from the common data model into one or more vendor-specific data formats. This may be used, for example, to convert canonical data into data of a format supported by a particular device to send commands including the data to the device. As another example, the data conversion mechanism may be used to convert data from one specific format into canonical data, and then convert the canonical data into another specific format, and thus may perform as a translation mechanism between heterogeneous devices.

In one embodiment, the SAN may use Simple Network Management Protocol (SNMP) for monitoring and managing systems and devices in the SAN network. The data being monitored and managed by SNMP is defined by a MIB, the specification and formal description of a set of objects and variables that can be read and possibly written using the SNMP protocol. However, SAN device vendors may not follow a standard SNMP Management Information Base (MIB). In one embodiment, the SAN management server may discover information corresponding to SAN devices from the heterogeneous devices' SNMP MIBs. Further, one or more of the SAN management server's collectors may be based on variables defined in a SAN component's SNMP MIB. This discovered information and/or collected data may be converted to canonical data by the SAN management server. The canonical data may be provided to the SAN manager and/or one or more components of the SAN management server, and/or may be stored in a data store that may be accessed to retrieve the canonical data, for example, by the SAN management server and/or SAN manager, for use in monitoring and managing the SAN.

In one embodiment using rules, the SAN management system may support SAN components having heterogeneous interface mechanisms without requiring modification of SAN management system software. In one embodiment, the rules may be edited to include rules for mapping discovery and/or monitoring data from the interface mechanism of a new or modified SAN component to the common data model, and the modified rules may then be used for converting SAN discovery and/or SAN monitoring data, in formats supported by the interface mechanism of the SAN component, into canonical data conforming to the common data model.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
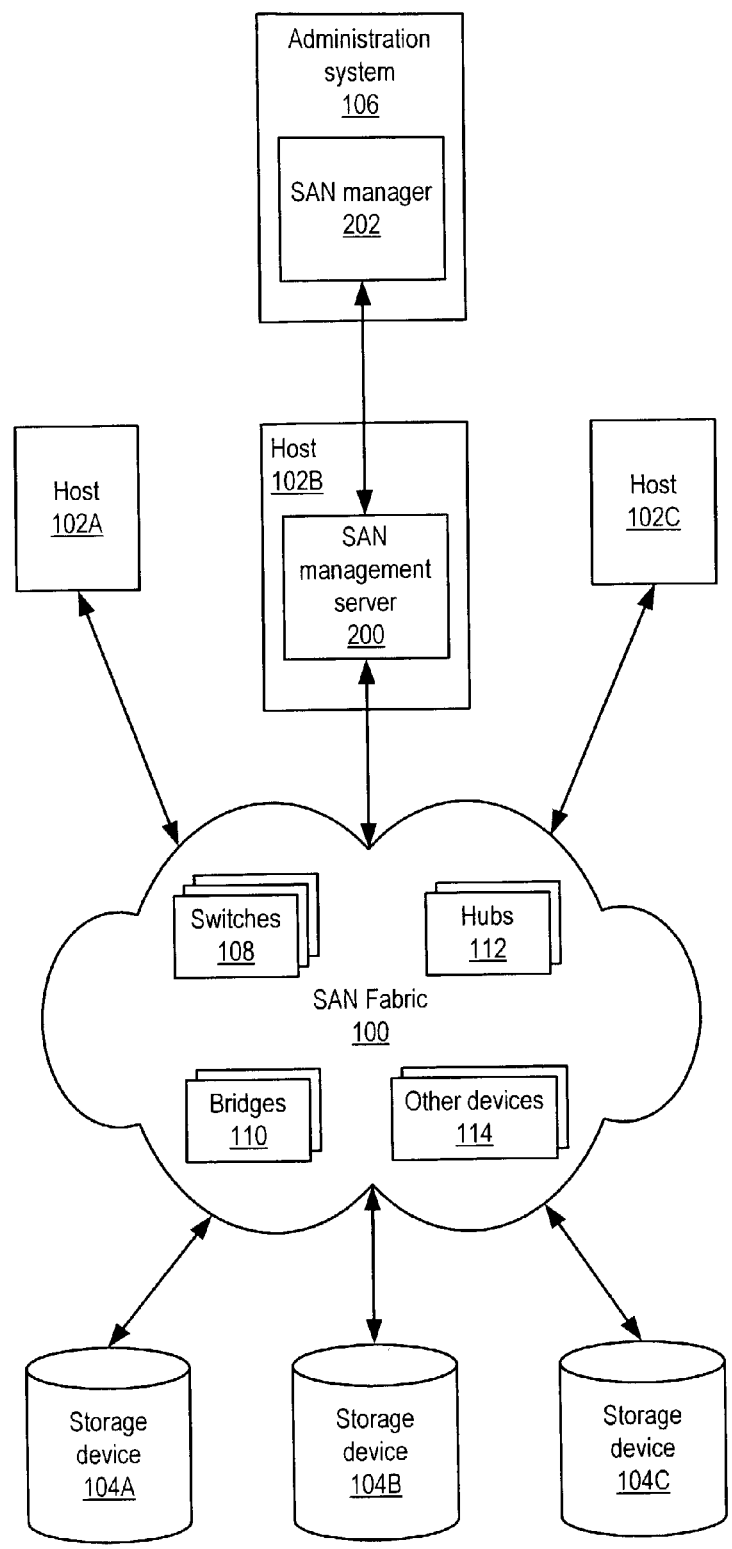
FIG. 1 shows an exemplary SAN implementing an embodiment of the SAN management system.

Embodiments of a centralized Storage Area Network (SAN) management system are described. FIG. 1 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. This dedicated network may employ Fibre Channel technology.

A SAN may be part of the overall network of computing resources for an enterprise or other entity. A SAN may include one or more hosts 102 (e.g. hosts 102A, 102B, and 102C), one or more storage devices 104 (e.g. hosts 102A, 102B, and 102C), and one or more SAN fabrics 100. A SAN may also include one or more administration systems 106. One or more end-user platforms (not shown) may access the SAN, for example via a LAN or WAN connection to one or more of the hosts 102.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Hosts 102 may run any of a variety of operating systems, including, but not limited to, Solaris 2.6, 7 or 8, Microsoft Windows NT® 4.0 (Server and Enterprise Server), and Microsoft Windows 2000® (Server, Advanced Server and Datacenter Editions). Each host 102 may be connected to the fabric 100 via one or more Host Bus Adapters (HBAs).

The hardware that connects hosts 102 (and other devices such as workstations) to storage devices 104 in a SAN may be referred to as a fabric 100. The SAN fabric 100 enables server-to-storage device connectivity through Fibre Channel switching technology. The SAN fabric 100 hardware may include one or more of switches 108 (also referred to as fabric switches), bridges 110, hubs 112, or other devices 114 such as routers, as well as the interconnecting cables (for Fibre Channel SANs, fibre optic cables).

Embodiments of the centralized SAN management system may provide administrators with a single management interface to the complex tasks involved in managing a growing, multi-vendor SAN. Embodiments of the SAN management system may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

The SAN management system may provide centralized management of SAN-connected devices with automatic discovery, visualization, access control, and policy-based monitoring, alerting and reporting. The SAN management system may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit, or alternatively may have more than one logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other. Examples are I/O buses and networks.

The SAN management system may provide customizable, intuitive views into a SAN based on host 102, device, fabric 100, or storage groups, as well as real-time alerts to diagnose and avoid outages. The SAN management system masks the administrative complexity of the SAN environment, and provides tools and utilities and a unified, central interface for performing SAN management tasks including one or more of, but not limited to, securing the SAN and developing a data protection strategy, provisioning and administering SAN resources, testing new vendors' hardware and integrating the hardware into the SAN, troubleshooting SAN elements, and managing day-to-day performance and SAN resource availability.

SAN management may occur at two levels—physical and logical—to maintain control, regardless of the underlying device environment. With the discovery of host attributes like OS platform, OS handles and IP address, the critical link associating logical devices to a host 102 and its applications may be made. The SAN management system may provide this data-centric management from host applications through interconnects to the storage resources, regardless of the underlying hardware and operating system(s).

Embodiments of the SAN management system may provide features for managing SAN environments, including one or more of, but not limited to: automatic SAN discovery, SAN visualization, inventory reporting; physical and/or logical mapping of storage resources to host applications; logical storage grouping and capacity reporting to aid in the effective allocation of storage; storage virtualization; centralized event management for facilitating SAN device performance and availability; user-customizable policy management; and real-time and/or historical performance data for Quality-of-Service (QoS) reporting.

Embodiments of the SAN management system may manage and control heterogeneous element Fibre Channel storage networks (e.g. SANs). Embodiments of the SAN management system may include a SAN management server 200 and one or more SAN managers 202. Some embodiments may include other components.

Embodiments of the SAN management system may provide a common data model for SAN discovery and/or SAN monitoring information collected from heterogeneous SAN components. In one embodiment, the SAN management server 200 may execute on a host computer and may translate data in one or more vendor-specific languages obtained from a heterogeneous vendor population into canonical data in a uniform language. In one embodiment, the SAN management server may execute a set of rules to convert heterogeneous SAN data obtained from heterogeneous interfaces into canonical data conforming to the common data model. In one embodiment, the canonical data may be stored in a persistent store, which may be queried for information, for example by the SAN management server 200 and/or SAN manager 202, and the information may be provided to the requestor in the canonical form of the common data model.

In one embodiment, the SAN management system may provide synthesis of perceived characteristics of the storage by the acquisition and correlation of different topological data from the heterogeneous network. For example, the verification of the existence of multiple paths for purposes of redundancy between a storage device and the consumer (e.g. host system) of the storage device may require correlation of data from the storage device, host system, and components of the network interconnection.

In one embodiment, the SAN management system may support transactional SAN management. A transaction may be defined as a sequence of commands to perform information exchange and other work that is treated as a unit for the purposes of satisfying a request and for ensuring data integrity. For a transaction to be completed and changes to be made permanent, a transaction has to be completed in its entirety.

The SAN management server 200 may discover SAN objects and their attributes, and may provide event management, policy management, and notification services. The SAN management server may explore the SAN to make SAN information available to client applications, including SAN manager 202. In one embodiment, communications between the SAN management server 200 and the client applications may include exchanging commands and responses encapsulated in documents. In one embodiment, the documents may be XML documents. Commands may include, for example, requests for SAN information sent to the SAN management server 200 by a client application. Responses may, for example, include requested SAN information sent to a client application by the SAN management server 200. For example, the SAN management server 200 may discover one or more SAN objects. The SAN manager 202 may send a command to the SAN management server 200 requesting information on one of the SAN objects. The SAN management server may send a response (e.g. one or more documents) to the SAN manager 202 including information corresponding to the SAN object. The SAN manager 202 may then display the information corresponding to the SAN object.

Embodiments of the SAN management server 200 may run in a variety of systems, including, but not limited to, Solaris 2.6, 7 or 8, Microsoft Windows NT 4.0 (Server and Enterprise Server), and Microsoft Windows 2000 (Server, Advanced Server and Datacenter Editions).

The SAN manager 202 is a client application provided with the SAN management system. The SAN manager 202 may provide a graphical user interface for displaying the information (e.g. XML data) compiled by and received from the SAN management server 200 in graphical and/or textual format, and may provide a user interface for the SAN administrator to access various features of the SAN management system such as tools and utilities described herein to perform functions of the SAN management system. SAN manager 202 may run on any of a variety of end-user platforms coupled to one or more of the hosts 102, for example via a LAN or WAN, or alternatively may run on one of the hosts 102, including the host 102 that includes the SAN management server 200.

One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, the SAN management system may automatically initiate an operating system rescan so that the new device is immediately available for use by the volume manager on the host. This may be performed without user intervention at the operating system level, saving time and ensuring that the resource can be used immediately.

Embodiments of the SAN management system may provide accurate discovery, visualization and inventory reporting in the SAN environment. Embodiments may reduce or eliminate the manual task of tracking of devices and their connections in the SAN by automatically discovering the physical and logical connections of the SAN, displaying the information in a graphical topology map and logging the data in a variety of inventory reports. Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Management protocols are a common example of in-band protocols. Out-of-band refers to transmission of management information for Fibre Channel components outside of the Fibre Channel network, for example over Ethernet. In one embodiment, a storage administrator may assign customized attributes to devices in the SAN for use in tracking information such as physical location, account code, installation date and asset tag number.

One embodiment of the SAN management system may enable the automatic discovery of SAN resources using one or more in-band and/or out-of-band protocols and industry standards (e.g. MS/CT, GS-3, SNMP, Fibre Alliance MIB, ANSI T11, vendor-specific extensions, etc.). This embodiment may reduce or eliminate the need for manual tracking of SAN components.

One embodiment of the SAN management system may provide a policy management service that may allow SAN environments to be customized to define what parameters are monitored and how they should be responded to through notification and action options such as e-mail, command line scripts, PERL scripts, and/or SNMP traps. One embodiment of the SAN management system may include a customizable policy service for intelligent threshold-based monitoring for SAN performance, status, availability and/or traffic. The SAN management system may provide policies for SAN objects to assist the user in maintaining SAN operations within user-defined parameters. The SAN management system may automatically monitor switch and storage resources, keep environment, error and traffic statistics, and provide automated capabilities. One embodiment may provide one or more policies based on the knowledge of various SAN hardware providers. Standard reports may also be provided, for example to support common storage service-level agreements.

One embodiment of the SAN management system may provide a real-time alert viewer that may monitor heterogeneous device status, and may provide proactive management capabilities in the SAN environment. By supplying policies on SAN devices, the SAN management system may monitor the status and performance of the device(s) and generate alerts when behavior falls outside acceptable user-defined boundaries. The SAN management system may enable intelligent monitoring through user-definable threshold levels that can take actions automatically as well as notify administrators of critical events in real time.

The SAN management system may provide a central management interface for various SAN management tasks. If vendor-specific management is desired (e.g. for firmware updates), the SAN management system may provide in-context launch support for element managers supplied by the device vendor. In one embodiment, to directly manage a device, the administrator may telnet to the device through the SAN manager user interface.

In one embodiment, the SAN manager 202 may provide a graphical user interface (GUI) through which the SAN management system facilitates management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

Embodiments of the SAN management system may provide both real-time and historical performance data for critical service-level parameters such as connectivity, available space and throughput. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment of the SAN management system may enable real-time performance charting of SAN devices. The SAN management system may monitor interconnect and storage devices in real time, and may be used to display information about the various SAN devices such as current load/status. The SAN management system may provide a troubleshooting platform for problem resolution.

Embodiments of the SAN management system may provide detailed capacity reports to aid in growth planning and gathers detailed information for use in chargeback reports. One embodiment may track LUN allocation to hosts as well as to storage groups, distilling real-time and historical reports that show where storage resources are being consumed.

In one embodiment, the SAN management system may run on all SAN-attached hosts 102. However, in some embodiments some hosts may not be able to run the SAN management system. For these hosts, the SAN management system may automatically discover and display these hosts with a limited view of the SAN from the hosts' view.

Figure 2:
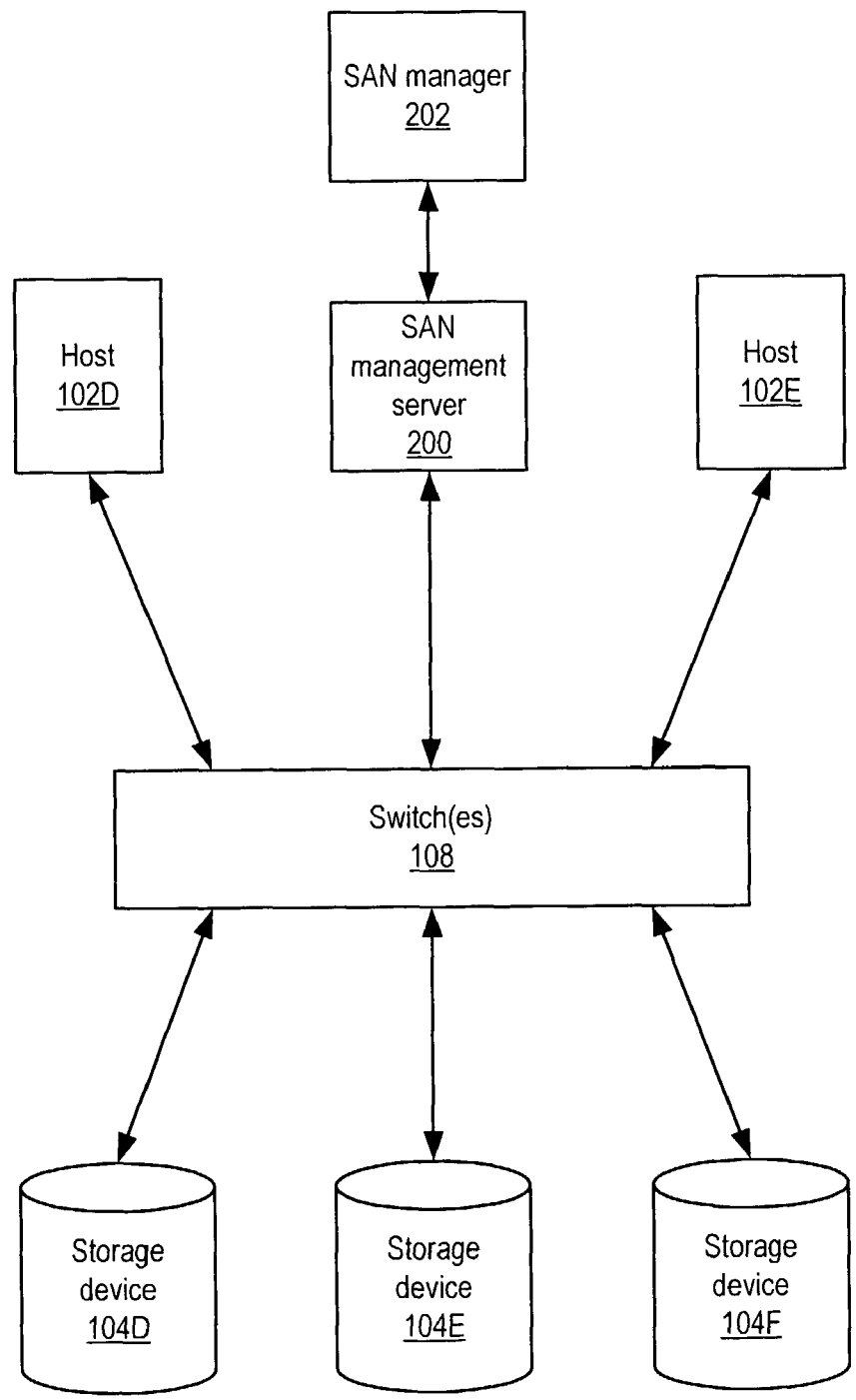
FIG. 2 illustrates an exemplary distributed SAN topology according to one embodiment.

FIG. 2 illustrates an exemplary distributed SAN topology according to one embodiment. In alternative embodiments, the topology may be centralized (channel attached) or network attached storage ("NAS"). The SAN topology as illustrated in FIG. 2 includes host systems 102D and 102E, storage devices 104D, 104E, and 104F, SAN management server 200, SAN manager 202 and one or more switches 108. In one embodiment, switches 108 may be fabric switches in a SAN fabric. Hosts 102 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). In one embodiment, different hosts 102 in the SAN may run different operating systems. While only two hosts 102 are shown in FIG. 2, the SAN management system may manage any number of hosts. Further, the SAN management system may manage any number of switches 108, storage devices 104 or other Fibre Channel devices.

In this example, hosts 102D and 102E, and SAN management server 200 are coupled independently to switches 108 via Fibre Channel connections. In turn, switches 108 are coupled to storage devices 104 via additional Fibre Channels. Fibre Channel may allow the hosts 102 to communicate with storage devices 104 via Fibre Channel SCSI protocols. Fibre Channel also supports single mode and multimode fiber connections, as well as coaxial cable and twisted pair.

Switches 108 may include one or more of type of switches capable of supporting SAN communication (e.g. switches from QLogic, INRANGE, McDATA, Brocade, etc.). Storage devices 104 may include Redundant Array of Independent Disks ("RAID array"), such as those manufactured by EMC and HITACHI Data Systems, tape libraries, such as HP SureStore E Mid-Range Tape Library 2/20, and/or any other storage device compatible with SANs.

In this exemplary embodiment, SAN management server 200 is coupled to SAN manager 202. In one embodiment, SAN manager 200 is a client of the SAN management server 200. In one embodiment, SAN management server 200 may be running on a host system 102 of the SAN. In one embodiment, SAN manager 202 may be running on a system serving as a SAN administration system that is not a host system of the SAN. Alternatively, SAN manager 202 may be running on a host system 102, which would serve as a SAN administration system in addition to serving as a host on the SAN. In one embodiment, the SAN manager 202 and the SAN management server 200 may be included on the same host system 102. In embodiments where the SAN manager 202 and the SAN management server 202 are running on separate systems, the SAN manager 202 may be coupled to the SAN management server 200 via a wired or wireless communications connection separate from the Fibre Channel network, e.g. an Ethernet, LAN, WAN, or modem, among others.

Figure 3A:
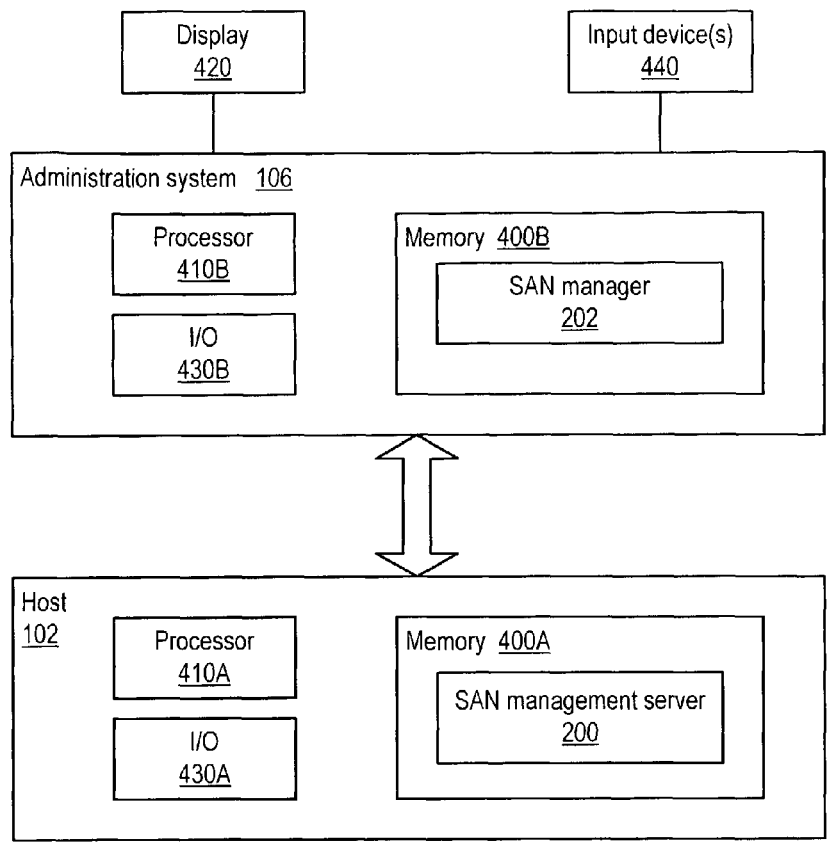
FIG. 3A illustrates a SAN management server and SAN manager running on different systems according to one embodiment.
Figure 3B:
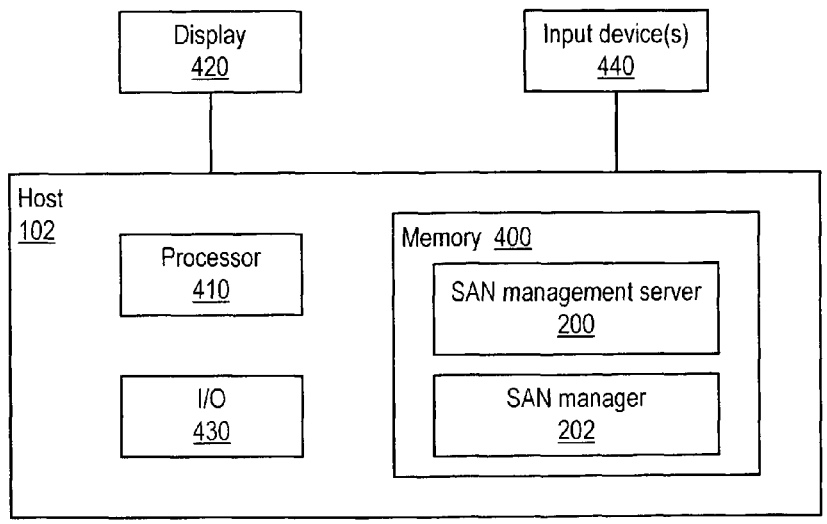
FIG. 3B illustrates a SAN management server and SAN manager running on a host system according to one embodiment.

FIGS. 3A and 3B illustrate embodiments of the SAN management server and SAN manager. FIG. 3A illustrates a SAN management server and SAN manager running on different systems according to one embodiment. In FIG. 3A, host 102E may include a memory 400A, a processor 410A, and an I/O interface 430A. Administration system 106 may include a memory 400B, a processor 410B, an I/O interface 430B, one or more displays 420, and one or more input device(s) 440. Memories 400 may include volatile random access memory (RAM), non-volatile ROM, magnetic or optical disk drives such as hard drives or CD-ROM, or any appropriate combination of the foregoing or equivalents thereto. Processors 410 may include processors of any of various types including single processors and multiprocessors, and may include processors from any of a variety of vendors including, but not limited to, Intel®, Sun®, and AMD® processors. The components of host 102E may be coupled for communication via a system bus (not shown), as may the components of administrative system 106. In one embodiment, administration system 106 may be coupled to host 102E via a wired or wireless communications connection separate from the Fibre Channel network, e.g. an Ethernet, LAN, WAN, or modem, among others. Host 102E may be coupled to a SAN via I/O interface 430A, which may include one or more Host Bus Adapters (HBAs) for coupling to Fibre Channel devices. Through I/O interface 430A, signals may be sent between the SAN management server 202 and SAN devices (e.g. switches, storage devices, etc.) via Fibre Channel.

Memory 400A may include SAN management server 200 and an operating system (not shown), which may be any operating system compatible with SAN management server 200, such as Windows NT or Solaris. Processor 410A may execute SAN management server 200 stored in memory 400A. Memory 400B may include SAN manager 202 and an operating system (not shown), which may be any operating system compatible with SAN manager 202, such as Windows NT or Solaris. Processor 410B may execute SAN manager 202 stored in memory 400B.

Display 420 may display graphical and/or textual video output for presenting SAN data to a system administrator or other user. Display 420 may be, for example, a cathode ray tube ("CRT"), a liquid crystal display ("LCD"), or any other suitable equivalent. Input device(s) 440 may include one or more of a keyboard, mouse, or any other appropriate input device or combination thereof, and may be used by an administrator or other user to perform SAN management operations provided by embodiments of the SAN management system as described herein.

FIG. 3B illustrates a SAN management server and SAN manager running on a host system according to one embodiment. In this embodiment, host 102E may include memory 400, processor 410, I/O interface 430, one or more displays 420, and one or more input device(s) 440. Memory 400 may include SAN management server 200, SAN manager 202, and an operating system (not shown), which may be any operating system compatible with the SAN management system, such as Windows NT or Solaris. Processor 410 may execute SAN management server 200 and SAN manager 202 stored in memory 400. Through I/O interface 430, signals may be sent between the SAN management server 202 and SAN devices (e.g. switches, storage devices, etc.) via Fibre Channel. Display 420 may display graphical and/or textual video output for presenting SAN data to a system administrator or other user. An administrator or other user may use input device(s) 440 to perform SAN management operations provided by embodiments of the SAN management system as described herein.

Figure 4:
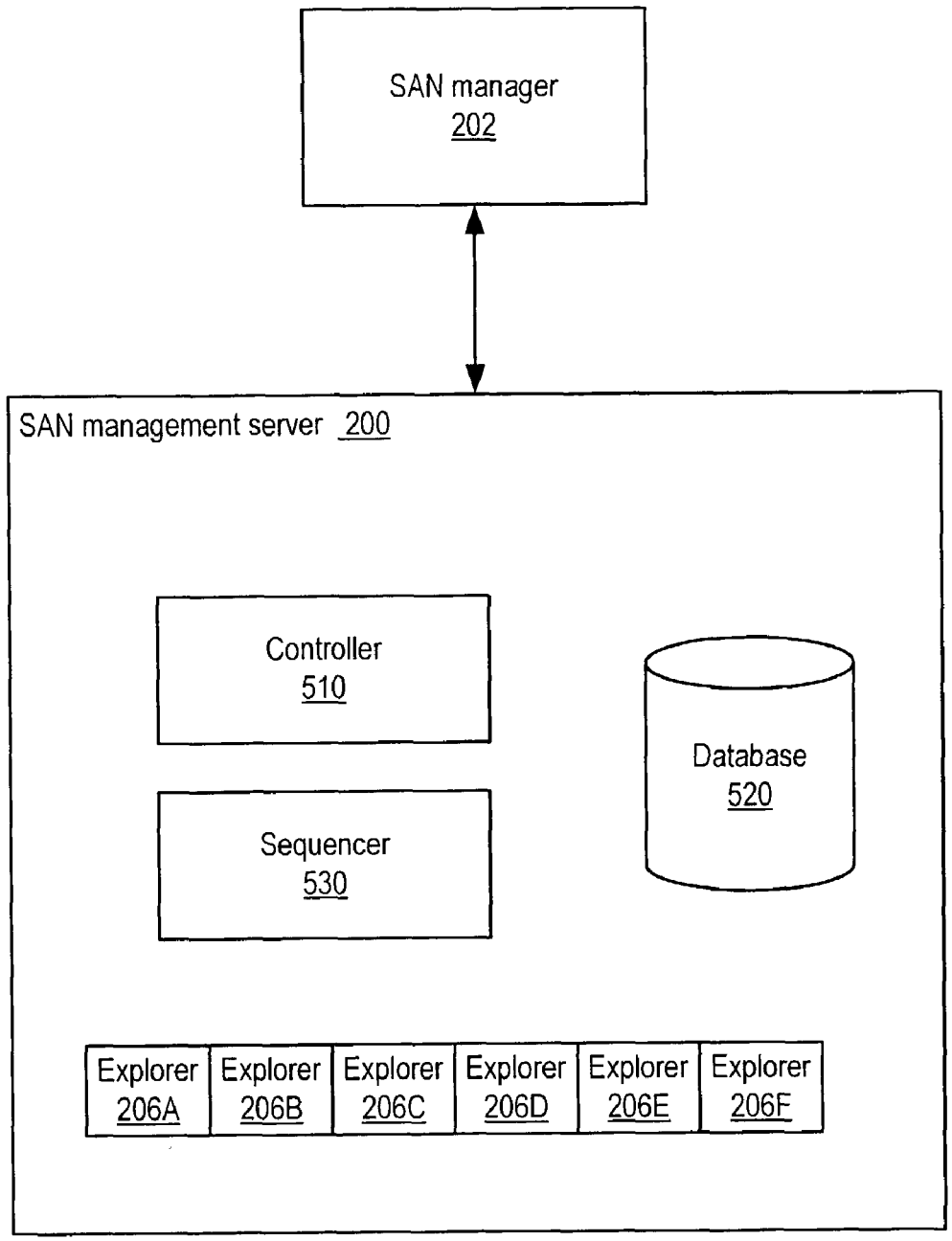
FIG. 4 illustrates the SAN management server and SAN manager according to one embodiment.

FIG. 4 illustrates the SAN management server and SAN manager according to one embodiment. SAN management server 202 may include a controller 510, a sequencer 530, a database 520, and one or more explorers 206. In one embodiment, the SAN management server 202 may include a SAN access layer, and controller 510, sequencer 530, database 520 and explorers 206 may be components of the SAN access layer. In one embodiment, the SAN access layer may include an engine that may include the controller 510 and sequencer 530, or alternatively may perform the operations of the controller 510 and sequencer 530 as described herein.

The SAN manager 202 may provide a single, centralized interface that may present SAN topology and other SAN data to the system administrator or other user in graphical and/or textual formats, and that may accept commands from the administrator or user to manage the SAN. For example, the system administrator, using the SAN manager, may instruct the SAN management server to find unused storage or to zone a specific storage device to a specific host. Alternatively, SAN management server 200 may include a command line interpreter for displaying SAN topology data and accepting system administrator commands.

In one embodiment, controller 510 may accept commands from the SAN manager 202 and perform those commands on the SAN. For example, a system administrator may send instructions to controller 510 via the SAN manager 202 to zone a storage device to a particular host 102. Controller 510, upon receipt of the command, may perform the necessary operations, using the appropriate explorer(s) 206, so that the storage device is zoned to the host 102. In addition, controller 510 may monitor the progress of execution of commands and may provide monitoring information to SAN manager 202. Further, controller 510 may receive heterogeneous data from heterogeneous network topology objects via explorers 206, convert the data into canonical form, and store the canonical data in database 520.

Database 520 may store canonical data representing the network topology of the SAN. In one embodiment, the canonical data may be stored as a predefined set of logical SAN data objects (e.g. host objects, switch objects, storage device objects, etc.), predefined attributes attached to those objects, and sets representing the interrelationships of the objects.

In one embodiment, sequencer 530 may determine which explorers 206 to use to collect information from the heterogeneous SAN components. In one embodiment, explorers 206 are vendor-specific agents that collect data from SAN storage entities, host entities and other devices in the SAN and verify the reasonableness of that data. For example, an explorer 206A may be a Solaris explorer and therefore appropriate for querying Solaris hosts for data. Accordingly, sequencer 530 may select the explorer 206A to query a Solaris host regarding available memory. As another example, explorer 540B may be a Windows NT host explorer, and therefore sequencer 530 may use explorer 540B to query Windows NT hosts. Explorers are further described below.

Figure 5:
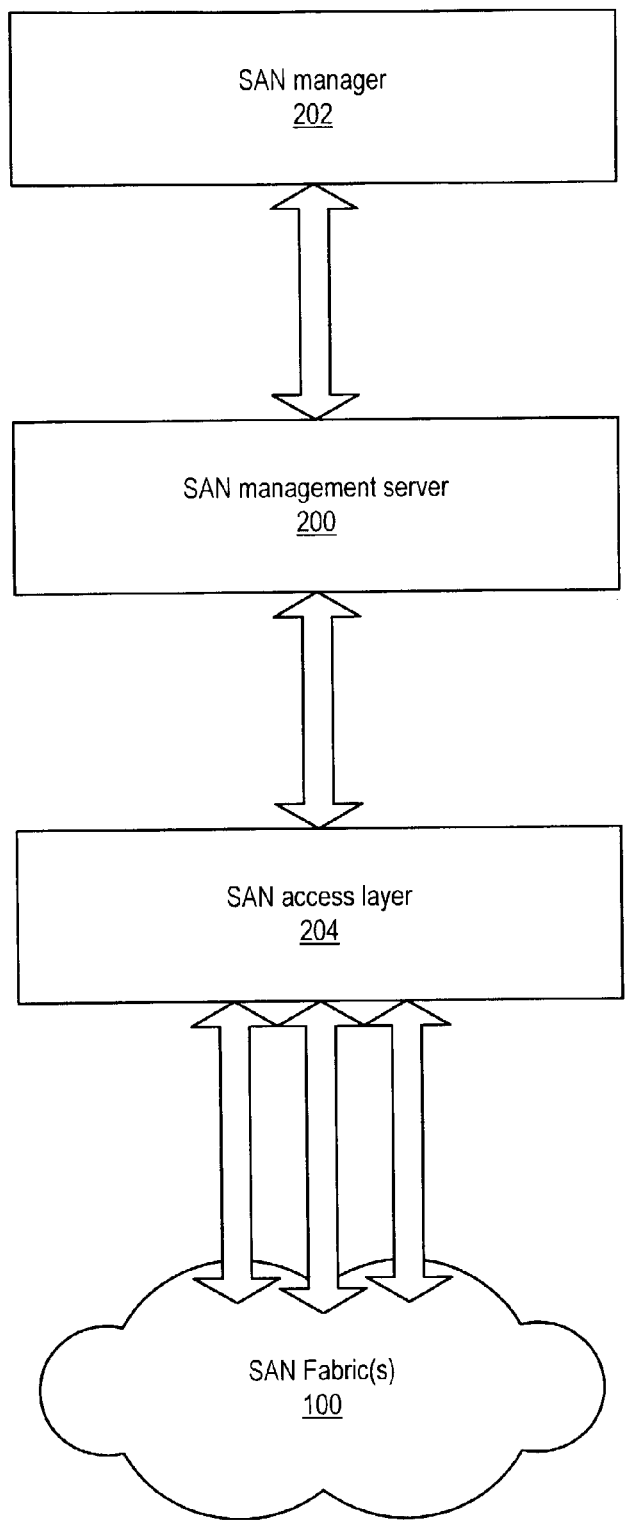
FIG. 5 illustrates the architecture of the SAN management system according to one embodiment.

FIG. 5 illustrates the architecture of the SAN management system according to one embodiment. In some embodiments, the SAN management system may provide administrators or other users the ability to view complex SAN topologies, gather real-time information about SAN objects, and support zoning and LUN security from one central point. This embodiment may be based on a distributed client-server architecture, and may be divided into components which may include a SAN manager 202, a SAN management server 200, and a SAN access layer 204. In one embodiment, the SAN access layer 204 may be a component or "layer" of the SAN management server 200.

The SAN manager 202 is a client application provided with the SAN management system. The SAN manager 202 may provide an interface for taking advantage of many or all of the SAN management system capabilities. In one embodiment, the SAN manager 202 provides a graphical user interface for displaying the information (e.g. XML data) compiled by and received from the SAN access layer 204 and the SAN management server 200 in graphical and/or textual format. The SAN manager 202 may be a central point for the user to perform one or more of SAN management task including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools.

Embodiments of the SAN manager 202 may provide a user interface for various tools, utilities and/or functions of the SAN management system. Embodiments of the SAN manager 202 may include an enclosure utility for creating and managing SAN object enclosures. Embodiments of the SAN manager 202 may include a zone utility for simplified zoning management. Embodiments of the SAN manager 202 may include a policy utility for configuring automated responses to SAN conditions. Embodiments of the SAN manager 202 may include a reporter mechanism for generating and displaying predefined reports on various aspects of the SAN. Embodiments of the SAN manager 202 may include a group utility for defining and naming groups of SAN objects based on quality of service (QoS) criteria. Embodiments of the SAN manager 202 may include a LUN security utility for LUN management. Embodiments of the SAN manager 202 may include a LUN query tool that may query discovered LUNs based on user-specified quality of service criteria and provide input to the zone utility and group utility.

In one embodiment, other applications, such as a Web browser, may function as clients to the SAN management server 200. In one embodiment, multiple SAN managers 202 may connect simultaneously with the SAN management server 200 using a TCP/IP socket assigned to the SAN access layer 204 and the policy service.

The SAN management server 200 may provide discovery of SAN objects and their attributes, event and policy management, and/or notification services. The SAN management server 200 may explore the SAN to make data available to client applications. The functions of the SAN management server 200 may include one or more of, but are not limited to: automatically discovering SAN-attached objects including hosts, host bus adapters (HBAs), switches and storage devices; maintaining a data store/database of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

SAN management system administration may include determining that the SAN management server 200 is configured to discover and monitor devices on the SAN. In one embodiment, the SAN management system may provide discovery methods that require minimal maintenance.

The component of the SAN management system that manages SAN discovery is the SAN access layer 204. Functions of the SAN access layer 204 may include discovery and zoning. By discovering objects and the relationship of these objects to each other, the SAN access layer 204 maintains a real-time topology of the SAN. The SAN access layer 204 may also directly interface with switches on one or more fabrics to manage the zoning of storage resources. The SAN access layer 204 may discover additional information about objects on the SAN that the SAN management server 200 cannot discover directly (e.g. devices configured out of view of the SAN management server 200), such as devices on a separate zone or fabric 100.

Figure 6:
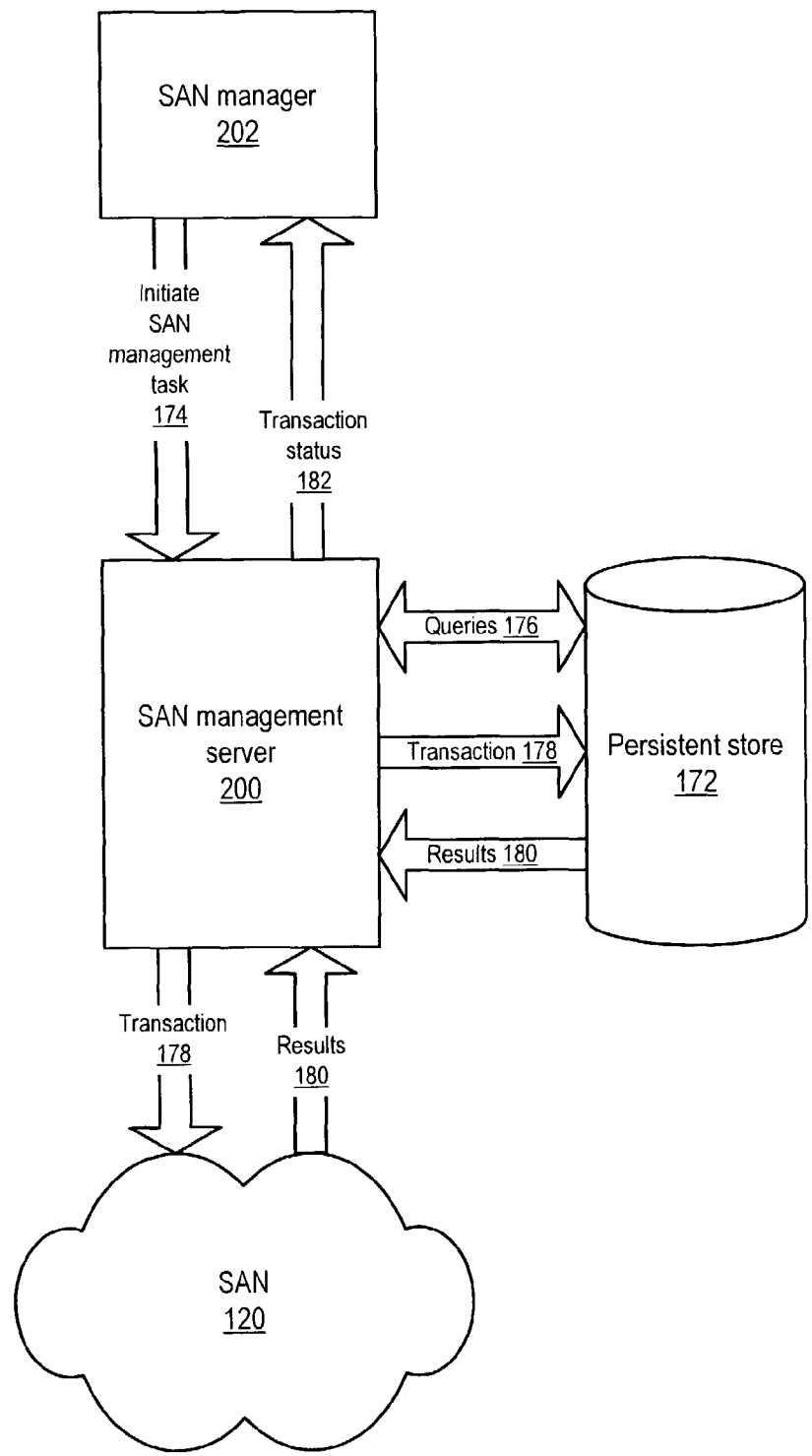
FIG. 6 illustrates a process of the SAN management server performing a transaction as initiated by a user through the SAN manager according to one embodiment.

FIG. 6 illustrates a process of the SAN management server performing a transaction as initiated by a user through the SAN manager according to one embodiment. In one embodiment, the SAN management server 200 and a persistent store 172 of SAN information maintained by the SAN management server may be used to consolidate and organize user operations and commands. The user may initiate the SAN management task as indicated at 174, for example, by invoking one or more SAN management tools and/or utilities through the SAN manager 202 to formulate and initiate the SAN management task. Initiating the SAN management task may include sending one or more commands to the SAN management server 200 to direct the SAN management server to perform the SAN management task. These commands may include information indicating, for example, which SAN objects are targets of the SAN management task and what SAN management task or tasks are to be performed on the targeted SAN objects.

The SAN management server may generate a transaction 178 that includes one or more operations to perform the SAN management task and that indicates which SAN objects the operations are directed at. To generate the transaction, the SAN management server 200 may determine what needs to be done (e.g. what operations need to be performed on which SAN objects) to perform the SAN management task. In one embodiment, this may include the SAN management server 200 accessing the persistent store 172 to query SAN information stored in the persistent store 172, as indicated at 176, to determine the and generate the operations to be performed on specific SAN objects. The persistent store may include one or more data objects representing SAN objects. Each data object may include information about a corresponding SAN object. The data objects may be used, for example, to generate the operations to conform to particular interfaces of different SAN objects, to determine network address information and other access information of SAN objects, etc. In one embodiment, operations may include one or more network commands for sending to SAN object. In one embodiment, one or more of the operations may be configured to modify the persistent store when executed. The determined one or more operations to perform the SAN management task collectively form the transaction.

The SAN management server 200 then may execute the one or more operations to perform the transaction 178. The transaction operations may be directed at the persistent store 172 and/or to one or more objects of the SAN 120. The SAN management server 200 may obtain results 180 of the operations of the transaction from the affected SAN objects and/or persistent store 172, verify from the results if the operations as indicated by the transaction 178 completed successfully, and notify the initiator of the SAN management task of the status (e.g. success or failure) of the transaction as indicated at 182. If the transaction 178 did not completed successfully, the SAN management server 200 may restore the persistent store 172 and/or any affected SAN objects by undoing any partially or fully completed operations, if necessary, to return the persistent store 172 and/or SAN 120 to a state prior to the transaction.

In one embodiment, SAN management tasks may be initiated from a command line interface and performed as transactions by the SAN management server 200. Transaction status information may be provided to the command line interface by the SAN management server 200.

SAN management tasks that may be performed as transactions may include one or more of, but are not limited to: LUN binding tasks for creating an access path between an addressable storage unit of a storage system coupled to a SAN fabric and a fabric port of the storage system; LUN masking tasks for enabling access to an addressable storage unit of a storage system coupled to a SAN fabric for a host adapter port of a host system coupled to the SAN fabric; SAN zoning tasks for managing zones on the SAN fabric; SAN component grouping tasks for grouping SAN components; and SAN enclosure tasks for managing SAN component enclosures. In one embodiment, one or more of these SAN management tasks may be initiated by a SAN administrator or other user from one or more tools and utilities of the SAN manager. In one embodiment, one or more of these SAN management tasks may be initiated by a SAN administrator or other user from a command line interface to the SAN management server.

Figure 7:
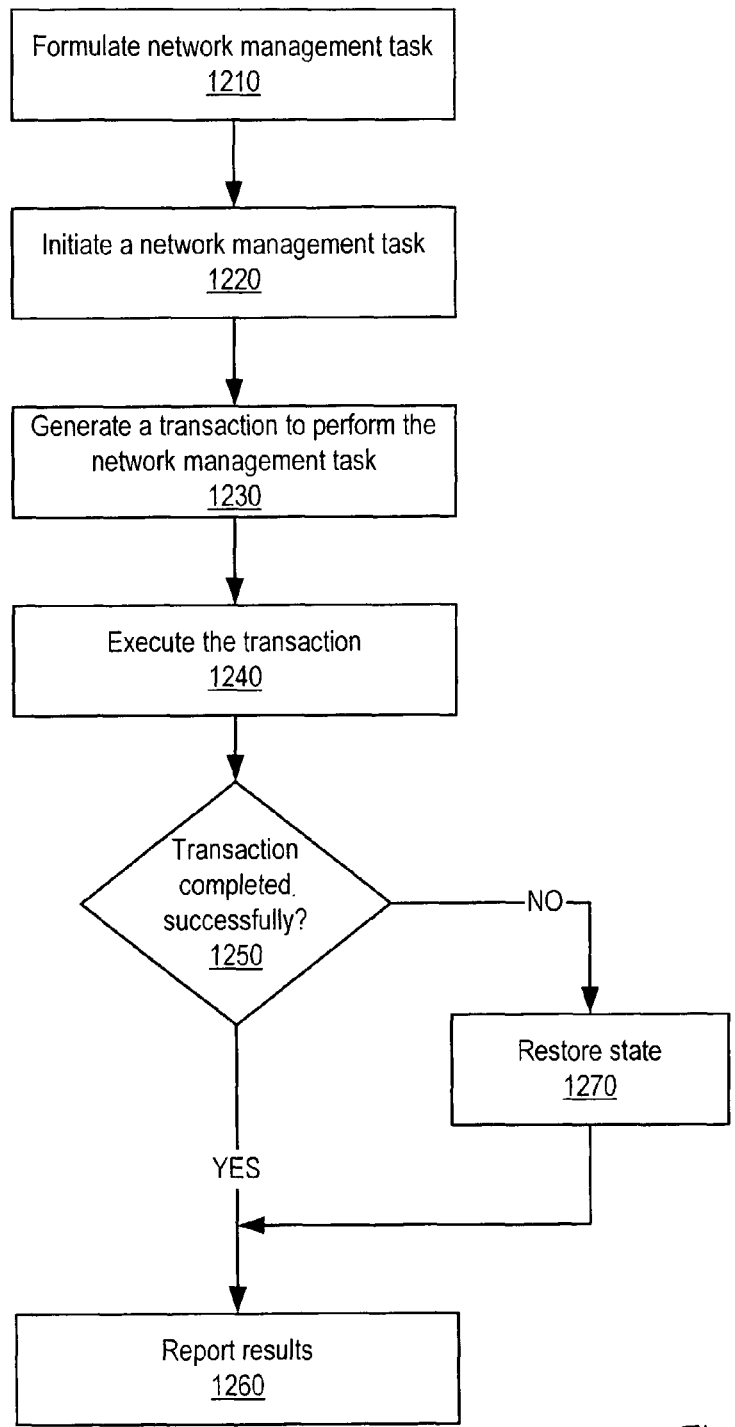
FIG. 7 is a flow diagram illustrating the execution of SAN management tasks as transactions in the SAN management system according to one embodiment.

FIG. 7 is a flow diagram illustrating the execution of SAN management tasks as transactions in the SAN management system according to one embodiment. The SAN management system may be used in the management of a heterogeneous Fibre Channel storage network. A storage administrator or other user may formulate a SAN management task as indicated at 1210. In one embodiment, the SAN management task may be formulated using a tool or utility accessed using the SAN manager. In one embodiment, the SAN management task may be formulated using a command line interface to the SAN management server. As indicated at 1220, the SAN management task may be initiated (e.g. from the SAN manager or command line interface) to direct the SAN management server to perform the task.

As indicated at 1230, the network management server may generate a transaction to perform the SAN management task. The transaction may include one or more operations to be executed to complete the transaction. In one embodiment, in generating the transaction, the SAN management server may query a persistent store to obtain SAN object information used to generate the one or more operations of the transaction. The operations indicated by the transaction may be performed as indicated at 1240 on the SAN. Operations may be targeted at particular SAN components, which may include one or more of, but are not limited to, computer storage devices, switching interconnects, and host computers. In one embodiment, a persistent store of SAN information maintained by the SAN management system may be modified by the transaction operations.

A check may be performed to determine the status of the transaction as indicated at 1250. If the transaction has successfully completed, then the storage administrator or other user may be informed as indicated at 1260. For example, an indication of the success or failure of the transaction may be displayed on the SAN manager or command line interface from where the SAN management task was initiated. If the transaction did not successfully complete, the state of the SAN and/or persistent store may be restored to its state prior to the transaction as indicated at 1270, and the storage administrator or other user may be informed of the unsuccessful completion of the task as indicated at 1260.

Figure 8:
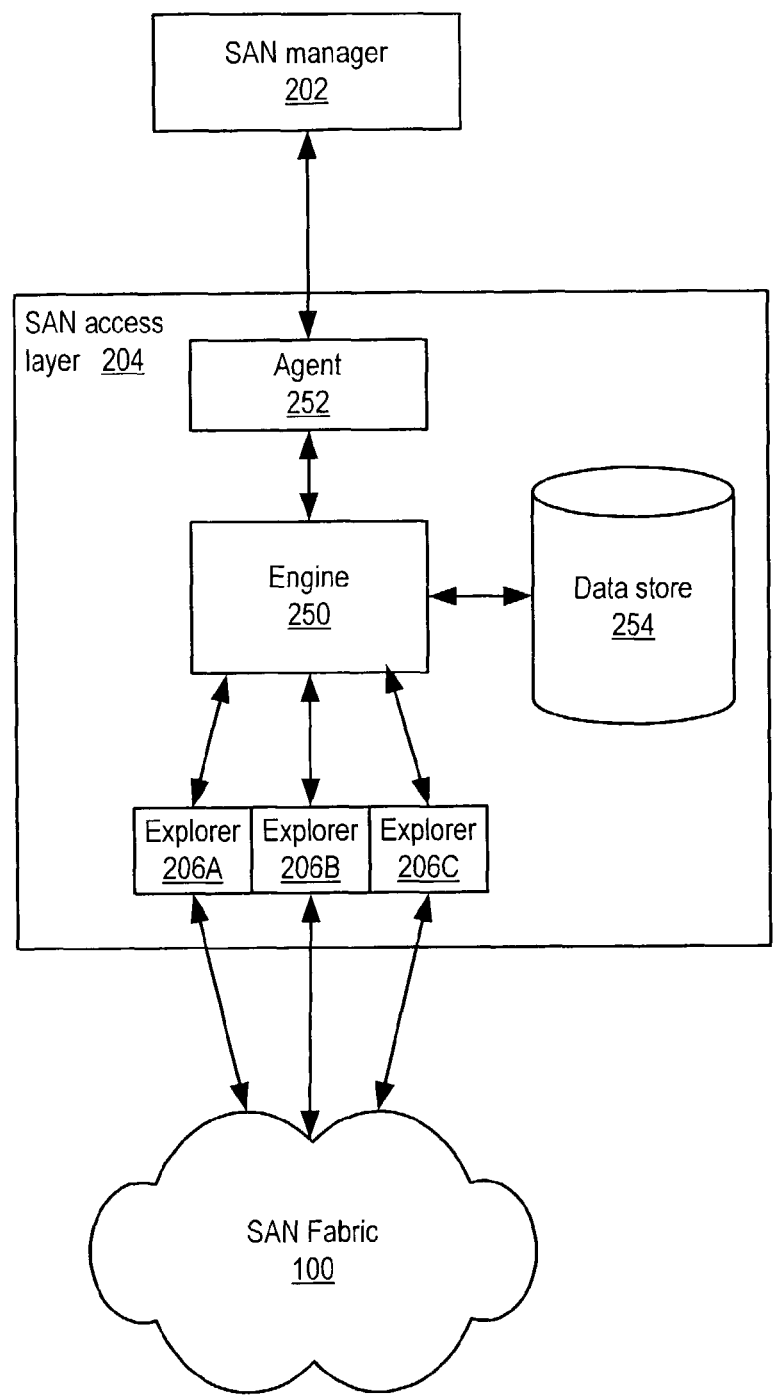
FIG. 8 illustrates the architecture of the SAN access layer according to one embodiment.

FIG. 8 illustrates the architecture of the SAN access layer 204 according to one embodiment. The SAN access layer 204 may include one or more components, including, but not limited to, one or more explorers 206 (e.g. explorers 206A, 206B, and 206C), an engine 250, an agent 252, and a data store 254. In one embodiment, the SAN access layer 204 may include an engine 250 that may perform one or more functions which may include, but are not limited to, coordinating the activity of the explorers 206, managing changes to the data store 254, and performing zoning operations by communicating with switches on the SAN fabric 100.

In one embodiment, the SAN access layer 204 may include one or more explorers that provide an interface to different types of heterogeneous SAN components so that the SAN management system may provide a common data representation for heterogeneous SAN components. Explorers may communicate with the SAN components over Fibre Channel (in-band) and/or Ethernet (out-of-band) connections to inventory the SAN. Each explorer may communicate with a specific type of device using a protocol available for that specific type of device.

The SAN access layer engine 250 aggregates the information it receives from the explorers into a data store 254. Once the SAN is discovered, the SAN access layer 204 may continue to monitor the SAN and may update the data store 254 as new events occur on the SAN. In one embodiment, the SAN access layer 204 may periodically examine the SAN, for example to discover or determine objects that are added, objects that are removed, and connections that are pulled.

In one embodiment, data gathered by the explorers may be aggregated into data store 254, which may be updated with real-time information about objects on the SAN. In one embodiment, the data store 254 may be managed by the SAN access layer engine 250. In one embodiment, the data store 254 may be an embedded, ODBC-compliant, relational database. In one embodiment, data from the database may be imported into a data warehouse to track changes and analyze the SAN over periods.

In one embodiment, the data store 254 may be purged, for example when a fabric switch is rebooted or to capture fresh SAN discovery information. Purging the data store 254 may result in the loss of user-entered data such as manually configured hosts and object attributes. An alternative to purging the data store 254 is to delete individual objects using the SAN manager 202. Objects that are discoverable by the SAN access layer 204 may be added back into the data store automatically.

In one embodiment, the SAN access layer 204 may include an agent 252 that translates information from the data store 254 into formatted files (e.g. XML documents), which may be provided to client applications such as the SAN manager 202 or Web browsers. The agent may also enforce user authentication for commands sent to the SAN management server 200, and may handle communication between the SAN management server 200 and any hosts running a SAN access layer remote (described below).

In one embodiment, the SAN manager 202 is a client of the SAN access layer 204, and may graphically and/or textually display objects discovered by the SAN access layer 204. In one embodiment, the SAN manager 202 may open a connection (e.g. TCP/IP socket) with the SAN access layer agent 252 and send a message (e.g. an XML message) requesting data stored in the data store 254. Upon receiving the request, the SAN access layer engine 250 may dynamically create a document (e.g. an XML document) describing the SAN topology. The SAN access layer agent 252 then may send this document to the SAN manager 202. Once the SAN manager 202 successfully receives the message, the SAN access layer agent 252 may close the connection. When the SAN manager 202 receives the document, it may read the file and display, in graphical and/or textual format, the information the document provides about the SAN.

In one embodiment, users may manually initiate an update between the SAN manager 202 and the SAN access layer 204. In one embodiment, any change on the SAN may cause an update to the SAN manager 202. In one embodiment, to minimize the network load during an update, only the changes are sent to the SAN manager 202.

In one embodiment, the data generated by the SAN access layer 204 may be in a format (e.g. XML) that may be read by a Web browser or exported to a file that may be opened and edited using a standard text editor.

In one embodiment, a SAN's current state may be captured in a file, e.g. an XML or other markup language file. Thus, snapshots of the SAN may be saved over time, which may be analyzed and compared to current conditions on the "live" SAN.

Figure 9:
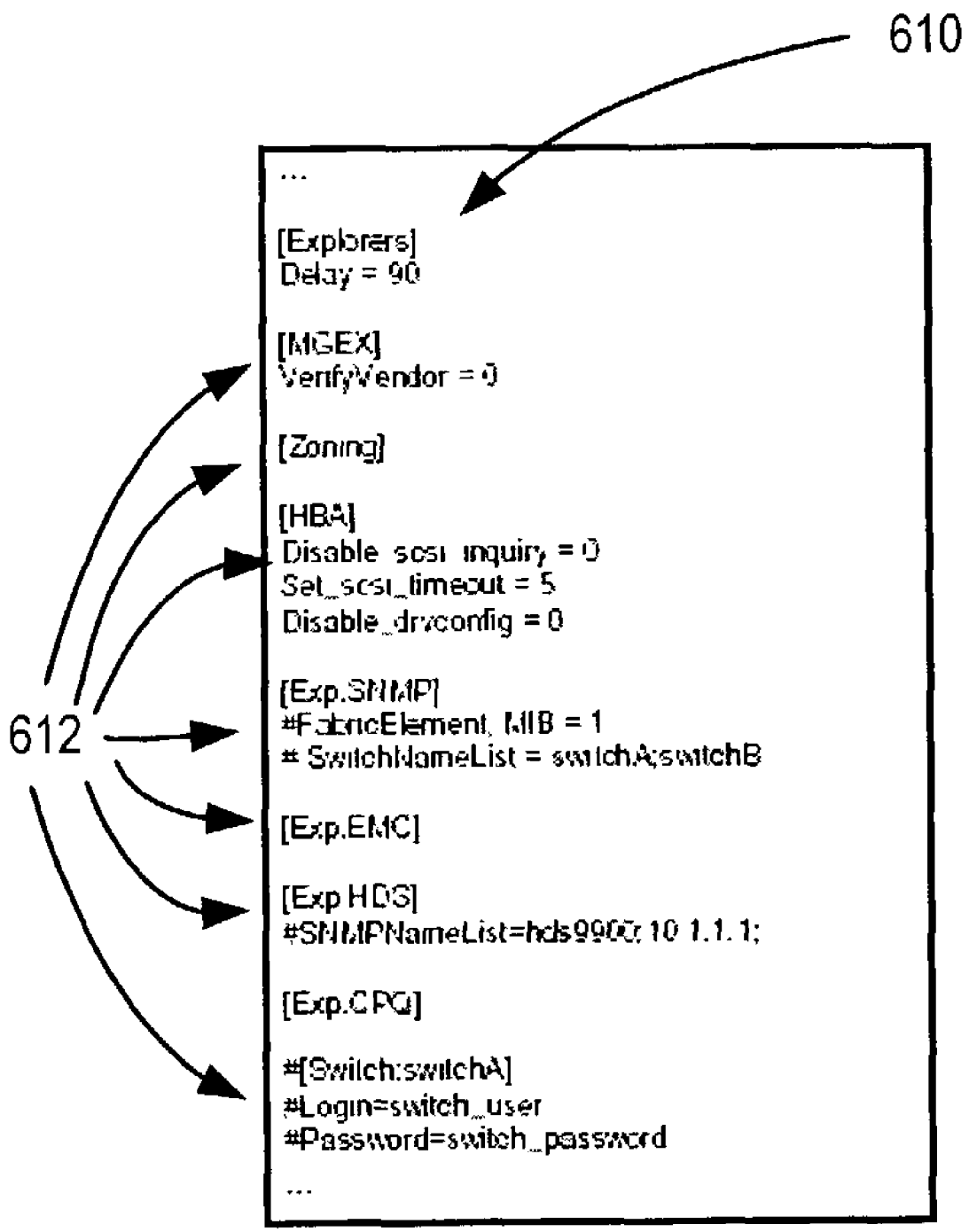
FIG. 9 illustrates an exemplary SAN access layer configuration file according to one embodiment.

In one embodiment, the SAN access layer 204 may be configured for discovery and device communication through a configuration file. FIG. 9 illustrates an exemplary SAN access layer configuration file according to one embodiment. The configuration file may include one or more parameters 610 for the SAN access layer and/or globally to the explorers. In this example, a "delay" parameter may specify the time delay (e.g., in seconds) between executions of the explorers. Each type of explorer may have a section 612 in the configuration file that may include one or more parameters specific to the particular type of explorer.

Figure 10:
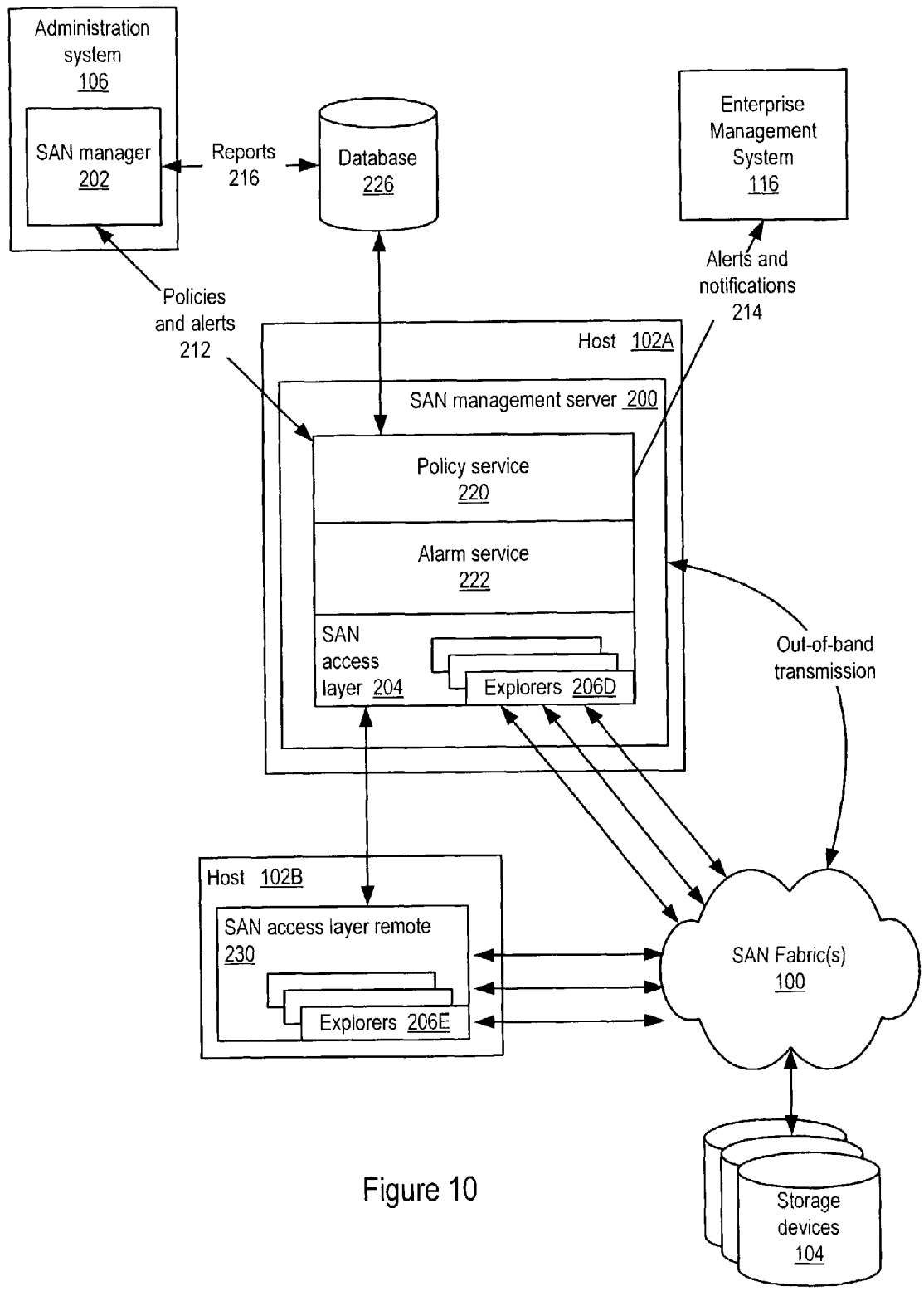
FIG. 10 illustrates an exemplary SAN including a SAN management system and further illustrates the architecture and operation of the SAN management system according to one embodiment.

FIG. 10 illustrates an exemplary SAN including a SAN management system and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, the SAN access layer 204 may be a component or "layer" of the SAN management server 200. The SAN management server 200 may also include a policy service 220 and an alarm service 222.

In one embodiment, the SAN management system may include one or more explorers 206 that provide an interface to different types of heterogeneous SAN components so that the SAN management system may provide a common data representation for the heterogeneous SAN components. In one embodiment, one or more explorers 206D may be included within the SAN access layer 204. Explorers 206 may communicate with the SAN components over Fibre Channel (in-band) and/or Ethernet (out-of-band) connections to inventory the SAN. Each explorer 206 may communicate with a specific type of device, using a protocol available for that specific type of device.

In one embodiment, the SAN access layer 204 may aggregate information gathered by the explorers 206D into a SAN access layer 204 data store. Once the SAN is discovered, the SAN access layer 204 may continue to monitor the SAN. In one embodiment, the SAN access layer 204 may periodically examine the SAN for objects that are added, objects that are removed, and connections that are pulled. In one embodiment, the architecture of the SAN management system may allow new explorers 206 to be added as needed or desired. For example, if a new type of SAN device is added to the SAN, or an existing type of SAN device is modified or upgraded, an explorer 206 may be added or updated to correctly communicate with the new or updated type of SAN device.

Each explorer 206 may use a different method to discover information about objects on the SAN. Explorers 206 may be categorized into types, including, but not limited to, switch explorers, zoning explorers, disk array explorers, and Host Bus Adapter (HBA) explorers. In one embodiment, the explorers 206 may query objects on the SAN to retrieve a standard set of attributes for each type of object. The terms "information" and "details" may be used to describe the different kinds of data about a SAN that the SAN management system may discover, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address (e.g. IP address).

Switch explorers may discover switch information such as vendor name, firmware version, and model name. Switch explorers may include, but are not limited to, a management server explorer and an out-of-band switch explorer.

In one embodiment, the SAN access layer 204 may include a management server explorer to communicate with supported switches over Fibre Channel connections. In one embodiment, the management server explorer may use the Fibre Channel Common Transport (CT) protocol to communicate with switches in the fabric 100. The management server explorer may, for example, discover switches in-band over Fibre Channel, obtain switch characteristics, and/or explore port connectivity. In one embodiment, the management server explorer may optionally run over IP networks, for example to discover Brocade fabrics. For some switches such as Brocade switches, the management server explorer may run out-of-band. In one embodiment, the management server explorer may also perform in-band zoning (e.g. for McDATA switches).

In one embodiment, there may be circumstances in which out-of-band exploration may be desired, for example, when there are multiple switch fabrics (e.g. McDATA switch fabrics) or incompatible HBA drivers. In one embodiment, the SAN access layer may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Embodiments of the SAN access layer 204 may include zoning explorers that may be used as an interface for the SAN access layer 204 to communicate with fabric switches to perform discovery and control of zones in the SAN. When SAN management system users issue zoning commands, the SAN access layer 204 may use a zoning explorer to contact the switch to perform the zoning operation. In one embodiment, the zoning explorers may communicate with the switches out-of-band. Embodiments may provide zoning explorers specific to fabric switches provided by various switch vendors such as QLogic, INRANGE, McDATA and Brocade. In one embodiment, one or more zoning explorers (e.g., a Brocade zoning explorer) may complete transactions with a switch management server (name server) to discover zone names and attributes and to perform switch zoning commands. In one embodiment, the management server explorer may, in addition to discovery, also manage zoning for some vendors' switches in-band, for example, McDATA switches.

In one embodiment, the SAN access layer 204 may include an HBA explorer that may discover information about SAN-connected storage devices 104 that are zoned to a host 102 that is running a SAN management server 200 or where a SAN access layer remote 230 (described below) resides. The HBA explorer may interact with a host 102 (e.g. a Sun Solaris or Windows 2000/Windows NT Server) to discover HBAs and device paths. A device path may be defined as a route through an interconnect that allows two (or more) devices to communicate.

In one embodiment, the HBA explorer may not discover locally attached storage (e.g. disks or other devices attached through a SCSI or IDE controller). If these storage devices have OS handles, then the HBA explorer may return LUN names and attributes. An OS handle is the name the operating system uses to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Embodiments of the SAN access layer 204 may include one or more disk array explorers that may provide information about array names and their attributes, such as number of ports and the number of disks contained in an array. Disk array explorers may discover disk arrays/enclosures and their LUNs. Disk array explorers may pass along SAN management system LUN management commands to the array's management interface to execute. In one embodiment, disk array explorers may discover LUNs that are not masked to discovered hosts on the SAN. The SAN access layer 204 may include disk array explorers specific to disk arrays of various vendors, including, but not limited to, Compaq, EMC, and Hitachi disk arrays.

In one embodiment, the SAN access layer 204 may not communicate directly with a disk array but instead may communicate through the array's management interface, for example, Command Scriptor (Compaq) and SYMCLI (EMC). In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order for the SAN management system to communicate with the arrays.

In one embodiment, disk array explorers (e.g. Compaq and EMC explorers) may start when the SAN access layer 204 starts. In one embodiment, the disk array explorers may check to see if the host 102 has the management interfaces (e.g. CCS or SYMCLI). If the host does not have the management interface, then the corresponding explorer may be disabled. If the management interfaces are present, then the explorers may attempt to determine if the host has access to any LUNs exported by the array. If any LUNs are available, the explorers may attempt to discover the array using the OS handle to the LUN.

In one embodiment, some disk array explorers (e.g., a Hitachi explorer) may use a different model than other explorers such as Compaq and EMC explorers. Going out-of-band, these explorers may use a network protocol such as SNMP to communicate directly with the disk array controller (e.g. the Hitachi disk array controller). IP addresses for each disk array may be supplied for SAN access layer 204 discovery and communication. For example, in one embodiment, for the SAN access layer 204 to discover and make LUN management requests using the Hitachi explorer, the IP addresses of the agent (e.g. SNMP agent) residing on each Hitachi disk array may be specified in the SAN access layer 204 configuration file.

In one embodiment, the SAN access layer 204 may automatically discover information for each Addressable Unit (LUN) that is under the control of a volume manager. The discovered information may include, but is not limited to: Disk Group Name, Disk Media Host, Disk Media I/O Paths, Disk Media Public Capacity, and Disk Name.

In one embodiment, the SAN management server 200 may discover information about HBAs on other hosts 102 attached to fabrics 100 discovered by the SAN management server host 102A. Since not all objects on the SAN may be visible to the host 102A on which the SAN management server 200 is installed, one embodiment may include a SAN access layer remote 230 that may be installed on one or more other hosts 102 in the SAN, if any, to assist the SAN management server 200 in discovering the entire SAN.

In one embodiment including SAN access layer remote 230, each installation of the SAN access layer remote 230 may include one or more explorers 206E. In one embodiment, explorers 206E may include one or more explorers 206 that may also be used by the SAN access layer 204, such as a management server explorer and an HBA explorer. In one embodiment, explorers 206E may also include an out-of-band switch explorer. In one embodiment, the SAN access layer 204 and each installation of the SAN access layer remote 230 may each include a set of one or more explorers 206 that may be determined by the discovery requirements and/or contents of the region of the SAN visible to the host 102 on which the SAN access layer 204 or SAN access layer remote 230 resides. Each installation of the SAN access layer remote 230 may provide information gathered by its explorers 206E to the SAN access layer 204, which may aggregate this information into the SAN access layer 204 data store. Installed SAN access layer remotes 230 may be considered agents or extensions of the SAN access layer 204. Where SAN access layer 204 is described herein, the description may generally be considered to include the SAN access layer remote 230.

In one embodiment, to get more detailed information about a remote host 102, the SAN access layer remote 230 may be installed on the host 102, and the host 102 may be added to a SAN access layer configuration file on the SAN management server 200. In one embodiment, to obtain SAN discovery information from fabrics 100 not attached to the SAN management server 200, the SAN access layer remote 230 may be installed on at least one host 102 in the remote fabric 100, and the at least one host 102 in the remote fabric may be added to the SAN access configuration file on the SAN management server 200.

In one embodiment a host 102 running the SAN access layer remote 230 may be specified as either a "Host" or an "In-Band Host" in the SAN access layer configuration file. The "Host" entry may be used to define other hosts 102 attached to the SAN. The "Host" designation may instruct the remote host 102 to run the HBA explorer. The "In-Band Host" entry may be used to define at least one SAN access layer remote host 102 per each fabric 100 that is not attached to and thus not discovered by the SAN management server 200. The "In-Band Host" designation may instruct the remote host 102 to run the management server explorer, or optionally other explorers, in addition to the HBA explorer.

In one embodiment, the SAN management server 200 communicates with SAN access layer remote(s) 230 across an HTTP connection. In one embodiment, the SAN management server 200 may use XML to communicate with SAN access layer remote(s) 230. Other embodiments may use other connections and other communications protocols.

Figure 11:
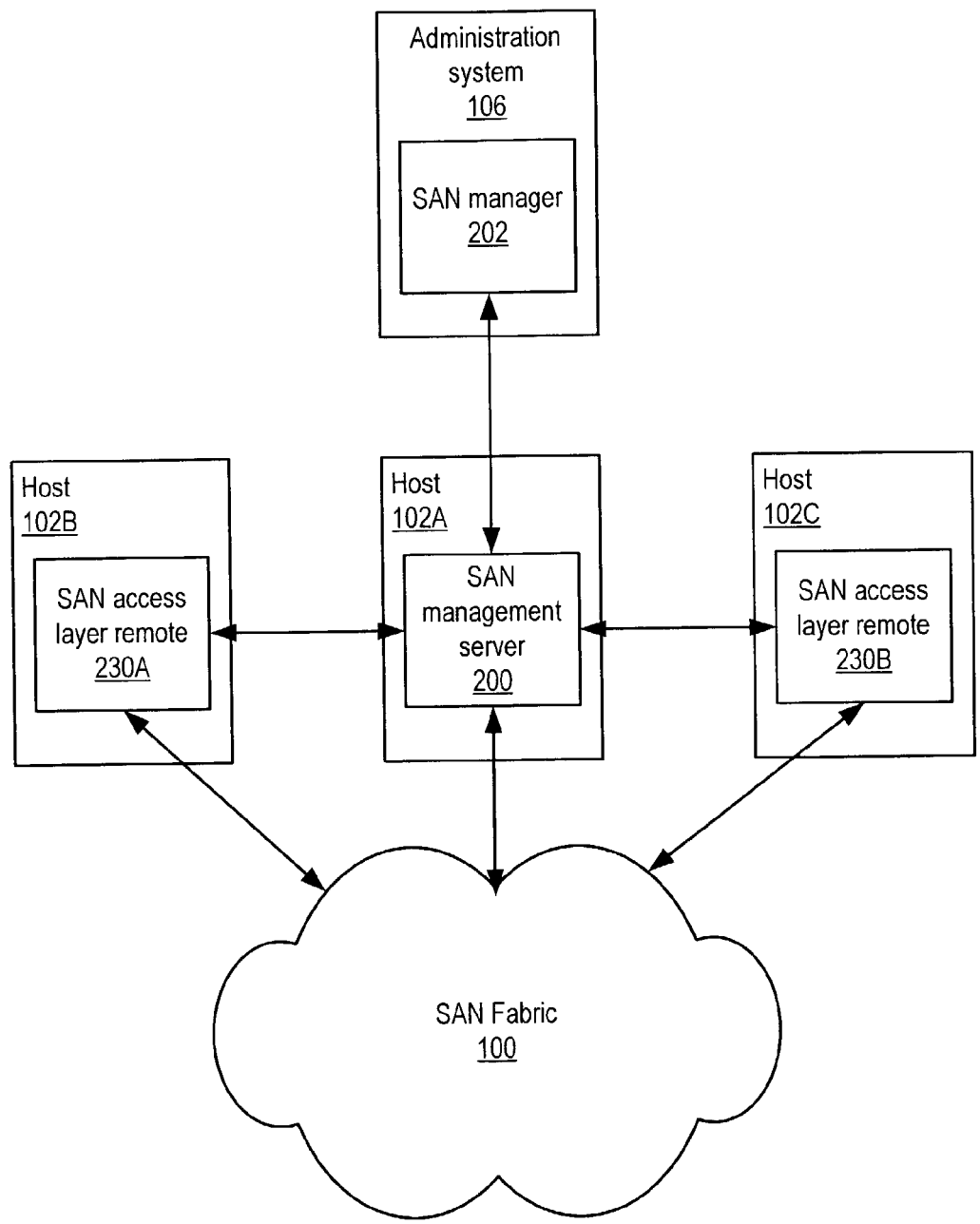
FIG. 11 illustrates an exemplary SAN where a first host includes a SAN management server 102 and other hosts each include an installation of the SAN access layer remote according to one embodiment.

In one embodiment, the SAN access layer remote 230 may be installed on every host 102 on the SAN to provide complete and accurate discovery. In one embodiment, the SAN access layer remote 230 may not be installed on the same host 102 as the SAN management server 200. FIG. 11 illustrates an exemplary SAN where host 102A includes a SAN management server 200 and hosts 102B and 102C each include an installation of the SAN access layer remote 230 according to one embodiment. In one embodiment, the SAN access layer remote 230 may use a modified form of the same SAN access layer process used in the SAN management server 200, but is not itself a server. In one embodiment, client applications such as the SAN manager 202 may not connect to a SAN access layer remote host such as hosts 102B and 102C. In one embodiment, if a the SAN access layer remote 230 is not installed on a host 102 (e.g. by choice or due to the host 102 running a non-supported operating system), the SAN management server 200 may still discover the HBA, and the enclosure utility may be used to accurately visualize the host in the SAN manager 202 user interface.

Monitoring a SAN

Continuing with FIG. 10, in one embodiment, policy-based management provided by the SAN management system enables the monitoring of conditions on a SAN and may facilitate quick response when problems occur. Conditions that may be monitored by the SAN management system may fall into one or more categories of interest to storage administrators, including, but not limited to:

What is the traffic on the SAN?

What is the environment status of the SAN's hosts, switches, and disk arrays?

What errors is the SAN generating?

Which ports and switches are available/unavailable on the fabric?

Embodiments of the SAN management system may use one or more methods for monitoring conditions on a SAN. These methods may include, but are not limited to, out-of-band polling (e.g. SNMP polling) and traps (e.g. SNMP traps) and the SAN access layer 204. The SAN access layer 204 may provide notification of SAN events such as the addition or deletion of SAN components such as SAN fabrics, switches and arrays. In one embodiment, the SAN management system may also monitor conditions in-band, e.g. using the Fibre Channel Common Transport (CT) protocol.

In one embodiment, to monitor conditions on a SAN using SNMP polling, the SAN management system may periodically poll SNMP-enabled SAN devices to retrieve the current values of the properties defined in their vendor-supplied SNMP Management Information Bases (MIBs). In one embodiment, SNMP polling may provide the majority of information that the SAN management system uses to monitor the SAN.

Among other SAN monitoring methods, the SAN management server 200 may receive SNMP traps from elements on the SAN. To monitor conditions on a SAN using SNMP traps, some SAN objects may send SNMP traps to the SAN management server 200 when an event happens. To send traps, SNMP-capable devices on the SAN may be configured to send traps to the host 102A running the SAN management server 200. In one embodiment, these traps are asynchronous (the communication is one-way), so the SAN management system cannot poll such an object to determine the current condition. In this embodiment, the SAN management system may be dependent on the trap sender to report when a condition changes by sending additional traps. In another embodiment, the SAN management system may poll an object to determine the current condition.

In one embodiment, for the SAN management system to monitor an object on a SAN, the object may require an SNMP agent that is configured to accept SNMP polls and to send SNMP traps (if the agent supports these features). In one embodiment, SNMP-capable objects may be configured to send SNMP traps to a particular port on the host 102 running the SAN management server 200. In one embodiment, the SAN management server 200 may be configured to listen for traps on other ports. If the port is changed, then all devices that send traps to the SAN management server host (including switches and arrays) may need to be reconfigured to send traps to the new port.

Collectors

The SAN management system may manage a SAN by monitoring SAN devices and enforcing predefined actions should any device fail to operate within the defined boundaries. In one embodiment, to enable this level of policy management, the SAN management system may include collectors. In one embodiment, these collectors may be based on devices' SNMP MIB variables. A collector may be a path or channel through which the SAN management system gathers a specific type of data for a specific object type. There may be one or more types of collectors, for example collectors for object availability, collectors for environmental conditions, collectors for device errors, and collectors for SAN traffic. Collectors may monitor properties such as switch port status, dropped frames, disk temperature, link failures and so on, which may be evaluated by the policy service 220 to create an accurate composite status of the SAN. In one embodiment, the status of devices may be displayed on a topology map of a SAN manager 202 user interface, for example using color-coded icons.

Each collector may use one of one or more methods for monitoring conditions on a SAN. These methods may include, but are not limited to, out-of-band polling (e.g. SNMP polling) and traps (e.g. SNMP traps) and the SAN access layer 204. The SAN access layer 204 may provide notification of SAN events such as the addition or deletion of SAN components such as SAN fabrics, switches and arrays. In one embodiment, one or more collectors may monitor conditions in-band, e.g. using the Fibre Channel Common Transport (CT) protocol.

In one embodiment, collector values may be refreshed at regular intervals, forming one or more data streams that the SAN management system may use to monitor SAN conditions. Collectors may be used as the basis for policy conditions. In one embodiment, collector data may be stored and used to generate historical reports about the SAN.

In one embodiment, to reduce the time required to configure device SNMP MIBs, the SAN management system may automatically detect the device MIBs and apply the appropriate collectors to the objects without user intervention. The user may then turn on one or more policies to utilize collector information.

In one embodiment, the SAN management system may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Textual state collectors may be associated with one or more possible values. In one embodiment, each collector may be associated with help text that may, for example, be displayed by a policy utility.

Figure 12:
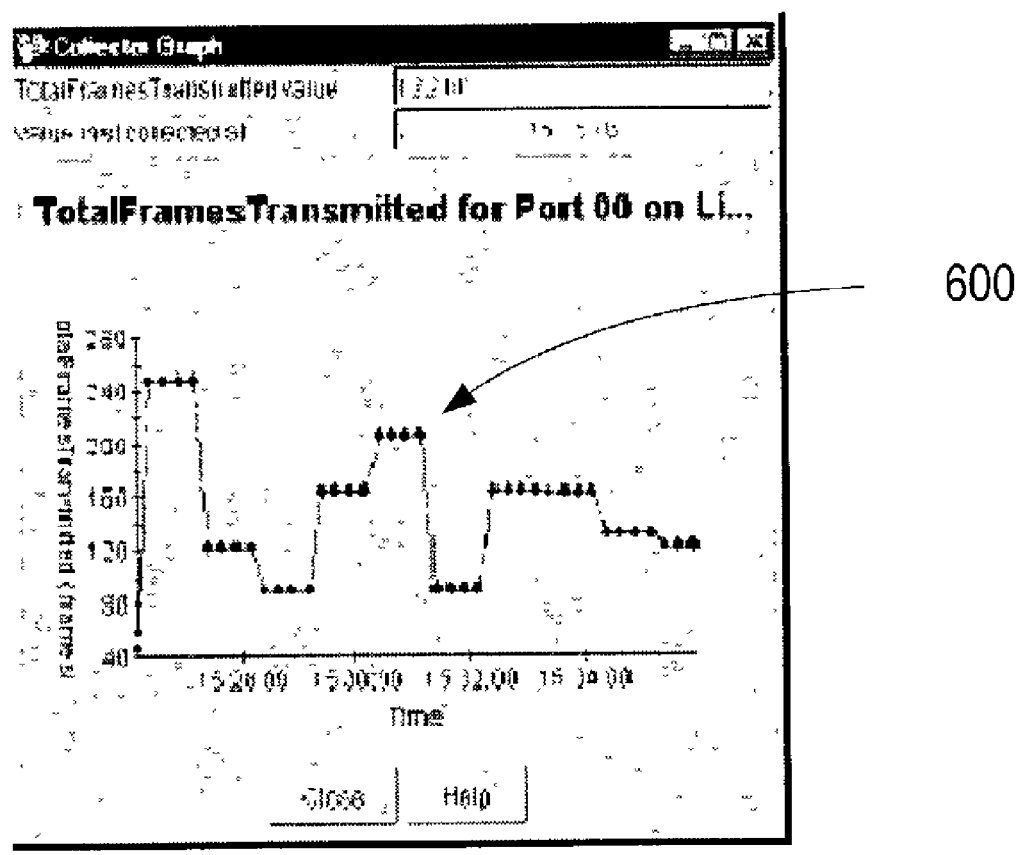
FIG. 12 illustrates an exemplary real-time collector graph according to one embodiment.

Embodiments of the SAN management system may use collector data in real-time collector graphs, the policy engine, and the SAN reporter. FIG. 12 illustrates an exemplary real-time collector graph 600 according to one embodiment. This example shows the total frames transmitted for port 00 of a device over a period of several minutes. In one embodiment, the SAN management system may display a real-time graph of collector values for threshold-based collectors. The graph displays current values for the collector as they are received. The policy engine and the SAN reporter are described later in this document.

Traffic collectors may monitor SAN traffic at the switch port level. The SAN management system may provide a variety of collectors for different vendors including, but not limited to, Brocade, McDATA and QLogic. Various collectors may monitor SAN traffic metrics including, but not limited to, frames discarded, frames rejected, port utilization, and buffer credits. Monitoring traffic information may be used to ensure the SAN is able to process its data effectively. For example, knowing that port utilization is running well under or over a defined threshold may enable the user to make load-balancing decisions intelligently and timely, not blindly.

Error collectors may monitor the SAN and its devices for error conditions. In addition to monitoring the fabric for errors, the SAN management system may also monitor the actual devices including switches and arrays. On the switch side, the SAN management system may monitor collector information for fabric switches and other fabric components. This collector information may include, but is not limited to, CRC errors, address errors, delimiter errors, invalid transmission words, link failures, link resets, sequence errors, signal loss, sync loss, encoding errors, frames too short/long, and invalid order sets. Embodiments of the SAN management system may provide the tools required to effectively set up and configure monitoring of these indicators.

In addition to switch monitoring, embodiments of the SAN management system may also, using error collectors, monitor storage devices 104 for errors including one or more of, but not limited to, array processor errors, internal bus errors, cache errors, memory errors, warning errors, array status, and array failure. Storage devices that may be monitored may include one or more of, but are not limited to, RAID systems, disk arrays, JBODs, tape devices, and optical storage devices.

Environmental collectors may provide monitoring of environmental conditions of SAN objects. Monitored environmental conditions may include, but are not limited to, battery status, fan status, power supply status, and other detailed information for at least some objects including disk arrays (e.g. Hitachi disk arrays) and switches. Even though a device may be moving data correctly, the device may have an outstanding environmental issue, which if left unattended, may adversely affect the SAN. The SAN management system allows the user to understand and proactively monitor these environmental collectors in order to maintain availability of array storage.

Availability collectors may provide monitoring of device availability states for fabrics 100, hosts 102, switches (e.g. Brocade, QLogic, and McDATA switches) and other devices. These collectors may include, but are not limited to, device offline/online, device mode, fabric added/removed, host online/offline, and switch port online/offline collectors. This information may be used, for example, for determining SLA (Service Level Agreement) and QoSS (Quality of Storage Service) and for ensuring that all SAN devices are available at maximum capacity. This data may be stored in a database 226 to provide a single source of accurate information for the entire SAN, and may be used in "canned" or customized reports. Using this data, a user may view the status of the SAN or components of the SAN anytime.

Policy Management and Notification

In one embodiment, the SAN management system may include a policy service 220 that manages policies that are associated with objects on the SAN. Policies may be viewed as rules that may be used to help manage a SAN by automating responses to certain events and conditions. Policies may detect when something goes wrong, and may be used to anticipate and handle problems before they occur. A policy may include a condition to monitor, such as a high percentage of bandwidth utilization on a switch port, and a set of actions to take when that condition is met, such as raising alerts on the SAN manager 202 user interface, sending e-mail, triggering SNMP traps, and/or invoking commands and/or scripts. In one embodiment, the policy service 220 may be integrated with the SAN manager 202, permitting users to view what policies are in effect on their SAN, to define and modify policies, and to generate inventory and performance reports based on the conditions monitored by the policy service 220.

Policy rules may be expressed in ordinary language, for example: "If port utilization exceeds 90% of its total bandwidth for more than sixty seconds, send an e-mail to the system administrator." In one embodiment, if a condition specified by a policy is detected, the SAN management system may trigger an alarm, and the alarm instance may be added to a list of active alarms.

A policy may indicate a particular object or type of object to monitor. In general, any object for which the SAN management system provides at least one collector may be monitored. Objects that may be monitored include, but are not limited to, fabrics 100, switches, switch ports, hosts 102, and disk arrays. The SAN management server 200 host 102 is also an object, and one embodiment may include a set of policies that monitor the SAN management server 200.

A policy may include a description of the condition to monitor on an object. The condition may be based on the value of a collector that represents the type of data to be monitored for the object. The condition may be either a quantitative evaluation (for example, less or more than a certain percentage of available disk space) or a textual value (such as whether a switch's status is "offline" or "online").

A policy may indicate one or more actions to be taken when the condition is detected. Actions may include raising an alert on the SAN manager 202 user interface, invoking commands and/or scripts, sending e-mail notification to a responsible party or parties (e.g. on enterprise management system 116), and/or triggering SNMP traps (e.g. to management frameworks such as Hewlett-Packard OpenView).

One embodiment of the SAN management system may include a set of predefined policies that may be used "out of the box" to achieve at least some SAN monitoring goals without having to code and configure "custom" policies. In one embodiment, a predefined policy may send an alert to the SAN manager 202 as a default action in response to a default condition of the policy. In one embodiment, if desired, an administrator may modify the intervals that the policy service gathers SAN data, the conditions that trigger alerts and notifications, and the actions in the predefined policies. For example, the administrator may desire to adjust the threshold value for a monitored condition such as port utilization, or configure an action in addition to a default alert sent to the SAN manager 202. Predefined policies may include policies of one or more of one or more policy types, including, but not limited to, traffic policies (switches), error policies (switches, disk arrays), availability policies (switches, disk arrays, fabrics, hosts), and environment policies (disk arrays).

At least some policies may rely on vendor-supplied SNMP Management Information Bases (MIBs) to detect and monitor properties for switches, switch ports, disk arrays and other SAN devices such as switch port status, dropped frames, disk temperature, link failures, and so on.

In one embodiment, the policy service 220 may also provide a mechanism or mechanisms for users to create custom policies for collector types. In one embodiment, users may set the scope of a policy to apply to all objects that support a collector type (for example, all objects that have a collector of 'status'). In one embodiment, users may set the scope of a policy to apply to all objects of a particular type (for example, all EMC disk arrays). In one embodiment, users may set the scope of a policy to apply to a specific object (for example, port 3 on Brocade switch 1).

One embodiment may include a policy engine that performs the instructions described in all policies enabled on the SAN. In one embodiment, the policy engine may be a component or process of the policy service 220. Each policy may be based on a particular type of data for a particular object or type of object. These types of data may be represented by collectors. When the SAN management system discovers the objects on the SAN, it may determine which collectors correspond to the objects and register the relevant collectors with the policy engine. The policy engine then may receive a stream or streams of real-time collector data and compare data values with the conditions described in its policies. When the alarm condition for a particular policy is met, the policy engine performs the actions described in the policy.

The policy engine may use current collector values from the data stream, and may retain the values in a buffer long enough to determine whether an alarm threshold has been met. For example, a threshold may be defined as "switch port utilization greater than eighty percent for two minutes." In this example, the policy engine may monitor the current value of a port utilization collector over a two-minute period. When a threshold condition is met, the policy engine performs whatever action is prescribed by that policy In one embodiment, the policy engine may use SNMP traps from some SAN devices, for example Brocade switches and Compaq arrays, for performance monitoring. SNMP traps from other SAN elements may simply trigger another discovery cycle.

In one embodiment, the SAN manager 202 may include a policy utility to facilitate policy creation and maintenance. The policy utility may lead a user through the steps of providing the information described above to create user-defined policies. The user may use the policy utility to make changes in existing predefined or user-defined policies as desired.

An alarm is a signal that is generated by a policy when the condition specified in the policy is detected or evaluated as true. An alarm may be triggered if the condition and alarm action are configured in the policy. Note that alarms are associated with alerts, but are not the same. An alarm is an internal signal used by the SAN management system. An alert to the SAN manager 202 is a configurable responses that may result from an alarm being triggered. When an alarm is triggered, the alarm may be referred to as active. In one embodiment, alarms in the SAN management system may be dynamic—the alarm resets itself automatically when the condition monitored by the policy returns to a specified "clear state." The clear state for a condition may specified either manually or automatically, depending on whether the condition is a threshold or a textual comparison condition.

One embodiment of the SAN management system may include an alarm service 222 that may monitor and collect status and performance information from the SAN using both out-of-band (e.g., SNMP) and SAN access layer 204 events. This collector information may then be fed into the policy service 220 to trigger policy actions such as SMTP mail, SAN manager alerts, shell scripts and command files, and logging for reporting purposes.

In one embodiment, the SAN management system may log data collected by the alarm service in a database 226. One embodiment may use the Sybase ASA (Adaptive Server Anywhere) database management system for the database 226.

The conditions available for a policy may be determined by the type of object being monitored. Different types of policy conditions may result in different types of alarms. There are many possible types of conditions for various objects managed by the SAN management server 200. In one embodiment, these conditions may fall into one of two categories, threshold conditions and text comparison conditions.

One type of policy is a threshold condition with action policy. These policies may be used to monitor an object and detect when a particular numeric threshold is reached and sustained for a configurable period. The collector on which a threshold condition is based may provide data in numeric form, for example as numbered units or a percentage. This type of policy may also reset the alarm when the value being monitored returns to a normal, or below threshold value. Both the alarm state and the clear state of a threshold condition may be configured when defining the policy. As an example of a threshold condition with action policy, "If port utilization >90% of capacity for 1 minute, then post a critical alert to the SAN manager and send e-mail to the administrator." A threshold condition with action policy may also provide a condition to reset the alert when the value being monitored returns to a normal, or below threshold value. For example, "If port utilization <=75% for 1 minute, then clear the critical alert."

Another type of policy is a text comparison condition with action policy. This type of policy may be used to evaluate a textual state to determine the status or condition of the resource. The collector on which a text comparison condition is based provides data as one of one or more possible textual states defined for that collector. An example of a textual state is the port status of a switch as "online" or "offline." The clear state of a text comparison condition may be automatically assigned and may be, but is not necessarily, the opposite value of the specified alarm state. For example, if a user specifies "unreachable by SNMP" as an alarm state for a monitored condition, then the clear state for the condition may be automatically set to "NOT unreachable by SNMP."

An exemplary text comparison condition with action policy is "If a specified port's status changes to portTesting, post an alert to the SAN manager with severity information." As another example, "If a specified host's status changes to UnreachableViaIP, post an alert to the SAN manager with severity Warning and send e-mail to the administrator." As yet another example, "If a specified array's environment status changes to Serious, post an alert to the SAN manager with severity Critical, send e-mail to the administrator, and launch array management application ABC from the command line with arguments X, Y and Z."

For every policy, one or more actions to be taken when the specified condition is detected may be configured. Actions may, for example, perform corrective and/or notification functions. One type of policy action is a console alert, which may send an alert to the SAN manager 202 when the specified condition is detected. The desired level of severity associated with the action may be configurable. Another type of policy action is a command or script that executes a command or executable file specified for the action. Yet another type of policy action is to send e-mail notification to one or more specified recipients.

In one embodiment, the policy service 220 may be configured to send traps (e.g. SNMP traps) as notifications to network management platform applications such as Hewlett-Packard OpenView Network Node Manager, Tivoli TME, and others. The policy service traps may be handled like any other traps that are received by the network management application. In one embodiment, trap notification may be configured using the policy utility.

Common Data Model

As mentioned previously, embodiments of the SAN management system may provide a common data model for SAN discovery data (e.g. discovered by explorers) and/or SAN monitoring information (e.g. collected by collectors) from heterogeneous SAN devices. In one embodiment, one or more of the collectors may use explorers to access the SAN components to collect SAN monitoring information from the SAN components.

Figure 13:
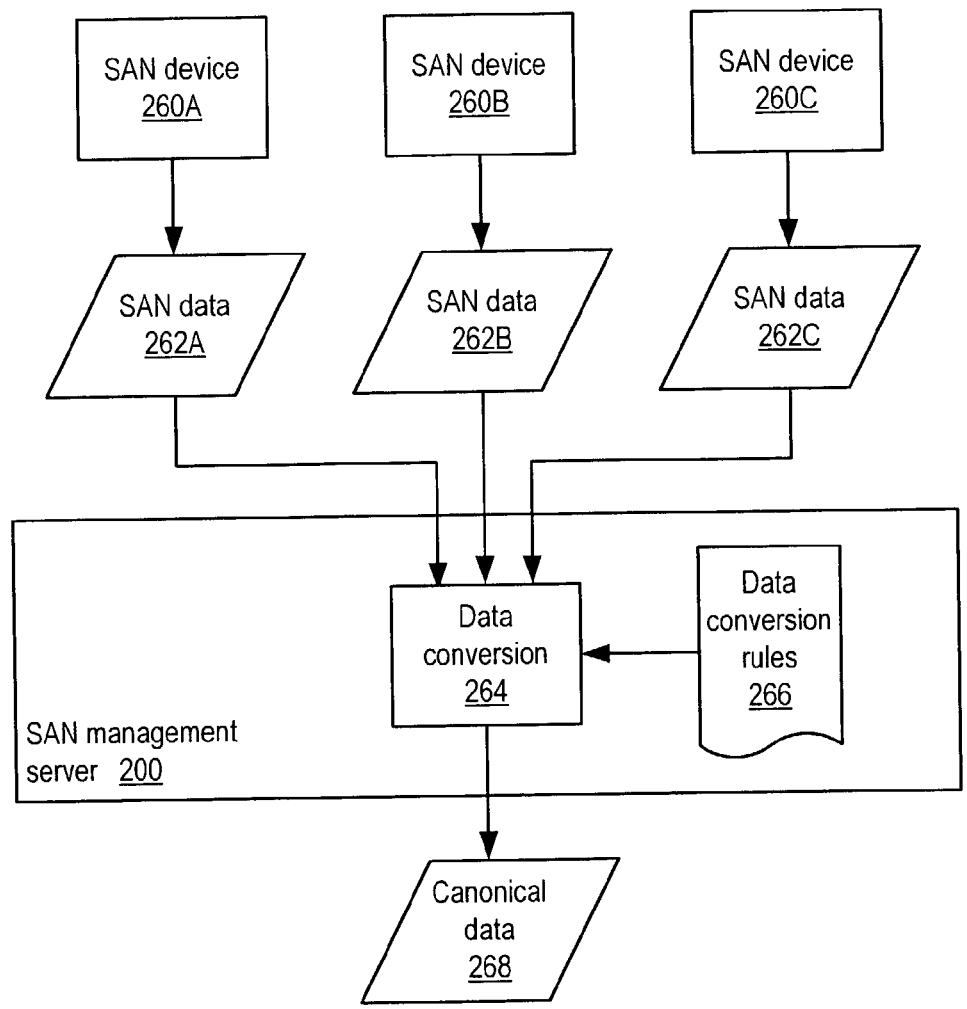
FIG. 13 illustrates converting heterogeneous data to a common data model according to one embodiment.

FIG. 13 illustrates converting heterogeneous data to a common data model according to one embodiment. SAN devices 260 may be from a plurality of vendors, and each vendor may provide a vendor-specific interface mechanism (e.g. an Application Programming Interface (API)) to its devices. Further, vendors may provide different interface mechanisms for different types of devices or even for different models or versions of devices. Each interface mechanism may provide its own specific "language" for communicating with devices of the corresponding type, model or version. Data provided by the interface mechanism may conform to a particular data model supported by the corresponding device. Differences in data models may include one or more of different schemas, different data formats, different data representations, different data structures, and different data organizations, among others.

In one embodiment, the SAN management server 200 may include a data conversion mechanism 264 that may translate discovered and/or collected data 262 in one or more different languages (data models) obtained from a heterogeneous population of SAN devices 260 into canonical data 268 in a uniform language ("common data model"). In one embodiment, the common data model may use a markup language for data representation in canonical data 268. In one embodiment, the markup language may be eXtensible Markup Language (XML). In one embodiment, the common data model may be defined by a set of rules 266. The SAN management server 200 may execute the set of rules to convert heterogeneous SAN data 262 obtained from heterogeneous interfaces into canonical data 268 conforming to the common data model. In one embodiment, the rules 266 may be specified using a markup language (e.g. XML). In one embodiment, rules 266 may be kept in one or more rules files (e.g. XML files). In one embodiment, rules 266 may be stored in and accessed by the SAN management server 200 from a data store.

In one embodiment, data conversion mechanism 264 may be a module or component of the SAN management server 200 that receives heterogeneous data 262 from one or more of explorers and/or collectors in one or more data streams and converts the heterogeneous data 262 into canonical data 268 in accordance with rules 266. In another embodiment, at least some conversion of data 262 into the common data model may be performed by one or more of the SAN management server's explorers and/or collectors.

In one embodiment, canonical data 268 may be provided to the SAN manager or one or more components of the SAN management server (e.g. an alarm service or policy service) for use in monitoring and/or managing the SAN. In one embodiment, canonical data 268 may be stored in a persistent data store that may be accessed, for example, by the SAN management server 200 and/or SAN manager 202, to retrieve portions of the canonical data for use in monitoring and managing the SAN.

In one embodiment, the data conversion mechanism 264 may also use rules 266 to convert data in the common data model into one or more vendor-specific data formats. This may be used, for example, to convert canonical data into data of a format supported by a particular device to send commands including the data to the device. As another example, data from a SAN component may be converted from a data model of the SAN component into canonical data conforming to the common data model, modified on the SAN management server, converted from the common data model back into the data model of the SAN component, and provided to the SAN component (for example, to modify one or more attributes of the SAN component using the SAN management server.) As another example, the data conversion mechanism 264 may be used to convert data from one specific format into canonical data, and then convert the canonical data into another specific format, and thus may perform as a translation mechanism between heterogeneous devices.

In one embodiment, the SAN may use Simple Network Management Protocol (SNMP) for monitoring and managing systems and devices in the SAN network. The data being monitored and managed by SNMP is defined by a MIB, the specification and formal description of a set of objects and variables that can be read and possibly written using the SNMP protocol. However, SAN device vendors may not follow a standard to SNMP Management Information Base (MIB). In one embodiment, the SAN management server 200 may discover information corresponding to SAN devices 260 from the heterogeneous devices' SNMP MIBs. Further, one or more of the SAN management server's collectors may be based on variables defined in a SAN component's SNMP MIB. This discovered information and/or collected data may be converted to canonical data 268 by conversion mechanism 264. Canonical data 268 may be provided to the SAN manager and/or one or more components of the SAN management server 200, and/or may be stored in a data store that may be accessed to retrieve the canonical data, for example, by the SAN management server 200 and/or SAN manager, for use in monitoring and managing the SAN.

In one embodiment, using rules 266, the SAN management system may support SAN components having heterogeneous interface mechanisms without requiring modification of SAN management system software. In one embodiment, rules 266 may be edited to include rules for mapping discovery and/or monitoring data from the interface mechanism of a new or modified SAN component to the common data model, and the modified rules 266 may then be used for converting SAN discovery and/or SAN monitoring data, in formats supported by the interface mechanism of the SAN component, into canonical data 268.

As an example, one vendor may specify the capacity of a device in bytes, while another may specify the capacity in blocks of various numbers of bytes, e.g. 512-byte units or 2048-byte units. In some cases, this capacity may include only usable storage space, and in other cases, the full capacity of the device including metadata areas of the device. To overcome these difficulties, in one embodiment the SAN management server 200 may convert the "raw" data to canonical data 268 conforming to the common data model. For example, the common data model may convert all capacity data into bytes, and may include data for usable storage space and all storage space including one or more metadata areas. In one embodiment, the canonical data 268 may be stored in a persistent store, which may be queried, for example by the SAN management server 200 and/or SAN manager, for information, which may be provided to the requestor as canonical data 268.

Figure 14:
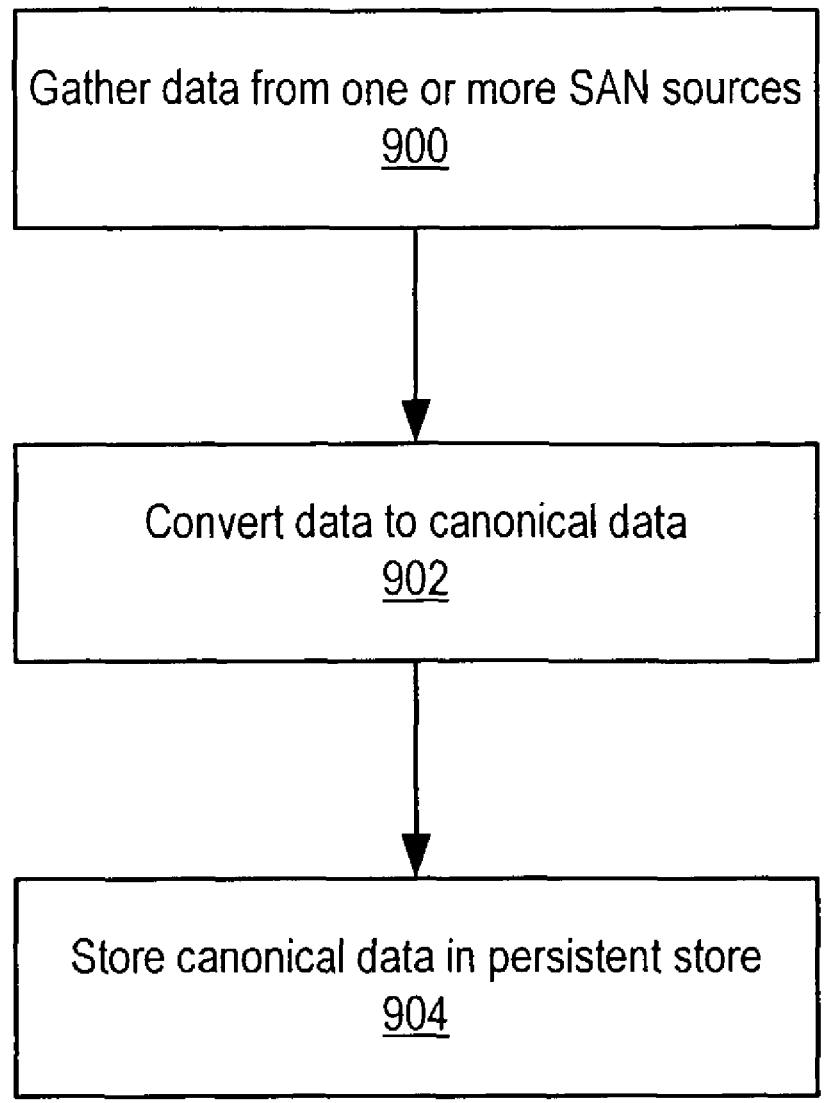
FIG. 14 is a flowchart illustrating one embodiment of a method for converting heterogeneous SAN data gathered by the SAN management system to canonical data according to a common data model.

FIG. 14 is a flowchart illustrating one embodiment of a method for converting heterogeneous SAN data gathered by the SAN management system to canonical data conforming to a common data model. As indicated at 900, the SAN manager server may gather heterogeneous data from one or more SAN sources. The data may include, for example, data discovered by the SAN access layer and/or SAN monitoring data collected by the SAN management server. The SAN management server may convert the heterogeneous data to canonical data as indicated at 902. The canonical data may be stored in a persistent data store as indicated at 904. The persistent store may then be accessed to retrieve data from one or more of the sources in the canonical form.

Storage Access Control

The SAN management server and SAN access layer may discover the SAN and perform zoning functions, monitor SAN status and performance information, provide the information to the SAN manager, detect SAN events, and execute policies including performing policy actions such as notifications and alerts to the SAN manager, among other functions. The SAN manager may perform as a centralized point for viewing the SAN and generating SAN reports based upon SAN information received from the SAN management server and SAN access layer, among other functions. In addition, the SAN manager may provide a centralized point for configuring and managing the SAN and for configuring and managing heterogeneous components of the SAN. Embodiments of the SAN management system may provide one or more utilities, tools and services that, for example, may help administrators and other users maintain a quality of storage service for SAN-attached servers, and which may be available to the administrator and other user through the SAN manager user interface. In one embodiment, one or more of the utilities, tools and services may be launched in-context from the SAN manager. For example, one or more SAN objects (e.g., SAN device, device type, resource group, etc.) may be selected in the SAN manager user interface and a utility applicable to the selected SAN object(s) may be launched for the SAN object(s). These utilities, tools and services provided by the SAN management system may include one or more of, but are not limited to, resource group, zoning, and LUN security utilities, tools and services, which are described below.

Groups

In one embodiment, the SAN management system may support the creation and management of user-defined groups of SAN objects. In one embodiment of the SAN management system, the SAN manager may serve as a centralized point from which a SAN administrator or other user may create and manage groups of SAN objects, including groups of heterogeneous components. A group may be defined as an arbitrary set of SAN elements defined by an administrator to help organize and provision resources. Groups may be implemented and used by storage administrators to identify and manually provision available storage devices 104 that match the quality of service requirements of particular user groups or applications. Groups may be used to represent the storage resources available to a particular host 102, sets of storage devices 104 with similar quality of service attributes, or for generic organizational purposes.

One embodiment of the SAN management system may provide a group utility for creating and managing logical groups of SAN objects including hosts 102, storage device 104 interconnects, other groups, and other objects that may be members of a group. In one embodiment the group utility may be provided through the SAN manager. The group utility may facilitate the management of end-user resources as logical groups of SAN objects. The group utility may be used to create logical storage groups where device membership may be based on zoning, LUN masking, hosts etc., and may also be based on the need for a collection of devices to be viewed as one entity for SAN management system activities such as reporting, configuring and monitoring SAN resources.

In one embodiment, the SAN management system may support one or more types of groups, including, but not limited to, generic groups, storage accounts, and storage groups. Generic groups may include switches, hosts 102, storage devices 104, and/or nested groups of any group type. A generic group may include any type of object that can be grouped. Generic groups may be defined and used as flexibly as the administrator likes. Storage accounts may include hosts 102, storage devices 104, and/or nested groups (storage accounts or storage groups only). A storage account may include one or more host objects and all the storage that the administrator assigns to them. Storage accounts may be used to keep track of the storage resources provisioned for hosts on the SAN. Storage groups may include storage devices 104 and/or nested groups (storage groups only). Storage groups may be used to categorize storage resources by quality of service criteria including, but not limited to, cost, performance, capacity and location.

In one embodiment, groups may be nested within other groups. Nested groups may not introduce cyclic dependency. That is, if Group B is nested within Group A, Group A cannot then be nested within Group B, creating a loop. In one embodiment, the SAN management system checks for cyclic dependency and prevents users from creating such a configuration. A generic group may include any other type of group nested within it. Storage accounts may include other storage accounts or storage groups, but may not include generic groups. Storage groups may include only other storage groups, and may not include storage accounts or generic groups.

In one embodiment, there is no member exclusivity applied to generic groups. An object may have membership in multiple generic groups. In one embodiment, in certain cases, if an object is already a member of a group, it may not become a member of another group. For example, if an object is already a member of a storage account, it may not be added to another storage account. As another example, if an object is already a member of a storage group, it cannot be added to another storage group. As yet another example, an object cannot be added to a group twice, for example by adding the object individually and adding a nested group in which the object is a member. If the object is first added individually, the nested group may not be added afterward, and vice versa. In one embodiment, member exclusivity may not apply when nesting groups. By nesting one group within another, objects within the nested group become members of both groups.

One embodiment of the SAN manager may provide a groups view through which the user may view and manage groups of SAN resources. In one embodiment, groups may be represented as directories including sub-branches for each type of member object. The groups view may be used, for example, to locate a particular group by name in order to view the storage devices, hosts, switches, or sub-groups included in that group. In one embodiment, a group may be selected and a SAN management system tool or utility, or optionally a third-party tool or utility, may be launched "in-context" to perform one or more operations on the group or member objects in the group.

Group information for SAN objects may be displayed in one or more other SAN manager views and panes. In one embodiment, selecting a group in the groups view (or in one or more other views of the SAN manager) may highlight the group and/or members of the group and/or display group information in other views of the SAN manager. For example, when a group is selected in the groups view, its member objects may be highlighted in a topology map of the SAN manager. As another example, an attributes pane may display a group objects table when a group is selected.

In one embodiment, the SAN management system may be used to generate reports on groups of SAN objects. For example, capacity reports may display the storage capacity available in a user-defined group. As another example, groups inventory reports may provide information about one or more groups such as group name, description, total storage capacity, number of hosts, number of devices, number of switches, and number of nested groups. One embodiment may track LUN allocation to storage groups, and may provide one or more storage group LUN allocation reports that the user may use in tracking and managing storage group LUN allocation.

In one embodiment, the user may specify group membership as one of one or more criteria used for finding LUNs using the LUN query tool of the SAN manager.

Zoning

The flexible connectivity capabilities of the SAN storage model may pose security risks. Zoning helps alleviate that risk by providing a means of controlling access between objects on the SAN. By creating and managing zones, the user may control host 102 access to storage resources. In one embodiment, the SAN manager may serve as a centralized point from which an administrator or other user may create and manage zones of SAN objects, including zones of heterogeneous components.

A zone is a set of objects within a SAN fabric that can access one another. Zones and their member objects may be defined in zoning tables within the switches on the SAN fabric 100. When zoning is implemented on a SAN fabric 100, the switches consult the zoning table to determine whether one object is permitted to communicate with another object, and restrict access between them unless they share a common membership in at least one zone.

Fabric zoning occurs at the level of individual nodes or ports attached to the SAN fabric 100. Zoning-enabled fabrics 100 may include zoning tables that define each zone along with its member objects. These zones function similar to virtual private networks (VPNs) on traditional networks.

There may be one or more ways to use zoning to improve the security and organization of the SAN. Examples of uses of zoning include, but are not limited to: isolating storage resources for different operating environments, such as separating UNIX storage from Windows NT storage; setting aside resources for routine backups; securing areas of the SAN for storage of sensitive data; and creating dedicated resources for closed user groups.

In one embodiment, the SAN management system may provide methods to enforce the access restrictions created by zones on the SAN. These methods may include two methods that correspond to the forms of zoning commonly referred to as soft zoning and hard zoning.

Soft zoning, also called advisory zoning, may be enforced by filtering the visibility of objects on the SAN, for example through a Name Service, such that queries only return objects that share at least one zone membership with the object. At boot time, a SAN host 102 or device requests a list of the World Wide Names (WWNs) on the SAN fabric 100 from the fabric Name Service. The Name Service may consult the zoning table and filter out of its response any WWNs that are not zoned together with the host 102 or device making the request. In this way, a host 102 on the SAN is only made aware of devices whose WWNs are zoned together with the hosts's HBA port. Soft zoning is flexible because it does not rely on an object's physical location on the SAN. If its physical connection to the SAN fabric 100 changes, its zone memberships remain intact because the zone memberships are based on the WWNs of the object's ports. However, soft zoning may have security vulnerability in that it does not actively prevent access between objects that belong to different zones. Even if the Name Service does not supply a SAN host 102 with the WWN of a device that is zoned away from the host 102, a user who knows that WWN (or a hacker trying different combinations of addresses) may still send Fibre Channel packets from the host 102 to that device.

When hard zoning is implemented, a Fibre Channel switch may actively block access to zone members from any objects outside the zone. This may be performed at the level of ports on the switch. Hard zoning may also be referred to as switch port zoning. The switch checks each incoming Fibre Channel packet against its routing table to see whether the packet may be forwarded from the entry port to its destination port. Switch port zoning offers strong security because it actively segregates zone members from the rest of the SAN fabric 100. However, hard zoning may lack the flexibility of soft zoning, since an object attached to a zoned switch port loses its zone membership when it is physically disconnected from that switch port and moved elsewhere on the SAN. New objects attached to the switch port may inherit the zone memberships of that port, so planning and record keeping by the administrator may be needed to avoid breaks in security when moving objects around on the SAN.

In one embodiment, the SAN management system may support the zoning of objects on the SAN including, but not limited to, switch ports, hosts 102, and storage devices 104 including, but not limited to, storage arrays, JBODs, and individual storage devices. In one embodiment, the SAN management system may support switch zoning though application program interfaces (APIs) provided by switch vendors, allowing for both hard (port-level) and soft (advisory, WWN) zoning. Zoning may be implemented and used by storage administrators using one or more SAN management system services, tools and/or utilities for allocating storage resources and managing SAN security, and optionally one or more third-party tools, utilities or applications. In one embodiment, the SAN manager may serve as a centralized point from which a manager or other user may access SAN management system and/or third-party services, tools, applications, and/or utilities to create and manage zones on the SAN, including zones containing heterogeneous SAN objects.

In one embodiment, the SAN management system may provide a zone utility that may facilitate the creation, modification, and deletion of zones. In one embodiment, the zone utility may be provided through the SAN manager. The zone utility may provide storage zone definition, creation and management. The zone utility may be used to administer zones directly and visually; and may reduce or remove the need to use telnet commands or proprietary, hardware-specific Web-based solutions. The zone utility may facilitate the creation of new zones and edits to existing zones. The zone utility may automatically filter the list of objects on the SAN and present a list of objects that are available to be added to a zone. In one embodiment, an object may be zoned based on the World Wide Name (WWN) of the object node, the WWN of an individual port under the object node, or the switch port to which the object is attached. In one embodiment, users may administer zoning though the zone utility or optionally through a command line interface. In one embodiment, a user may select a SAN object in the SAN manager user interface (e.g. by right-clicking on the object) and select an option (e.g. from a menu) to add the object to or remove the object from a zone.

There may be no industry-wide standard for zoning, and thus different vendors' switches may implement switch zoning in different ways. Thus, one embodiment of the SAN management system may use a switch-neutral approach to zoning. This embodiment may not specify, for example, whether hard zoning (port-level zoning) or soft zoning (based on WWNs) should be applied in any particular case. In this embodiment, implementation details such as these may be left up to the switch vendor.

Embodiments may also provide datapath zoning control for interconnects from vendors such as Brocade, QLogic, and McDATA using the zone utility to abstract the individual interconnects' complex zoning tools to simplify creating, adding to, and deleting zones.

LUN Security

Ensuring that SAN applications have the required storage resources may include providing secure storage from storage devices 104 (e.g. disk arrays, tape backup devices, etc.) to hosts 102 within the SAN. In one embodiment, the SAN management system may integrate storage masking from various array providers, for example Hitachi Data Systems, Compaq and EMC, to hosts 102 in the SAN. LUN (Logical Unit Number) security is the collective name given to the operations involved in making storage device 104 resources available to hosts 102 on a SAN. In one embodiment of the SAN management system, LUN security may provide granular control over host 102 access to individual LUNs within an array or other collection of potentially heterogeneous storage devices. LUN security may include LUN locating or searching, LUN binding, LUN masking, and fabric zoning. In one embodiment, the SAN manager may serve as a centralized point from which the administrator or other user may manage LUN security for heterogeneous SAN components.

A LUN is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk may have a single logical unit. Tape drives and array controllers may incorporate multiple logical units to which I/O commands can be addressed. Each logical unit exported by an array controller corresponds to a virtual disk.

Figure 15:
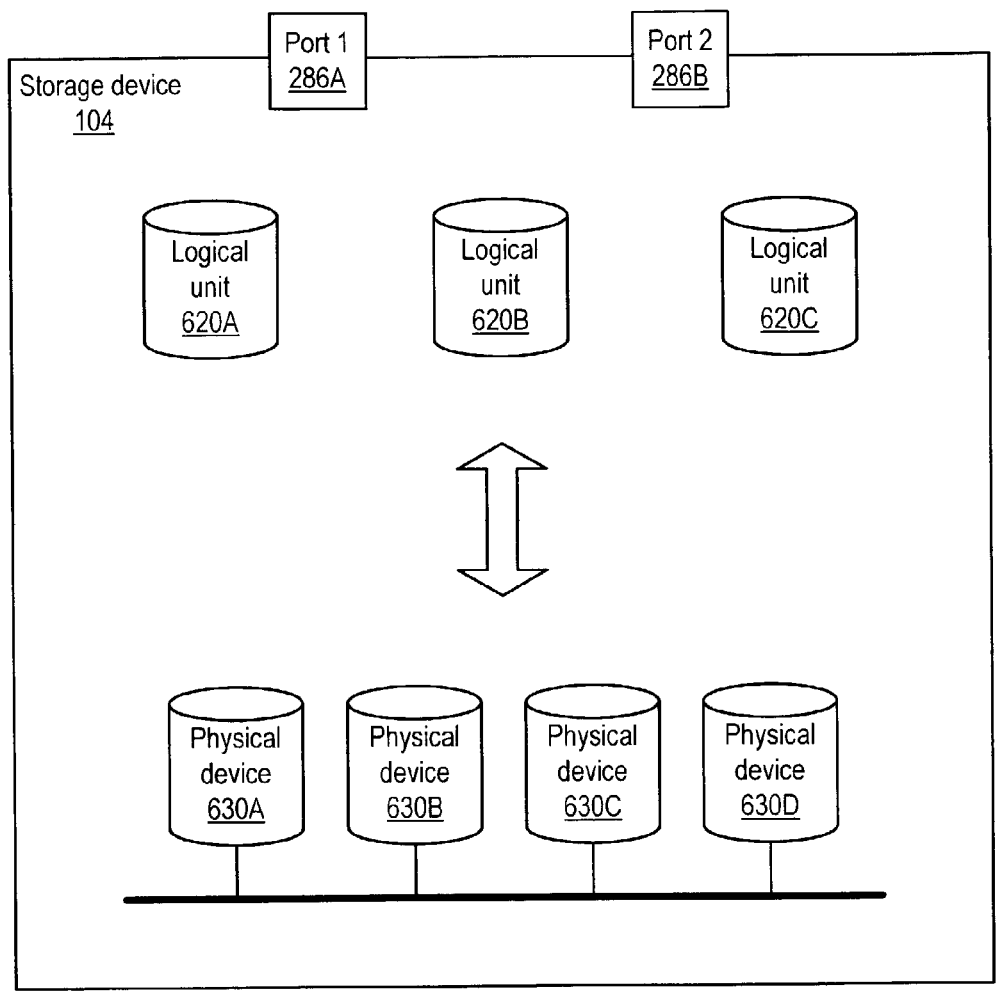
FIG. 15 illustrates a storage device with ports, logical units and physical devices according to one embodiment.

LUN security may include LUN binding, the creation of access paths between an addressable unit (which may also be referred to as an AddrUnit, an AU, a unit, a volume, a logical unit, a logical disk, or a logical device) within a disk array and a port on the array. FIG. 15 illustrates a storage device 104 with multiple physical devices 630 (e.g. physical disks within a disk array) according to one embodiment. The storage device 104 may include one or more logical units 620. Each logical unit 620 may map onto one or more of the physical devices 630. Storage device 104 may include one or more ports 286 which may be bound to logical units 620.

Figure 16:
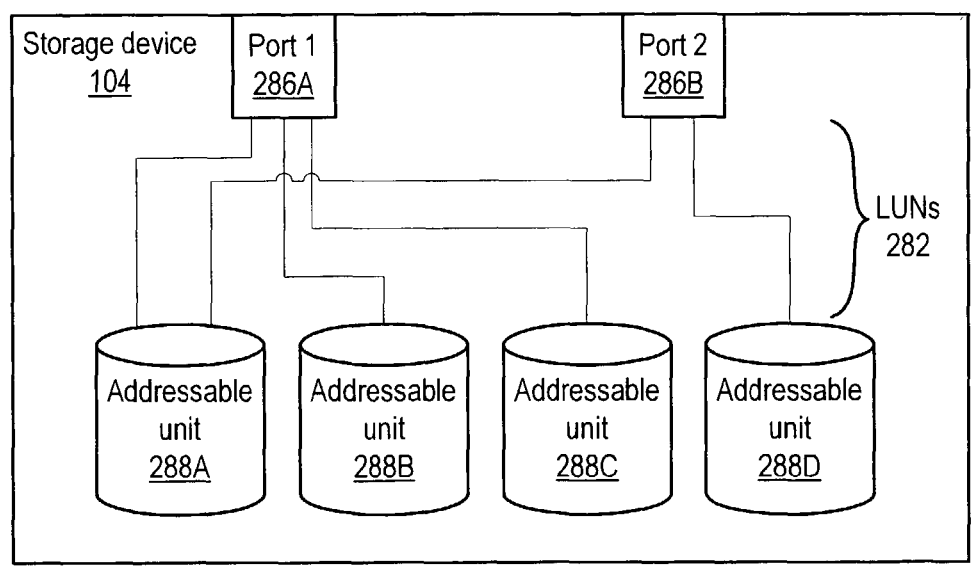
FIG. 16 illustrates LUN binding according to one embodiment.

FIG. 16 illustrates LUN binding according to one embodiment. In the LUN binding process, an AU 288 is bound to a specified array port 286 (e.g. array port 286A or 286B) in a specified storage device 104 (e.g. a storage system/disk array)). This results in the creation of a LUN 282. AUs 288A, 288B, 288C, and 288D are storage volumes built out of one or more physical discs within the storage device 104. Array ports 286A and 286B are connected to the SAN fabric 100 and function as SCSI targets behind which the AUs 288 bound to those ports 286 are visible. "LUN" is the term for the access path itself between an AU 288 and an array port 286, so LUN binding is actually the process of creating LUNs 282. However, a LUN 282 is also frequently identified with the AU 288 behind it and treated as though it had the properties of that AU 288. For the sake of convenience, a LUN 282 may be thought of as being the equivalent of the AU 288 it represents. Note, however, that two different LUNs 282 may represent two different paths to a single volume. A LUN 282 may be bound to one or more array ports 286. A LUN 282 may be bound to multiple array ports 286, for example, for failover, switching from one array port 286 to another array port 286 if a problem occurs.

Figure 17:
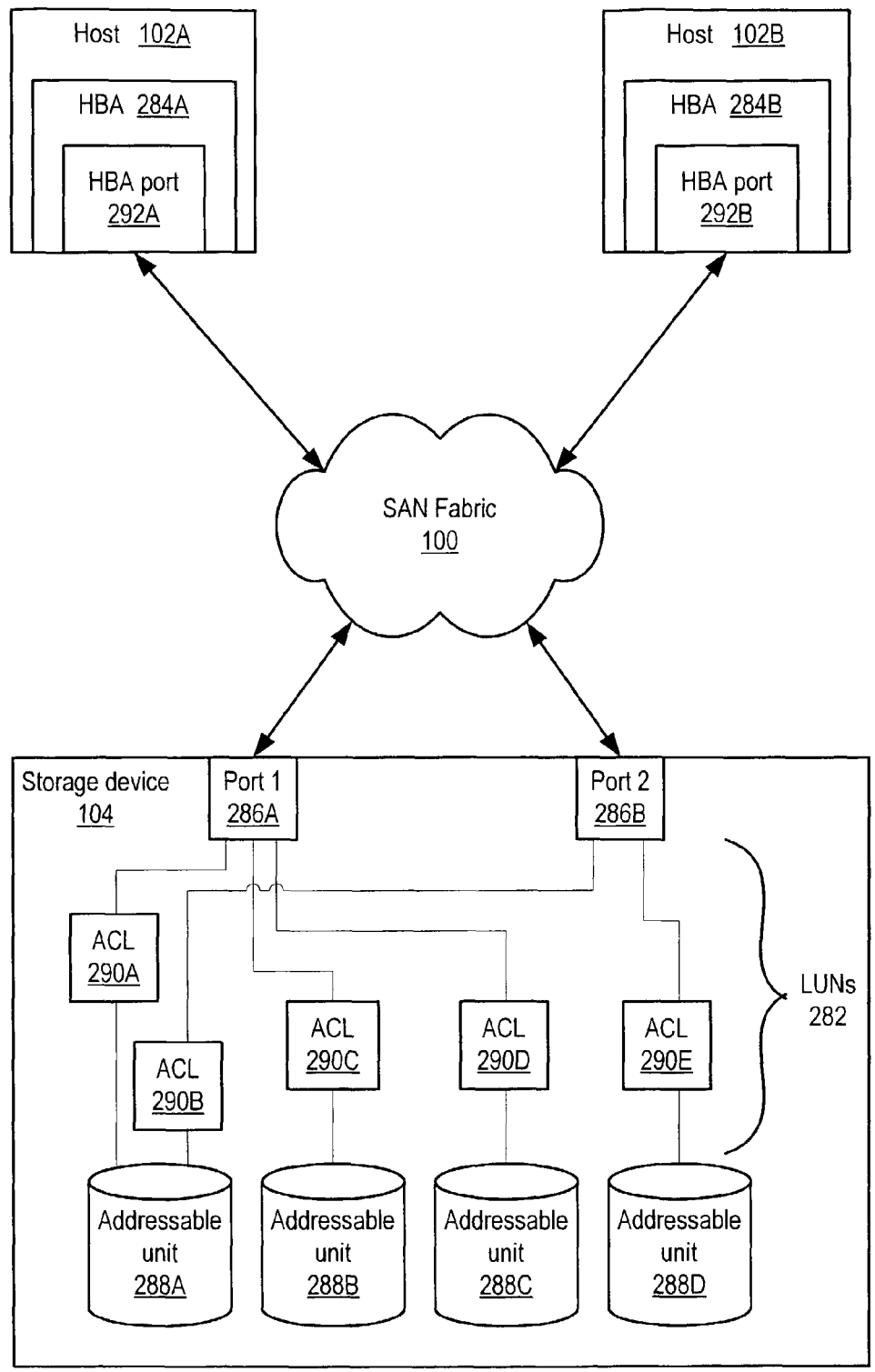
FIG. 17 illustrates LUN masking according to one embodiment.

LUN security may also include LUN masking to enable access to a particular Addressable Unit for a host on the SAN. FIG. 17 illustrates LUN masking according to one embodiment. LUN masking is a security operation that indicates that a particular host 102 (e.g. host 102A or 102B), HBA (Host Bus Adapter) 284 (e.g. HBA 284A or 284B), or HBA port 292 (e.g. HBA port 292A or 292B) is able to communicate with a particular LUN 282. In the LUN masking process, a bound AU 288 (e.g. AU 288A, 28813, 288C or 288D) may be masked to a specified HBA port 292, HBA 284, or host 102 (e.g. all HBAs on the host) through a specified array port 286 in a specified storage device 104. When an array LUN 282 is masked, an entry is added to the Access Control List (ACL) 290 (e.g. ACL 290A, 290B, 290C, 290D, or 290E) for that LUN 282. Each ACL 290 includes the World Wide Name of each HBA port 292 that has permission to use that access path—that is, to access that AU 288 through the particular array port 286 represented by the LUN 282.

LUN masking may be thought of as the removal of a mask between an AU 288 and a host 102 to allow the host to communicate with the LUN 282. The default behavior of the storage device 104 may be to prohibit all access to LUNs 282 unless a host 102 has explicit permission to view the LUNs 282. The default behavior may depend on the array model and, in some cases, the software used to create the AU 288.

Figure 18:
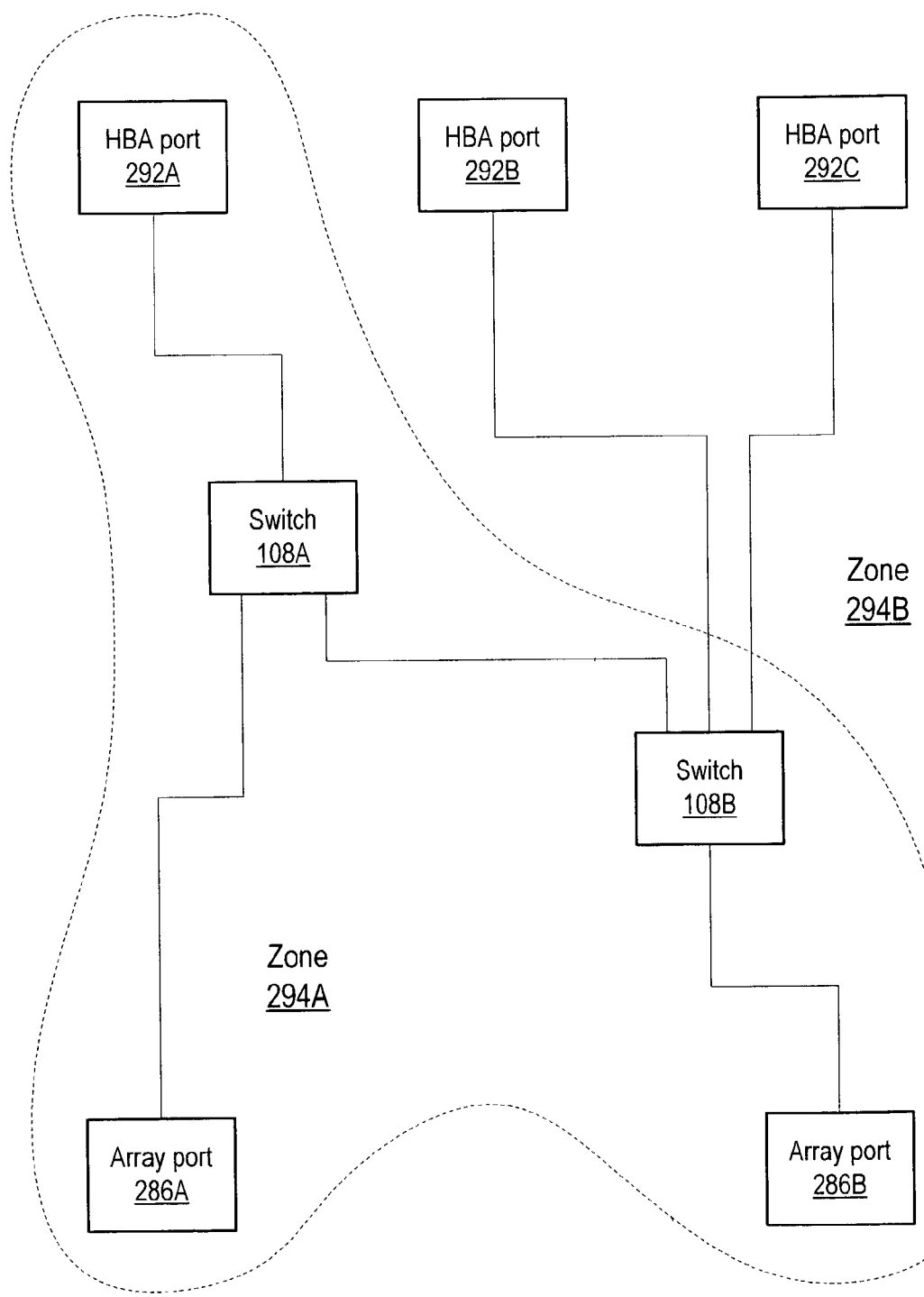
FIG. 18 illustrates fabric zoning according to one embodiment.

LUN security may also include fabric zoning. FIG. 18 illustrates fabric zoning according to one embodiment. After a LUN is masked to an HBA port 292 (e.g. HBA port 292A, 292B or 292C) in a host, the zoning configuration of the SAN fabric 100 may still prevent the host from accessing the AU behind that LUN. In order for the host to see the AU and create an Operating System (OS) handle for it, there must be at least one zone on the fabric 100 that contains both the HBA port 292 (e.g. HBA port 292A, 292B or 292C) and the array port 286 (e.g. array port 286A or 286B) to which the AU is bound. A zoning operation may be required if the HBA port 292 and array port 286 are not already zoned together. Zoning operations may include creating a new zone 294 and adding the array port 286 and the HBA port 292 to an existing zone 294. Zones 294 may also include one or more ports on one or more fabric devices (e.g. switches 108A and 108B) in the device path between the array port 286 and the HBA port 292. Fabric zoning occurs at the level of individual nodes or ports attached to the SAN fabric. Zones and their member objects may be defined in zoning tables within the switches 108 on the SAN fabric. When zoning is implemented on a SAN fabric, the switches 108 consult the zoning table to determine whether one object is permitted to communicate with another object, and restrict access between them unless they share a common membership in at least one zone.

In FIG. 18, zone 294A includes HBA port 292A, the array ports 286A and 286B through which HBA port 292A may access LUNs bound to the array ports 286, and the switch ports on switches 108A and 108B through which HBA port 292A and array ports 286 are coupled. Zone 294B includes HBA port 292C, array port 286B through which HBA port 292C may access LUNs bound to the array port 286B, and the switch port(s) on switch 108B through which HBA port 292C and array port 286B are coupled. HBA ports 292A, 292B and 292C may be on the same host or on different hosts and, if on the same host, on the same HBA or on different HBAs. Array ports 286A and 286B may be on the same storage system or on different storage systems. For more information on zoning, see the description of zoning above.

Figure 19:
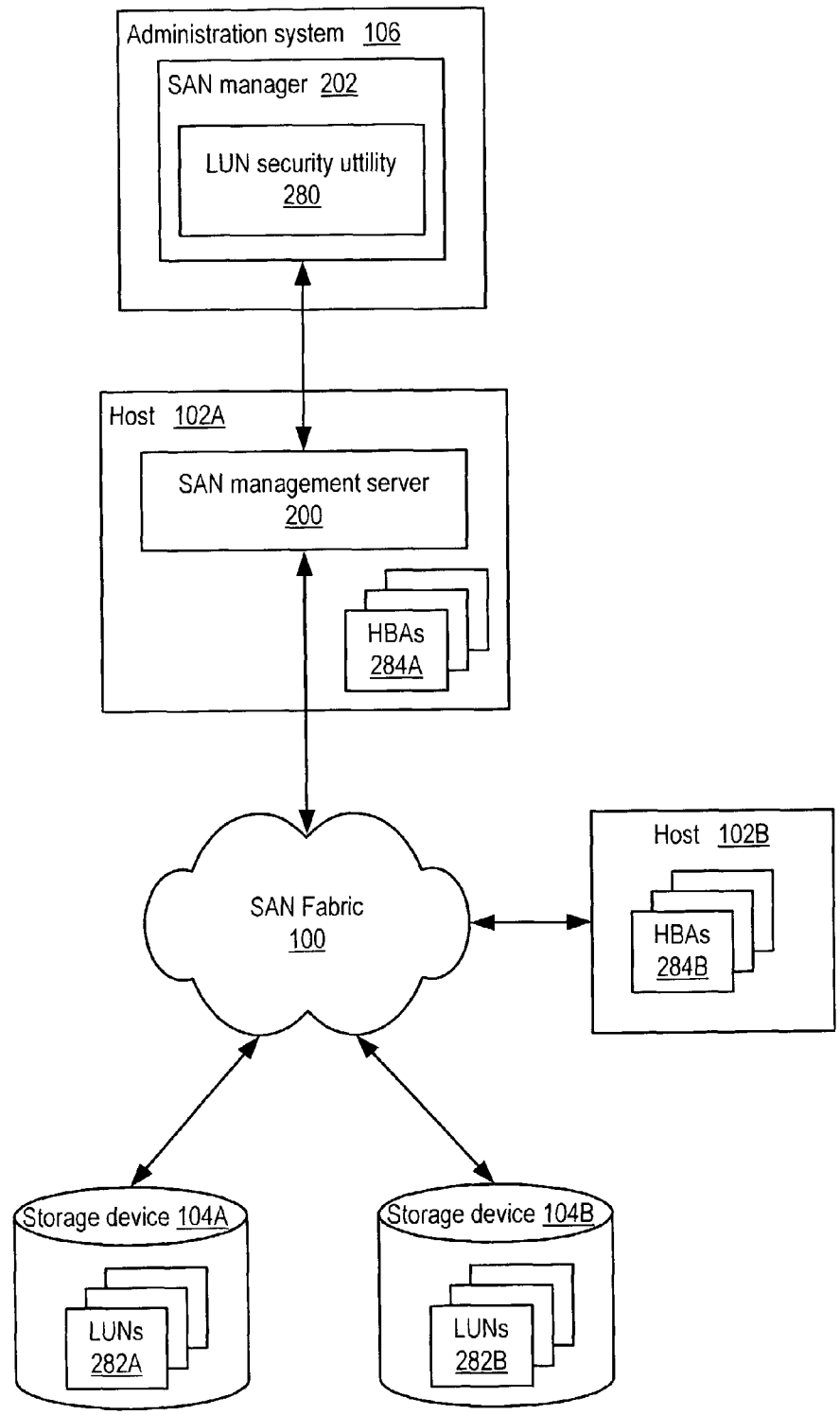
FIG. 19 illustrates a SAN with a LUN security utility according to one embodiment.

In one embodiment as illustrated in FIG. 19, the SAN management server 200 may discover SAN components including, but not limited to, one or more storage devices 104 (e.g. storage devices 104A and 104B) each including one or more addressable storage units and one or more fabric ports for coupling to the SAN, and one or more host systems 102 each including one or more host bus adapters (HBAs) 284 which each provide host adapter ports for coupling to the SAN. The SAN manager 202 client may access the SAN management server to provide a user interface for selecting addressable storage units to be made available to selected host adapter ports and to communicate with the SAN management server to create access paths between selected addressable storage units and selected fabric ports of the storage systems, enable access to the selected addressable storage units for the selected host adapter ports, and zone the selected storage system fabric ports in a common fabric 100 zone with the selected host adapter ports.

In one embodiment, the SAN management system may provide a LUN security utility 280, which may combine LUN security operations including, but not limited to, searching for and locating one or more LUNs 282, LUN selection, LUN to disk array port binding, LUN masking and fabric zoning operations in one utility. In one embodiment, the LUN security utility 280 may be provided to the user through the SAN manager 202 user interface. In one embodiment, the SAN manager may run on an administration system 106. In one embodiment, the LUN security utility 280 may provide a central utility that, through a graphical user interface, guides the user through configuring LUN security operations (finding and selecting one or more LUNs, binding, masking and zoning) and allows the user to execute the configured LUN security operations with a single operation, for example, a single click of a button in the user interface. Thus, the LUN security operations (finding and selecting one or more LUNs, binding, masking and zoning) may be performed as a single operation from the perspective of the user.

In one embodiment, if any portion of the LUN security operation (binding, masking, and/or zoning) configured and initiated by the user from the LUN security utility fails to successfully complete, the LUN security utility may "back out" of the entire configured LUN security operation, and may undo any portions of the LUN security operation already completed and/or leave undone any portions not yet performed. By so doing, the LUN security operation may leave the various SAN components being operated on by the LUN security operation in their original state before the start of the operation if any portion of the operation fails. Thus, LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

The SAN management system may provide a single point of management from logical units of storage devices 104 to interconnect to SAN-connected hosts 102. The LUN security utility 280 may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it).

The LUN security utility 280 may guide users through searching and locating, selecting, binding, masking and zoning operations. The LUN security utility 280 may be used to bind LUNs 282 to ports on the array and further mask the LUN(s) to target host HBA 284 ports. The LUN security utility 280 may include safety controls to ensure that invalid LUN binding and LUN masking configurations are not created. The LUN security utility 280 may support multiple storage array vendors, and thus may serve as a centralized utility for performing LUN security operations for heterogeneous SAN components.

Using the LUN security utility 280, users may specify LUNs 282 and disk array ports to bind. In one embodiment, the SAN management system may provide a LUN query tool for finding and selecting LUNs 282. Users may also use the LUN security utility 280 to select hosts' HBA 284 ports and LUNs 282 for LUN masking/security. The LUN security utility 280 may allow users to select a zone that contains the array port and a host's HBA port(s). If no such zone exists, the LUN security utility 280 may allow users to create a new zone or add the array port and the host's HBA 284 port(s) to an existing zone.

The component of the SAN management system that manages SAN discovery is the SAN access layer (not shown). Functions of the SAN access layer may include discovery and zoning. In one embodiment, the SAN access layer may be a component or "layer" of the SAN management server 200. In one embodiment, the SAN access layer may include one or more explorers (e.g. disk array explorers) that may discover storage devices 104 (e.g. disk arrays and enclosures) and information about the storage devices 104 such as the storage devices' ports, addressable units and LUNs 282. In one embodiment, the SAN access layer may discover LUNs 282 that are not masked to HBA 284 ports on discovered hosts 102 on the SAN. In one embodiment, the SAN access layer may also include one or more explorers (e.g. HBA explorers) that may interact with SAN hosts 102 to discover information about the hosts 102 such as the hosts' HBAs 284, HBA ports and device paths. In one embodiment, the SAN access layer may also include one or more explorers (e.g. zoning explorers) that may discover zone names and attributes Information about discovered SAN objects such as zones, hosts 102, HBAs 284, HBA ports, storage devices 104, array ports, addressable units and LUNs 282 may be provided to the SAN manager 202 and the SAN management server 200 by the SAN access layer. The SAN management server 200 may use the provided information, for example, to configure collectors to collect information on the discovered SAN objects. The SAN manager 202 may use the provided information, as well as collected SAN data from the SAN management server 200, in one or more displays of SAN information.

The user may launch the LUN security utility 280 from the SAN manager 202. The discovered SAN objects (e.g., zones, hosts 102, HBAs 284, HBA ports, storage devices 104, array ports, addressable units and LUNs 282) provided to the SAN manager 202 by the SAN access layer and/or SAN management server 200 may be provided to the user in the LUN security utility 280, and the user may locate and select from the objects when configuring LUN security operations using the LUN security utility 280 as described herein. As examples, array ports and addressable units may be selected for binding to create LUNs 282, LUNs 282 may be located and selected, and hosts 102, HBAs 284 and/or HBA ports may be selected to mask to the LUNs 282; and zones may be created and/or selected to which the HBA 284 ports and LUNs 282 are to be added. After selecting the SAN objects to be operated upon using the LUN security utility 280, the LUN security operations (e.g. binding, masking and zoning) may be performed as a single operation from the perspective of the user through the LUN security utility 280.

The LUN security operations as specified by the user in the LUN security utility 280 may be performed to establish device paths in the SAN. In one embodiment, the SAN access layer may perform the LUN security operations (e.g. binding, masking and zoning) as specified by the user in the LUN security utility 280. In one embodiment, the SAN access layer may pass LUN security commands generated by the LUN security utility to the disk arrays' 102 management interfaces for execution using the disk array explorers. In one embodiment, the SAN access layer may pass LUN security commands generated by the LUN security utility 280 to the hosts 102 for execution using the HBA explorers. In one embodiment, the SAN access layers may pass LUN security commands generated by the LUN security utility 280 to the fabric devices for execution using the zoning explorers.

Figure 20:
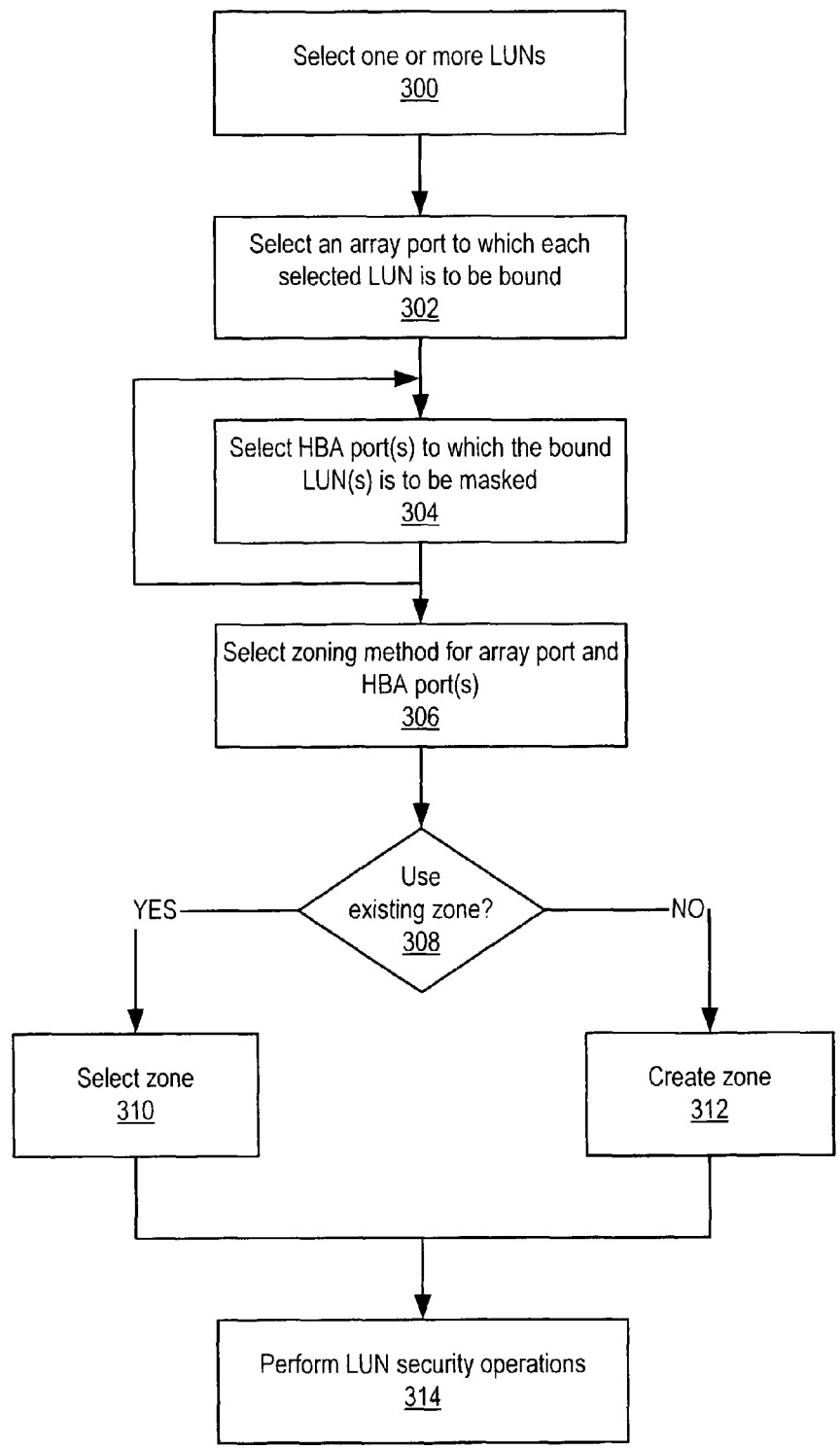
FIG. 20 illustrates a method for performing LUN security tasks using the LUN security utility according to one embodiment.

FIG. 20 illustrates a method for performing LUN security tasks using the LUN security utility according to one embodiment. The LUN security utility may guide the user through the various steps to create access to an array LUN for a host HBA port. In one embodiment, the LUN security utility may detect and prevent invalid operations. To make a LUN accessible to a host port, the user may first launch the LUN security utility, for example from the SAN manager 202. The LUN security utility may display discovered disk arrays and their LUNs. The user may then expand an array in the list and select one or more LUNs from the list as indicated at 300.

In one embodiment, a LUN query tool may be provided that may be used to find a LUN in the list. The LUN query tool may be launched in-context from the LUN security utility. The user may use the LUN query tool to search for LUNs that meet desired specifications such as device vendor, storage type, capacity, configuration, cost, and location. From the search results, the user may highlight the LUN(s) the user desires to manage. When the LUN query tool is closed, the user may be returned to the LUN security utility, where the LUN specified using the LUN query tool is selected in the list. See the LUN query tool description below.

Once a LUN is selected, the user may use the LUN to select an array port to which the LUN is to be bound as indicated at 302. The user may interact with the LUN security utility to display array ports to which the selected LUN can be bound. In one embodiment, array port selection may be limited to those array ports already bound to the selected LUN on a discovered fabric. In one embodiment, if the array does not support user-configurable LUN binding, ports to which the LUN is already bound may be displayed, and the user may select an array port to which the LUN is already bound.

Once the array port to bind the LUN to is selected, the user may use the LUN security utility to select the HBA port(s) to which the bound LUN is to be masked as indicated at 304. The user may interact with the LUN security utility UI to display available host ports (HBA ports) to which the bound LUN is to be masked. Displayed hosts are in the same fabric as the selected array port. Discovered hosts and created hosts are candidates for LUN masking. In one embodiment, a displayed host may be expanded to display its HBAs, and a displayed HBA may be expanded to display its HBA ports. The user may select an HBA port to which the LUN is to be masked from the displayed HBA ports. In one embodiment, to add all the ports on an HBA, the user may select the HBA in the list. To add all the ports on all the HBAs in a host, the user may select the host itself.

The selected HBA ports, HBA or host (and their parent objects) may be added to a list of objects to which the selected LUN will be masked. The LUN security utility may display all HBA ports (and their parent objects) which have been added and to which the LUN will be masked. The process of selecting and adding HBA ports, HBAs and/or hosts may be repeated for each object to which the user desires to mask each seclected LUN. In one embodiment, the user may remove added HBA ports, HBAs, and hosts from the list.

In one embodiment, if the user desires to mask the LUN to an undiscovered host on the fabric, the user may first manually create the host object. One embodiment of the SAN management system may provide a host utility with which the user may create a new host object. When the new host is created, the new host may appear in the LUN security utility.

The LUN security utility may then assist the user in zoning. As indicated at 306, using the LUN security utility, the user may select the desired zoning method, for example soft (WWN) zoning or hard (switch port) zoning, that the user wishes to use to zone together the array port and HBA port(s) previously selected. Note that an HBA port must be able to see an array port to access any Addressable Units through that array port.

The user may choose a soft zoning option to zone the array and HBA ports together based on their World Wide Names. This may be referred to as "WWN zoning" or "Name Server zoning." The user may choose a hard zoning option to zone the array and HBA ports together based on the switch ports to which they are connected. This may also be referred to as "switch port zoning." In one embodiment, the user may direct the LUN security utility to not perform a zoning operation. For example, the user may choose this option if there is an unzoned fabric wherein all storage devices are already visible to all hosts.

If the user is zoning together the array and HBA ports, the user may specify a zone name using the LUN security utility. The user may choose to use an existing zone or create a new zone as indicated at 308. In one embodiment, to add the selected array and HBA ports to an existing zone, the zone may be selected from a list of zones in the LUN security utility as indicated at 310. In one embodiment, to create a new zone that includes the selected array and HBA ports, the user may simply enter the name of the new zone in the LUN security utility as indicated at 312. When the configure LUN security operations are executed, the new zone may then be automatically created, and the array and HBA ports may be included in the new zone, by the SAN management system.

In one embodiment, the LUN security utility may then allow the user to review the operations the user has performed and return to previous operations if modifications are desired. When the user is finished and confirms the selections, the LUN security utility may perform the LUN security operations (binding, masking, zoning) as a single operation from the perspective of the user as indicated at 314.

In one embodiment, the SAN manager may allow the user to remove the binding between a LUN and a port of an array in the SAN. In one embodiment, if a LUN is already bound to an array port, the user may mask a host port to the LUN by launching the LUN security utility in-context from a security pane of the SAN manager. This allows the user to skip the LUN selection and binding portions of the LUN security utility. In one embodiment, the SAN manager may allow the user to remove LUN masking between a host port and an array LUN.

In one embodiment, for arrays that support user-configurable LUN binding, the SAN management system may provide an "Add LUN Binding" utility to bind LUNs without using the LUN security utility. In one embodiment, there may be a graphical user interface (e.g. a dialog box or window) to the "Add LUN Binding" utility in the SAN manager through which the user can bind LUNs.

In one embodiment, the SAN management system may provide a LUN masking utility that enables an administrator to mask LUNs to host ports without using LUN security utility. In one embodiment, there may be a graphical user interface (e.g. a dialog box or window) to the LUN masking utility in the SAN manager through which the user can mask LUNs. In one embodiment, the LUN masking utility may not provide the LUN security utility's safety features. For example, when the LUN masking utility is used to mask LUNs, the SAN management system may not check for valid LUN binding, wire connectivity, or fabric zoning between the host port and the array port.

LUN Query Tool

In one embodiment, the SAN management system may provide a LUN query tool, accessible, for example, from the SAN manager, that may be used to search for and find LUNs on the SAN that match one or more properties, such as device vendor, storage type, capacity, configuration, cost, and location. The LUN query tool may allow the user to further refine the search for LUNs based on the storage group(s) the LUNs are assigned to and/or on their accessibility from specified SAN-attached hosts 102. The LUN query tool may return a list of all LUNs that meets those requirements. The LUN query tool may be used, for example, when performing LUN security operations (e.g. binding, masking and zoning) and when allocating storage to the requester.

Figure 21:
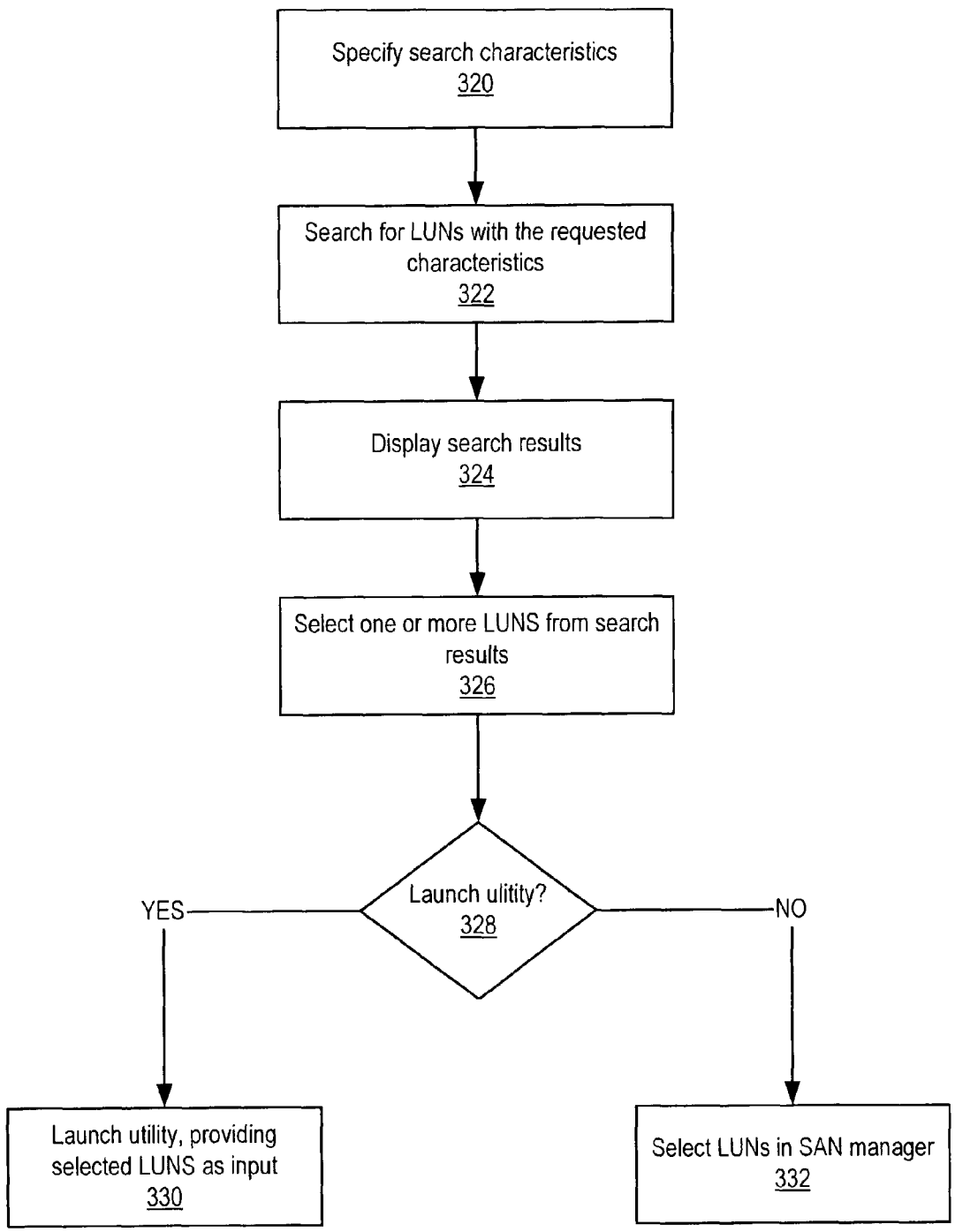
FIG. 21 is a flowchart illustrating a method of searching for LUNs using a LUN query tool according to one embodiment.

FIG. 21 is a flowchart illustrating a method of searching for LUNs using a LUN query tool that may be provided by the SAN management system (e.g. through the SAN manager) according to one embodiment. Using the LUN query tool, the user may specify search characteristics (e.g. device vendor, storage type, capacity, configuration, cost, location, and/or group) to be used for finding LUNs as indicated at 320. Once the characteristics are entered, the user may initiate the search for the LUNs. For example, in an exemplary LUN query tool user interface, the user may select a user interface item to initiate the search. The SAN management system may then perform the search as indicated at 322. As indicated at 324, the SAN management system may then provide results of the search to the user.

The user may then select a LUN or LUNs from the displayed results of the search to specify the LUN or LUNs as of interest as indicated at 326. As indicated at 328, in one embodiment, the user may choose to launch another SAN management system utility in-context, and the selected LUNs may be provided as input to the utility as indicated at 330. In one embodiment, selecting a LUN or LUNs in the list of search results (e.g. by right-clicking on the LUN or LUNs of interest) may display an in-context menu with one or more options that the user may choose from to launch a particular utility. These one or more options may include, but are not limited to, the LUN security utility, the zone utility, the group utility, a create attribute utility, and an edit attribute utility.

As indicated at 332, in one embodiment, if the user does not launch a utility, when exiting or closing the LUN query tool, selected LUNs in the LUN query tool may be selected in the SAN manager GUI (e.g., highlighted in a topology pane.)

In one embodiment, the LUN query tool may be launched in context from another utility such as the zone utility or the LUN security utility. In this case, when the LUN query tool is closed, any selected LUNs in the LUN query tool results window may be selected (e.g. highlighted) in the UI of the utility from which the LUN query tool was launched.

In one embodiment, after using the LUN Query Tool to generate a list of LUNs that match search criteria, the user may create or edit a LUN attribute and apply the new attribute value across multiple LUNs in-context from the LUN query tool.

Manually Creating Undiscoverable Objects

In one embodiment, the SAN management system may not discover or display certain SAN elements such as bridges, routers and hubs. In other cases, although a SAN element is not discoverable, the SAN management system may provide a mechanism for users to manually create an object in the SAN access layer data store from the SAN manager to represent that element. In one embodiment, the SAN manager may be used by the SAN administrator or other user to create objects including, but not limited to, storage enclosures, hosts and generic devices.

In one embodiment, the SAN management system may discover at least some storage enclosures automatically, but in some cases, the SAN management system may discover only the individual storage devices inside the enclosure. For enclosures that are not discoverable, the SAN management system may provide an enclosure utility that may be used to manually create a representation of an enclosure object in the SAN management server data store. In one embodiment, the enclosure utility may be provided through the SAN manager. Using the enclosure utility, the SAN administrator or other user may create an enclosure by specifying the type of enclosure and which devices are contained within it.

In one embodiment, if a host on the SAN is not running either the SAN management server or the SAN access layer remote, the SAN management system may discover only its HBA nodes, which may appear as unidentified adapters in the SAN manager. One embodiment may provide a host utility with which a user can create a host object to contain an unidentified adapter discovered on the SAN. The user may specify certain attributes (e.g. the host name, IP address, and any discovered HBA nodes that represent HBAs in the host) of the host, which the SAN management system adds to the data store.

In one embodiment, an unidentified node may belong to a SAN-attached device that is undiscoverable by the SAN management system. The SAN management system may provide a mechanism to create a device object to represent the physical device that contains the node.

In one embodiment, the SAN management system may not be able to completely discover a storage device on the SAN in some circumstances. This may occur, for example, when certain conditions are met. These conditions may include, but are not limited to:

- The switch name server does not provide enough information (i.e., a SCSI INQUIRY string) to determine whether a discovered adapter belongs to an HBA or a device. In some cases, this may be due to a limitation in the switch. In other cases, the device may not register a SCSI INQUIRY string when logging onto the fabric.
- No SAN management system host can see the object (for example, it may be zoned out of view of the hosts).
- The object's vendor (a discoverable attribute) may not be a known storage vendor.

In one embodiment, such a device may display in the SAN manager as an unidentified adapter. A "create device" feature may be provided through the SAN manager that allows the administrator or other user to identify an unidentified adapter node as a storage device so that it appears correctly in the SAN manager.

Undiscoverable Attributes

Not all information relevant to an object may be discoverable attributes of that object. Some details of an object may lie outside the ability to be discovered automatically (e.g. by the SAN access layer). When a particular detail is not discoverable, the SAN management system may provide a mechanism for a user to manually enter customized attributes for heterogeneous SAN objects. In one embodiment, this mechanism may be centrally provided by the SAN manager. In one embodiment, custom attributes may be added to SAN objects in a properties window or in the attributes pane. Custom attributes may include, but are not limited to, the physical to location of the object, the warranty date of the object, the date of purchase, the date of most recent service, and contact information for parties responsible for maintenance. Custom attributes may be added on a per object basis.

In one embodiment, information describing user-defined, non-discoverable objects and attributes may be stored in the SAN management server data store along with discoverable SAN information that may be frequently updated by the SAN management server engine. In one embodiment, the SAN management server may not independently discover user-defined objects or attributes, and thus the values may not be overwritten with more current SAN information. In this embodiment, user-defined objects and attributes may persist until the user manually alters or deletes them. In this embodiment, keeping time-sensitive, user-defined attributes current is a manual task to be performed by the SAN administrator.

SAN Visualization

Figure 22:
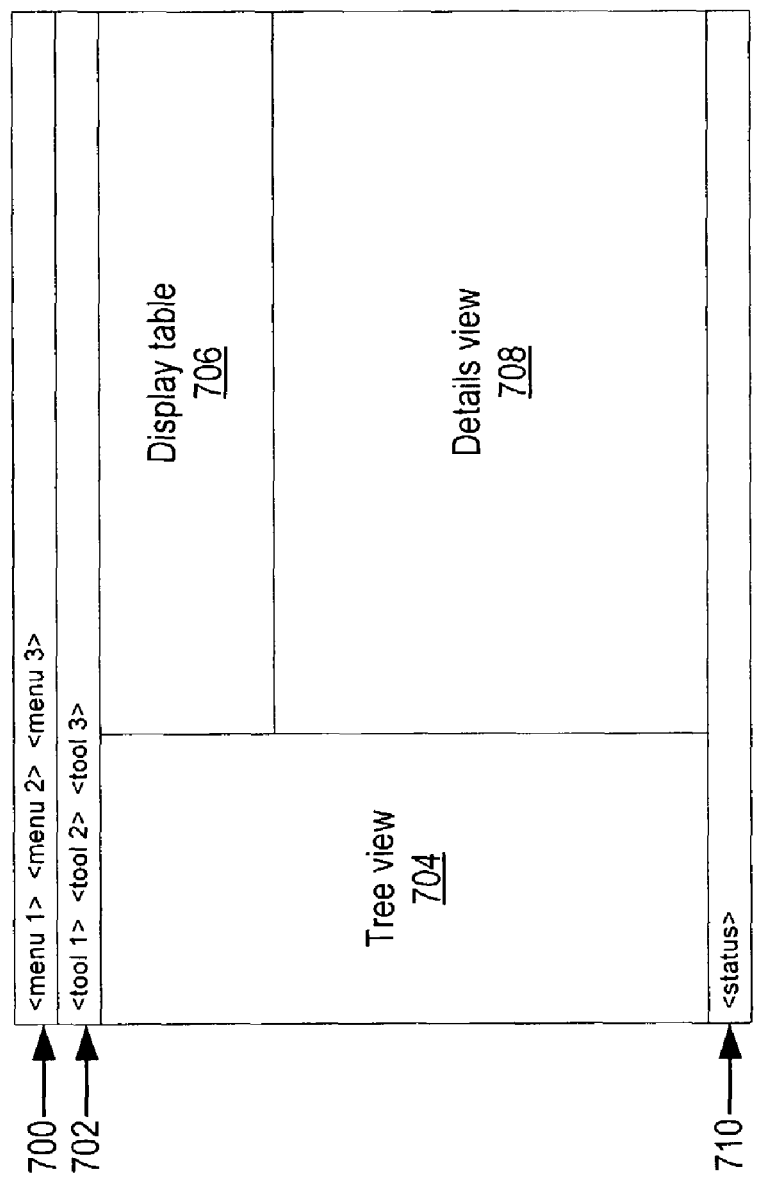
FIG. 22 illustrates an exemplary user interface of the SAN manager according to one embodiment.

In one embodiment of the SAN management system, the SAN manager may serve as a centralized point from which a SAN administrator or other user may view information about a SAN, including, but not limited to, information about the SAN's topology and heterogeneous components. In one embodiment, the SAN manager may provide a graphical user interface (GUI) that displays information from the SAN access layer and other SAN management server components. The SAN manager may provide this information in an intuitive, navigable form, and may provide a central point to view the SAN, create and modify policies, administer zoning, and launch third-party SAN management tools. FIG. 22 illustrates an exemplary user interface of the SAN manager according to one embodiment. The SAN manager's user interface may include one or more of, but is not limited to, a menu bar 700, a toolbar 702, one or more panes (704, 706, 708), and a status bar 710.

Embodiments of the SAN manager may provide display panes to display SAN information in complementary formats. Display panes may include, but are not limited to, a tree view 704, a display table 706, and a details view 708. The tree view 704 may include a directory tree of SAN objects. In one embodiment, an object selected in the tree view 704 may become active throughout the other areas of the SAN manager and may be highlighted in a topology map in details view 708. In one embodiment, object selection in the SAN manager may be unidirectional, moving from the tree view 704 to the other areas, so an object selected elsewhere in the SAN manager may not normally become active in the tree view 704. In one embodiment, the display table 706 functions as an extension of the tree view 704, and objects highlighted in the display table 706 may become active throughout the SAN manager.

Various tools and utilities provided by the SAN manager may be context-sensitive in the SAN manager GUI. For example, the user may locate and select an object in the tree view 704 and then open a tool or utility to manage the selected object. The selected object may be automatically displayed in the opened tool or utility as the object for which operations of the tool or utility are to be performed.

In one embodiment, the tree view 704 may provide optional views of the SAN, including, but not limited to, a fabrics view, a storage view, a hosts view, and a groups view. In one embodiment, each optional view may be accessed by selecting an associated tab at the bottom of the tree view 704, or optionally may be selected from a View menu. One of ordinary skill in the art will recognize that there are other methods for selecting the optional views through a user interface that may be implemented.

The fabrics view may give hierarchical priority to zones above individual devices and hosts. The fabrics view may display objects on the SAN according to the objects' membership in fabrics and zones. Each fabric on the SAN may have its own root directory in the tree. Unconnected device objects and host objects do not reside on any SAN fabric, and may appear in their own directories, for example at the bottom of the tree. The fabrics view may be used, for example, when administering zoning on the SAN. The fabrics view may allow the user to quickly locate a zone, view its member objects, and launch zone management utilities, if needed or desired.

Below each fabric in the fabrics view, the objects in the fabric may be categorized, for example as switches, unidentified adapters, unzoned objects, zone aliases, and zones. Unlike other object types, switches may not be classified as either zoned or unzoned, because the switches themselves control zoning on the SAN fabric. For that reason, switches may occupy their own branch of the directory tree under each fabric.

An unidentified adapter may represent either a host system or a storage device that is not fully discovered. A SAN object may not be fully discovered, for example, if the switch name server does not provide enough information to determine whether a discovered adapter belongs to an HBA or a device, no SAN management system host can see the object (for example, it may be zoned out of view of the host), and/or the object's vendor (a discoverable attribute) is not known to be a storage vendor. In one embodiment, the SAN management system may completely discover a host system on the fabric only if the SAN access layer remote is installed on the host. If the SAN access layer remote is not installed on the host, the SAN management system may discover only the adapter (HBA) that connects the host to the fabric. In one embodiment, using the host utility, the user may manually create a host object out of an unidentified adapter discovered on the fabric.

Objects that are not members of any zone on a SAN fabric may appear in the unzoned objects category of the fabric. In one embodiment, objects such as devices, hosts and switch ports may be shown on different branches.

In one embodiment, the tree view 704 may display zone aliases only for types of fabrics that support zone aliases. Beneath the zone aliases branch, the tree view 704 may display hosts, storage, switch ports and unidentified adapters sub-branches.

Objects that are members of at least one zone may appear in the zones category of a fabric. In one embodiment, zones on the fabric may be listed alphabetically. Beneath each zone, the zone's object members may be displayed by type, e.g. devices, hosts and switch ports.

The storage view may be used to view a list of SAN storage devices. The storage view may provide more granular information about SAN objects than the hierarchical fabrics view. The storage view may help the user to view storage device properties or zone memberships, and may be used in managing zone memberships. The list of unzoned storage devices may, for example, help the user to discover devices that may be added to a zone via the zone utility. In one embodiment, the storage view may include, but is not limited to, a list of devices on the SAN, a list of unconnected devices on the SAN, a list of unzoned storage devices on the SAN, and a list of zoned storage devices on the SAN. In one embodiment, the storage view may list all such devices that are known to the SAN management system.

The hosts view may be used, for example, to locate a particular host by name in order to view its properties or its zone memberships. The hosts view may provide more granular information about SAN objects than the hierarchical fabrics view. The hosts view may be used in managing zone memberships. The list of unzoned hosts may, for example, help the user to discover hosts that may be added to a zone via the zone utility. In one embodiment, the hosts view may include, but is not limited to, a list of hosts on the SAN, a list of unconnected hosts on the SAN, a list of unzoned hosts on the SAN, and a list of zoned hosts on the SAN. In one embodiment, the storage view may list all such devices that are known to the SAN management system.

In one embodiment, the SAN management system may support the creation of user-defined groups of SAN objects. A group may be defined as an arbitrary set of SAN elements defined by an administrator to help organize and provision resources. Groups may be used to represent the storage resources available to a particular host, sets of storage devices with similar quality of service attributes, or for generic organizational purposes. In one embodiment, the SAN management system may support one or more types of groups, including, but not limited to: generic groups, storage accounts, and storage groups. See the discussion of groups elsewhere in this document for more information.

In one embodiment, groups may be represented as directories including sub-branches for each type of member object. When a group is selected, all its member objects may be highlighted in a topology map in the details view 708. The groups view may be used, for example, to locate a particular group by name in order to view the storage devices, hosts, switches, or sub-groups included in that group. The groups view may provide a view of groups of SAN objects that meet certain user-defined criteria, such as cost, availability and other Quality of Storage Service (QoSS) properties. A group may represent the storage allocated to one or more hosts, or a set of storage devices with similar QoSS properties, or other functions definable by the administrator.

In one embodiment, the tree view may be the primary starting point for viewing and managing objects and their attributes, and thus it may be necessary or desired to locate an object in the tree view. In one embodiment, the SAN management system may provide a tree search tool that enables the user to locate SAN objects in the currently displayed tree. If the value of any attribute of an object is known, including its display name, then the tree search tool may be used to locate the object's listing in the tree view.

One embodiment of the SAN management system may provide a display table 706 through the SAN manager that complements the object information selected in the tree view by displaying the contents beneath a selected branch. The display table 706 may display information about the next layer of objects under the branch highlighted in the tree view 704. If the active branch has no leaf objects, the display table 706 may be empty. If the highlighted branch has no sub-branches, the display table 706 may display port information about the highlighted object. The types of details that appear in the display table 706 may depend on the type of object or meta-object (zones, object groups) selected in the tree view 704. If, for example, "fabrics" is selected in the fabrics view, the names of all fabrics in the SAN may be displayed in the display table 706. As another example, if a fabrics branch in the fabrics view is selected, then the switches, unzoned objects and zones sub-branches of the fabric may be displayed in the display table 706.

In one embodiment, a user may modify the column configuration and attribute combinations in the display table 706. One embodiment may provide a select table columns dialog box for modifying the column configuration of the display table 706. The types of details that appear in the display table 706 may be customized, for example, by choosing which columns to include in the table 706. In one embodiment, a column's heading may be dragged to the right or left across the other columns to rearrange the order of columns displayed.

One embodiment of the SAN management system may provide a details view 708 through the SAN manager. In one embodiment, the details view 708 may provide one or more panes (tabs), each of which provides a different form of information about the SAN. The type and number of panes available in the details view 708 may change depending on what type of object or group is selected in the tree view 704. These panes may include, but are not limited to, a topology pane, an attributes pane, a policies pane, an alerts pane, a connectivity pane, an OS handles pane, an HBAs pane, a security pane, a collectors pane, an events pane, and various other panes of detailed object information. In one embodiment, at least a topology pane, an attributes pane, a policies pane, and an alerts pane may be displayed for each type of object or group.

The topology pane may provide a graphical representation of the SAN in the form of a topology map. The topology map may provide a visual representation of not only the objects on the SAN, but also a visual representation of the connections between objects. The topology map may reveal the switch port to which each object is connected. In one to embodiment, connections displayed in an error color (e.g. red) indicate that a problem exists.

In one embodiment, there may be one or more user-selectable topology map layouts, including, but not limited to, a hierarchical layout, a circular layout, a network layout, and a fan layout. The topology layout may be a matter of visual preference; however, there may be underlying design assumptions in each layout that may influence when and why one layout is chosen instead of another.

In one embodiment, the hierarchical layout is the default layout. The hierarchical layout stratifies the topology map according to object type, with hosts at the top layer, switches below them, and devices of all kinds below the switches. The circular layout arranges the SAN objects in circular patterns that represent one or more objects connected to various ports on the switch. The circles of objects may not represent arbitrated loops on the SAN, however, and thus may not be used to get a list of objects that reside in an arbitrated loop. The network layout emphasizes the switches on the SAN by displaying them centrally among the various other objects to which they connect. The fan layout positions the switches at the top of the topology map and fans out all devices and hosts at a level below the switches in a symmetrical fashion.

In one embodiment, the user may select a connection or object in the topology map (e.g. by hovering the mouse cursor over the connection or object) to view detailed information about the connection or object. When a connection is selected, a "tool tip" may display the port at each end of the connection. When a host is selected, information about the host such as the host's name, IP address, OS version, the name of its HBA vendor, and machine type may be displayed. When a SAN storage device is selected, its properties may be shown.

In one embodiment, the topology pane may be configured to highlight objects that have active alerts associated with them. An alarm is a signal that is generated by the policy manager when a condition specified in a policy is detected or evaluated as true. The policy service may send an alert to the SAN manager as an action in response to a condition of a policy detected by the alarm service. When the topology pane is synchronized with alerts, highlighted objects may be color-coded or otherwise highlighted according to the severity of the alerts associated with the objects. In one embodiment, alert severity may be categorized, for example from high to low as Critical, Error, Warning, and Information. In one embodiment, a color may be associated with each level of severity, for example Critical=red, Error=orange, Warning=yellow, Information=blue. Note that fewer or more levels of severity may be used, and other names and colors may be associated with the various levels.

The SAN management system may provide one or more methods to view object attributes. One method is the attributes pane in the details view 708. The attributes pane may display detailed information about the object or directory currently selected in the tree view 704. Different object types may be associated with different sets of attributes.

The attributes pane may be available regardless of what object is selected in the tree view 704, but its contents may depend on the type of object selected. The attributes pane may display a table 720 that lists the attributes and attribute values associated with the type of object selected (in this example, a switch). For some selected objects, the attributes pane may display other tables 722, in this example a port data table when a switch is selected, and as another example a group objects table when a group is selected.

Although the connections between objects on the SAN may be displayed graphically in the topology pane of the details view 708, in one embodiment, a connectivity pane may present the information in a form that may be easier to read at a glance. As with the attributes pane, the connectivity pane may display information about objects that are highlighted in the tree view 704. The connectivity Pane may be displayed when objects of various types are selected in the tree view 704, including, but not limited to, switches, switch ports, enclosures, storage devices, LUNs, hosts, HBAs, and unidentified adapters.

In one embodiment, the connectivity pane may include one or more tables. One table 724 may display the physical connectivity of each port on the object. Another table 724 may display the object's zone memberships. For devices that cannot be zone members (e.g. switch, enclosures and LUNs), table 724 may not be displayed or alternatively may be empty.

In one embodiment, the details view 7080S (Operating System) handles pane may be displayed when a host, an HBA, a storage device that contains one or more LUNs, or an individual LUN is selected in the tree view 704 (or alternatively in other views or panes of the SAN manager). The OS handles pane may display the relationships between HBA ports and the LUNs that are accessible to the HBA ports (i.e., the LUNs that are masked to those HBA ports). If a host or HBA object is selected in the SAN manager, the OS handles pane may display the WWN of the HBA port, and other information about a device port and LUN associated with that HBA port. If a device or LUN is selected, the OS handles pane may display a device port, path, and LUN, the associated host and HBA port, and other information. A different set of information may display in the OS handles pane depending on the type of object currently selected in the SAN manager.

In one embodiment, the details view 708 may include an HBAs pane. In one embodiment, the details view 708 HBAs pane is displayed when a host object is selected in the tree view 704. The HBAs pane may display information about each HBA discovered in the host. The HBAs pane may include a field that displays the discovered attributes of the HBA. The HBAs pane may also include a field that displays information about each port on the HBA. If a host has multiple HBAs, the HBA to view may be selected in the selected HBA field in the pane. The number of attributes of an HBA that are displayed may depend on which SAN management system explorer(s) has discovered it. If the selected host is running the SAN access layer remote, then the host's HBAs may be discovered by the HBA Explorer, which may provide more information about the HBAs. If the host is not running the SAN access layer remote, then the host's HBAs may be discovered by the management explorer through its connection to the switch, and less information about the HBAs may be available.

In one embodiment, the details view 708 may include a security pane. The security pane may include one or more tables. In one embodiment, the security pane may include an array port binding table may display information including, but not limited to, the array LUN, the array port to which the LUN is bound, and the SCSI LUN ID. A single LUN may have multiple entries in this table if it is bound to more than one array port. Each entry in the table may represent a bound LUN-array port pair.

In one embodiment, the details view 708 security pane may be displayed when certain enclosure objects are selected in the tree view 704. In one embodiment, the selected enclosure may be a storage array whose LUN security features the SAN management system supports. The security pane may display LUN security and LUN binding information about LUNs in the enclosure, including, but not limited to, the array LUN, the SCSI LUN ID, the array port to which the LUN is bound, the host(s) that are and the World Wide Names of the HBA ports that are masked to the LUN. If an array is selected in the tree view 704, the array's LUNs that are bound to array ports may be displayed in the security pane. In one embodiment, if an unbound LUN is selected in the tree view 704, no information appears in the security pane.

In one embodiment, the security pane may include an LUN masking table that may be context-sensitive to selections in the array port binding table. The LUN masking table may display information about LUN-array port pairs selected in the array port binding table including, but not limited to, the hosts masked to the LUN, the World Wide Names of the HBA nodes masked to the LUN, and the World Wide Names of the HBA ports masked to the LUN.

In one embodiment, only LUNs that are bound to an array port appear in the security pane. If the free LUNs branch under the enclosure object is selected, then the security pane may display only LUNs that are bound to an array port and that have not yet been masked to any HBA. If an individual LUN in the enclosure is selected that is not bound to an array port, no information may appear in the security pane.

LUN security operations such as binding, masking and zoning may be performed using the LUN security utility. In one embodiment, the LUN security utility may be launched in-context from the security pane. In one embodiment, if a LUN is already bound to an array port, the user may mask a host port to the LUN by launching the LUN security utility in-context from a security pane of the SAN manager. This allows the user to skip the LUN selection and binding portions of the LUN security utility. When the user completes security operations, LUN security operations performed using the LUN security utility may be reflected in the securities pane.

In one embodiment, the details view 708 may include a policies pane. Policy-based management provided by the SAN management system enables the monitoring of conditions on a SAN and may facilitate quick response when problems occur. In one embodiment, the SAN management system may include a policy service that manages policies that are associated with objects on the SAN. Policies may be viewed as rules that may be used to help manage a SAN by automating responses to certain events and conditions. Policies may detect when something goes wrong, and may be used to anticipate and handle problems before they occur. A policy may include a condition to monitor, such as a high percentage of bandwidth utilization on a switch port, and a set of actions to take when that condition is met, such as raising alerts on the SAN manger user interface, sending e-mail, triggering SNMP traps, and/or invoking commands and/or scripts. In one embodiment, the policy service may be integrated with the SAN manager, permitting users to view what policies are in effect on their SAN, to define and modify policies, and to generate inventory and performance reports based on the conditions monitored by the policy service.

In one embodiment, the policies pane may display policies available in the SAN management system, including predetermined policies and user-created policies. In one embodiment, the policies pane may be configured to display all policies defined on the SAN management server, or only policies that apply to the object currently selected in the tree view. The policies pane may display information about each policy, including, but not limited to, the name of the policy, the set of objects to which the policy applies, and the policy's status as enabled or disabled. In one embodiment, additional information about a policy may be displayed, for example in a policy details dialog box, including, but not limited to, the type of policy, the trigger condition for the policy, the reset condition for the policy, and the actions to be executed when the trigger condition is met. For more information on policies and the policy service, see the descriptions of policies and the policy service above.

In one embodiment, the SAN manager may include a policy utility that may be launched in-context from the policies pane to facilitate policy creation and maintenance. The policy utility may lead a user through the steps of creating or modifying a policy as described previously in this document. When the user completes policy utility operations, policy changes performed using the policy utility may be reflected in the policies pane.

In one embodiment, the details view 708 may include a collectors pane that may display the collectors that apply to the object currently selected, for example, in the tree view 704. The SAN management system may manage a SAN by monitoring SAN devices and enforcing predefined actions should any device fail to operate within the defined boundaries. In one embodiment, to enable this level of policy management, the SAN management system may include collectors. A collector may be a path or channel through which the SAN management system gathers a specific type of data for a specific object type. There may be one or more types of collectors, for example collectors for object availability, collectors for environmental conditions, collectors for device errors, and collectors for SAN traffic. Collectors may monitor properties such as switch port status, dropped frames, disk temperature, link failures and so on, which may be evaluated by the policy service to create an accurate composite status of the SAN. In one embodiment, the status of devices may be displayed on a topology map of a SAN manager user interface, for example using color-coded icons. For more information on collectors, see the description of collectors above.

The collectors pane may display information about each collector including, but not limited to, the name of the collector, the current value of the collector, the units of measurement that the collector value represents, and whether the collector has collected any data about the object. In one embodiment, additional information about a collector may be displayed, for example through various options in a context-sensitive menu that appears when a collector in the collectors pane is selected. This additional information may include one or more of, but is not limited to:

- Textual State—Available for collectors whose values are textual states. When selected, all the possible textual states for the selected collector may be displayed, for example in a dialog box.
- Graph—Available for collectors whose values are numeric. When selected, a real-time graph of the numeric value of the selected collector may be displayed, for example in a dialog box.
- Refresh—Refreshes the value and status information for all collectors in the collectors Pane.
- Show Policies—When selected, the policies that monitor the value of the selected collector may be displayed, for example in a dialog box. In one embodiment, the display may be configured to show all policies based on the collector, or optionally the subset of those policies that apply to the object selected in the tree view.
- Configure Logging—When selected, a user interface item (e.g. a dialog box) is displayed that allows the user to configure the frequency of log updates from that collector.

In one embodiment, the details view 708 may include an alerts pane that may display alerts sent to the SAN manager in response to events on the SAN. The policy service may send alerts to the SAN manager when certain policy conditions are met, along with other possible actions. Each alert in the alerts pane may represent a SAN event that has met either the trigger condition or the reset condition of an active policy. The alerts pane may display information about each alert including, but not limited to, the priority level of the alert, the date and time the alert was sent to the SAN manager, the description of the alert, usually including information about the trigger event, and the object at which the event occurred.

In one embodiment, additional information about a policy may be displayed, for example in an alert details dialog box. This additional information may include, but is not limited to, the name of the policy that sent the alert, the trigger condition for the policy, the reset condition for the policy, and the actions to be executed by the policy.

In one embodiment, the details view 708 may include an events pane. The SAN access layer may provide notification to the SAN manager of SAN events such as the addition or deletion of SAN components such as SAN fabrics, switches and arrays. In one embodiment, an events pane may be provided that may display notifications of fabric events detected by the SAN access layer. These events may not be identical to the conditions monitored by the policy service, although the two may overlap to some extent. At least some events that appear in the events pane may be generated by changes in the discovery state of objects on the fabric, for example, when the SAN management server explorers no longer detect a previously discovered object. The events pane may be used, for example, as a debugging or troubleshooting tool. The events pane may display information about each event including, but not limited to, the object(s) on the fabric to which the event applies, the type of event, the time the event occurred, and the message associated with the event.

A large SAN including many devices may be difficult to represent legibly within the space allotted to the topology pane. One embodiment may include an overview window that may be panned across the topology map to zoom in on particular objects or connections. The overview window may display a miniature image of the entire SAN topology in whichever layout is currently selected. The overview window may provide a convenient and intuitive means of navigating a SAN's topology pane, and may be used, for example, when a user needs to find and view one or more small areas of a large SAN in one session.

Data Logging and Reporting

In one embodiment, the SAN management system may include a SAN reporter that enables the user to see reports on the details of the SAN. Embodiments of the SAN management system may provide both real-time and historical performance data for critical service-level parameters such as connectivity, available space and throughput. In one embodiment, the SAN management server may collect SAN data (gathered by the collectors) that may be provided as real-time and/or historical performance data to the SAN reporter for use in generating real-time and/or historical SAN performance reports. In one embodiment, the SAN access layer may discover SAN objects and information about the discovered objects that may be provided to the SAN reporter and used, for example, in SAN inventory and performance reports. Reports may be generated on various types of SAN objects, including, but not limited to, fabrics, devices, hosts, switches, HBAs and groups.

Figure 23:
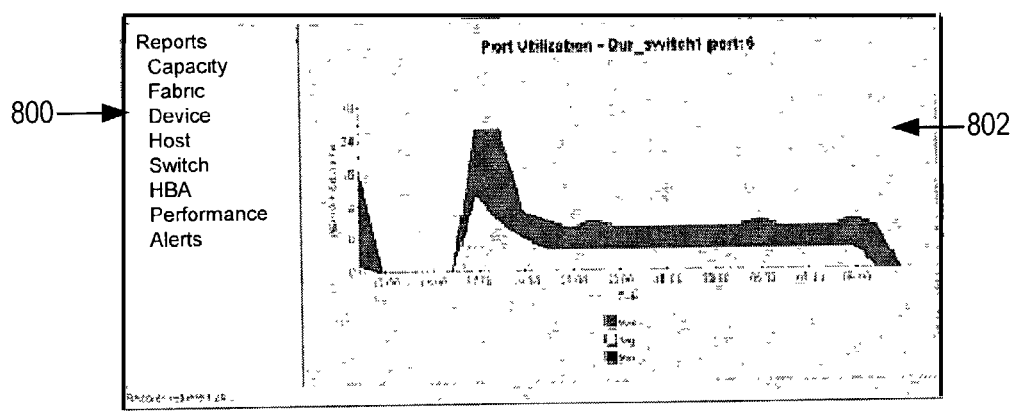
FIG. 23 illustrates an exemplary interface of the SAN reporter according to one embodiment.

In one embodiment of the SAN management system, the SAN manager may serve as a centralized point from which a SAN administrator or other user may generate reports on details of a SAN, including, but not limited to, information about the SAN's topology and heterogeneous components. In one embodiment, the SAN reporter may be launched from the SAN manager. FIG. 23 illustrates an exemplary interface of the SAN reporter according to one embodiment. In this example, the reporter window may include a reports tree 800 and a report pane 802. The reports tree 800 lists reports that are available in the SAN management system. Some reports that are launched in-context from other reports may not appear in the reports tree 800. The report pane 802 displays the report currently selected in the reports tree 800 in either graphical or tabular form, depending on the type of report.

At least some information used to generate reports may be gathered by the same collectors that the policy service uses to monitor conditions on the SAN. In particular, performance reports may be based on historical collector data. In one embodiment, collectors may be configured with numeric threshold data types to periodically log their values (e.g. on an hourly or daily basis), and the SAN reporter then may use these logs to generate graphical reports that display the collector values over a specified timeframe.

In one embodiment, the SAN reporter does not read the real-time data stream of collector values. Instead, it uses historical collector values logged to a database by the SAN management system. The values in the database may include, but are not limited to, the minimum, maximum and average values of each collector over the logging period set for the collector. The SAN reporter may use this data to generate historical reports on SAN performance over a specified period.

Performance reports may depend on data gathered through particular collectors. In order to run a performance report, the associated collector logs its data to the database. A collector may be configured to log its data periodically, e.g. on multiples of seconds, minutes, hours or days. In one embodiment, when a collector logs its data to the database, it may not log all the values returned during that period, but may log only the minimum, maximum and average values for that hour or day. In one embodiment, the length of time the database retains collector data and alerts may be configurable. For example, the data retention may be shortened to reduce the size of the database and/or improve database performance. As another example, the data retention duration may be lengthened to extend the scope of historical reports.

In one embodiment, reports may fall into one of one or more categories including, but not limited to, capacity reports, inventory reports, performance reports and alert reports.

Capacity reports may display the storage capacity of the SAN as a whole and/or by subdivisions. Some of the subdivisions may include, for example, the amount of storage available from a particular vendor's arrays, the amount of storage allocated to hosts running different OS platforms, and the amount of storage contained in a user-defined group. Capacity reports may display various information about storage on the SAN, for example the amount of storage that is allocated versus the amount that is unallocated, the amount that consists of JBODs (Just a Bunch Of Disks, used to refer to disks that are not configured according to RAID) and generic devices versus the amount that consists of storage arrays from different vendors, etc.

Inventory reports may display physical objects and/or user-created objects such as groups and zones on the SAN. Inventory reports may be based on information from the SAN access layer data store that resides on the SAN management server host. Inventory reports may display summary information (e.g. in tabular form) about different categories of objects on the SAN. For example, an inventory report on switch ports may display a table with columns that include information on the port configuration, GBIC (gigabit interface converter) type, World Wide Name, and online/offline status for each switch port found on the SAN.

Performance reports may be based on the same collector information that is monitored by the policy engine. Performance reports may display the value of various collectors over a specified period (e.g. in graphical form). For example, a performance report on bandwidth utilization for a certain switch port may display a graph of the percentage of utilization based on the value of collector data gathered during a specified period. In one embodiment, in order to generate complete performance reports based on the data from a certain collector, logging must be turned on for that collector at least for the period for which the reports are to be generated. Performance reports may show historical collector values for switch ports on the SAN. Performance reports may be based on the collector data for a single port, so the user may select a particular switch port from a drop-down list to have the report display performance data for that port. In one embodiment, performance reports may include traffic reports, error reports, summary reports and detail reports.

Alert reports may provide information on historical alerts for a period covered by the report and summaries of the most active types of alerts during that period. In one embodiment, historical alert reports may be displayed in tabular form, while alert summary reports may be displayed in graphical form. Alert reports may show historical alert data for the entire SAN. One embodiment may provide a historical alerts report that displays all alerts within the specified timeframe. Alert summary reports may display the most frequently occurring types of alerts (such as "Port is offline") over a specified period. One embodiment may provide summary reports for different levels of alert severity: (e.g. Critical, Warning, Error, and Information).

In one embodiment, the SAN management system may include "out-of-the-box" or predefined reports that allow users to inventory and analyze their SANs. Users may modify these reports, for example to change time intervals and dates. Inventory reports may be provided for fabrics, devices, hosts, switches, HBAs and groups. Capacity reports may be provided for hosts, devices and groups. Performance reports may be based on the same collector information that is monitored by the policy service. Some examples of provided performance reports are Port Throughput, Port Utilization, Total Frames Transmitted, Total Frames Received, and CRC Errors.

SAN management system reports may use a database to which SAN data collected by the alarm service is logged. In one embodiment, the database may be an embedded, ODBC-compliant, relational database. Optionally, the data may be exported for warehousing and customer report writing using a third-party reporting tool.

The following are examples of reports that may be provided by the SAN management system or implemented by users of the SAN management system:

Total Storage Summary Report—Includes graphical reports that provide summary information about the storage capacity in the SAN.

Allocated Storage Host Summary Report—Provides summary information depicting the manner in which the allocated storage is being accessed by hosts in the SAN.

Total Storage Detail Report—Provides information about each storage address unit in the SAN, such as address unit name, host accessing the address unit, address unit capacity, and vendor name.

Fabric Overview—Provides information about fabrics, such as name, World Wide Name (WWN), switch count, zone count, and device count.

Fabric Zones—Provides information about fabric zones, such as name, fabric name, number of devices, number of hosts, and number of switch ports.

Device Overview—Provides information about SAN devices, such as total number of devices, number of zoned storage devices, and number of unzoned storage devices.

Device Zone—Provides information about SAN devices, such as device name (as it displays in the SAN manager), WWN, whether the device is zoned, zone name the device is a member of (if any), and switch port associated with the device (if any).

Device Properties—Provides information about SAN devices, such as device name, enclosure, device type, vendor, capacity, LUNs.

Host Overview—Provides information about hosts, such as total number of hosts, number of zoned hosts, and number of hosts not zoned.

Host Allocation—Provides information about hosts, such as host display name, storage capacity, and number of LUNs.

Switch Hardware—Provides information about switches, such as switch name, vendor, model, firmware version, and number of ports on the switch.

Switch Fabric—Provides information about switches, such as switch name, fabric name, active port count, switch role, and switch status.

Switch Port—Provides information about switches, such as switch name, port number, port state, port type, GBIC type, and WWN.

Switch Port Connections—Provides information about switches, such as switch name, port number, connected to, and switch state.

HBA Hardware—Provides information about host bus adapters (HBAs), such as HBA name, HBA vendor name, and version of driver running on the HBA.

Groups Inventory—Provides information about one or more SAN groups, such as group name, description, total storage capacity, number of hosts, number of devices, number of switches, and number of nested groups.

Performance Reports—Includes reports based on information that is logged from collectors.

Historical Alerts Reports—Reports that provide an alert history that may include alert information such as description, time, and severity.

Alert Summary Reports—Graphical reports that display summaries of alerts that occurred on your SAN over a specified time. In one embodiment, there may be a separate report for each severity level (e.g. Information, Error, Warning and Critical).

CONCLUSION

Various embodiments may further include receiving, sending or storing instructions and/or data implemented in accordance with the foregoing description upon a computer-accessible carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
a plurality of heterogeneous SAN components coupled to a SAN fabric;
a SAN management server configured to:
obtain data from each of the plurality of SAN components for managing each of the plurality of SAN components, wherein the data from each of the SAN components conforms to a data model of the particular SAN component;
convert the data from the one or more data models of the SAN components into canonical data conforming to a common data model of the SAN management server; and manage the heterogeneous SAN components using the canonical data, wherein said managing the heterogeneous SAN components comprises modifying at least one attribute of the heterogeneous SAN components; wherein to manage one of the heterogeneous SAN components, the SAN management server is configured to:

modify a portion of the canonical data for a particular one of the plurality of heterogeneous SAN components;

convert the portion of the canonical data from the common data model into a portion of data conforming to the data model of the particular SAN component; and send the portion of data to the particular SAN component to modify one or more attributes of the SAN component.

2. The SAN as recited in claim 1, further comprising:

a data store comprising a rules file comprising rules for converting the data from each of the plurality of SAN components to the common data model;

wherein the SAN management server is configured to convert the data from the one or more data models of the SAN components into the canonical data conforming to the common data model according to the rules from the rules file.

3. The SAN as recited in claim 2, wherein the rules file is editable to include rules for converting data conforming to different data models of additional SAN components to the common data model.

4. The SAN as recited in claim 1, further comprising a data store, wherein the SAN management server is further configured to store the canonical data to the data store.

5. The SAN as recited in claim 4, further comprising a SAN manager client, wherein the SAN manager client is configured to:

access a portion of the canonical data from the data store; and display data corresponding to one or more of the SAN components from the portion of the canonical data.

6. The SAN as recited in claim 1, further comprising a SAN manager client, wherein the SAN manager client is configured to:

obtain a portion of the canonical data from the SAN management server; and display data corresponding to one or more of the SAN components from the portion of the canonical data.

7. The SAN as recited in claim 1, wherein the SAN management server comprises:

a plurality of explorers, wherein each explorer is configured to communicate with one or more of the SAN components to obtain data from the one or more SAN components conforming to one or more data models of the one or more SAN components; and wherein the SAN management server is further configured to obtain the data corresponding to the one or more SAN components from the explorers.

8. The SAN as recited in claim 1, wherein the SAN management server comprises a plurality of explorers, wherein the explorers are configured to:

obtain the data from each of the plurality of SAN components; and convert the data from the one or more data models of the SAN components into canonical data conforming to a common data model of the SAN management server.

9. The SAN as recited in claim 1, wherein the SAN management server is further configured to use eXtensible Markup Language (XML) for data representation in the canonical data.

10. The SAN as recited in claim 1, wherein the SAN management server is further configured to discover the SAN components coupled to the SAN fabric, and wherein the data obtained from the SAN components comprises discovery data.

11. The SAN as recited in claim 1, wherein the SAN management server is further configured to obtain the data from the SAN components over the SAN fabric.

12. The SAN as recited in claim 1, wherein the SAN management server is further configured to obtain the data from the SAN components over a network separate from the SAN fabric.

13. The SAN as recited in claim 1, wherein the SAN management server is further configured to:

obtain a portion of the data from the SAN components over the SAN fabric; and obtain another portion of the data from the SAN components over a network separate from the SAN fabric.

14. The SAN as recited in claim 1, wherein, to convert the data from the one or more data models of the SAN components into canonical data, the SAN management server is further configured to convert the data from each of the plurality of SAN components into data objects conforming to the common data model, wherein each data object comprises information about a corresponding one of the heterogeneous SAN components.

15. A system, comprising:

a data store; and a storage area network (SAN) management server configured to:

obtain management data from each of a plurality of heterogeneous SAN components coupled to a SAN fabric for managing each of the plurality of SAN components, wherein the management data from each of the SAN components conforms to a data management model of the particular SAN component;

convert the management data from the one or more data management models of the SAN components into canonical management data conforming to a common data management model of the SAN management server;

store the canonical management data to the data store; and manage the plurality of heterogeneous SAN components using the canonical management data, wherein said managing the heterogeneous SAN components comprises modifying at least one attribute of the heterogeneous SAN components; wherein to manage one of the heterogeneous SAN components, the SAN management server is configured to:

modify a portion of the canonical data for a particular one of the plurality of heterogeneous SAN components;

convert the portion of the canonical data from the common data model into a portion of data conforming to the data model of the particular SAN component; and send the portion of data to the particular SAN component to modify one or more attributes of the SAN component.

16. The system as recited in claim 15,
wherein the data store comprises a rules file comprising rules for converting the management data from each of the plurality of SAN components to the common data management model; and
wherein the SAN management server is configured to convert the management data from the one or more data management models of the SAN components into the canonical management data conforming to the common data management model according to the rules from the rules file.

17. The system as recited in claim 16, wherein the rules file is editable to include rules for converting management data conforming to different data management models of additional SAN components to the common data management model.

18. The system as recited in claim 15, further comprising a SAN manager client, wherein the SAN manager client is configured to:
access a portion of the canonical management data from the data store; and
display management data corresponding to one or more of the SAN components from the portion of the canonical management data.

19. The system as recited in claim 15, further comprising a SAN manager client, wherein the SAN manager client is configured to:
obtain a portion of the canonical management data from the SAN management server; and
display management data corresponding to one or more of the SAN components from the portion of the canonical management data.

20. The system as recited in claim 15, wherein the SAN management server comprises:
a plurality of explorers, wherein each explorer is configured to communicate with one or more of the SAN components to obtain management data from the one or more SAN components conforming to one or more data management models of the one or more SAN components; and
wherein the SAN management server is further configured to obtain the management data corresponding to the one or more SAN components from the explorers.

21. The system as recited in claim 15, wherein the SAN management server comprises a plurality of explorers, wherein the explorers are configured to:
obtain the management data from each of the plurality of SAN components; and
convert the management data from the one or more data management models of the SAN components into canonical management data conforming to a common data management model of the SAN management server.

22. The system as recited in claim 15, wherein the SAN management server is configured to use eXtensible Markup Language (XML) for data representation in the canonical management data.

23. The system as recited in claim 15, wherein the SAN management server is further configured to discover the SAN components coupled to the SAN fabric, and wherein the management data obtained from the SAN components comprises discovery data.

24. The system as recited in claim 15, wherein the SAN management server is further configured to obtain the management data from the SAN components over the SAN fabric.

25. The system as recited in claim 15, wherein the SAN management server is further configured to obtain the management data from the SAN components over a network separate from the SAN fabric.

26. The system as recited in claim 15, wherein the SAN management server is further configured to:
obtain a portion of the management data from the SAN components over the SAN fabric; and
obtain another portion of the management data from the SAN components over a network separate from the SAN fabric.

27. The system as recited in claim 15, wherein, to convert the management data from the one or more data management models of the SAN components into canonical management data, the SAN management server is further configured to convert the management data from each of the plurality of SAN components into data objects conforming to the common data management model, wherein each data object comprises information about a corresponding one of the heterogeneous SAN components.

28. A method, comprising:
obtaining management data from each of a plurality of heterogeneous SAN components coupled to a SAN fabric for managing each of the plurality of SAN components, wherein the management data from each of the SAN components conforms to a data management model of the particular SAN component;
converting the management data from the one or more data management models of the SAN components into canonical management data conforming to a common data management model;
storing the canonical management data to a data store; and
managing the plurality of heterogeneous SAN components using the canonical management data, wherein said managing the heterogeneous SAN components comprises modifying at least one attribute of the heterogeneous SAN components, wherein said modifying at least one attribute of the heterogeneous SAN components comprises:
modifying a portion of the canonical data for a particular one of the plurality of heterogeneous SAN components;
converting the portion of the canonical data from the common data model into a portion of data conforming to the data model of the particular SAN component; and
sending the portion of data to the particular SAN component to modify one or more attributes of the SAN component.

29. The method as recited in claim 28, wherein said obtaining, said converting and said storing are performed by a SAN management server.

30. The method as recited in claim 28, further comprising:
accessing a rules file comprising rules for converting the management data from each of the plurality of SAN components to the common data management model; and
converting the management data from the one or more data management models of the SAN components into the canonical management data conforming to the common data management model according to the rules from the rules file.

31. The method as recited in claim 30, further comprising editing the rules file to include rules for converting management data conforming to different data management models of additional SAN components to the common data management model.

32. The method as recited in claim 28, further comprising:
accessing a portion of the canonical management data from the data store; and
displaying management data corresponding to one or more of the SAN components from the portion of the canonical management data.

33. The method as recited in claim 28, wherein said obtaining, said converting, and said storing are performed by a SAN management server, the method further comprising:
a SAN manager client of the SAN management server obtaining a portion of the canonical management data from the SAN management server; and
the SAN manager client displaying management data corresponding to one or more of the SAN components from the portion of the canonical management data.

34. The method as recited in claim 28,
wherein said obtaining comprises:
one or more explorers each obtaining a different portion of the management data from one or more of the SAN components conforming to one or more data management models of the one or more SAN components; and
the one or more explorers each providing the different portion of the management data obtained by the particular explorer to a SAN management server;
wherein the SAN management server performs said converting and said storing.

35. The method as recited in claim 28, wherein said obtaining and said converting are performed by one or more explorers, wherein each explorer is configured to communicate with one or more of the SAN components to obtain management data from the one or more SAN components conforming to one or more data management models of the one or more SAN components.

36. The method as recited in claim 28, wherein eXtensible Markup Language (XML) is used for data representation in the canonical management data.

37. The method as recited in claim 28, further comprising discovering the SAN components coupled to the SAN fabric, wherein the management data obtained from the SAN components comprises discovery data.

38. The method as recited in claim 28, further comprising obtaining the management data from the SAN components over the SAN fabric.

39. The method as recited in claim 28, further comprising obtaining the management data from the SAN components over a network separate from the SAN fabric.

40. The method as recited in claim 28, further comprising:
obtaining a portion of the management data from the SAN components over the SAN fabric; and
obtaining another portion of the management data from the SAN components over a network separate from the SAN fabric.

41. The method as recited in claim 28, wherein converting the management data from the one or more data management models of the SAN components into canonical management data comprises converting the management data from each of the plurality of SAN components into data objects conforming to the common data management model, wherein each data object comprises information about a corresponding one of the heterogeneous SAN components.

42. A non-transitory computer-accessible medium comprising program instructions, wherein the program instructions are configured to implement: obtaining management data from each of a plurality of heterogeneous SAN components coupled to a SAN fabric for managing each of the plurality of SAN components, wherein the management data from each of the SAN components conforms to a data management model of the particular SAN component; converting the management data from the one or more data management models of the SAN components into canonical management data conforming to a common data management model; storing the canonical management data to a data store; and managing the plurality of heterogeneous SAN components using the canonical management data, wherein said managing the heterogeneous SAN components comprises modifying at least one attribute of the heterogeneous SAN components, wherein said modifying at least one attribute of the heterogeneous SAN components comprises: modifying a portion of the canonical data for a particular one of the plurality of heterogeneous SAN components; converting the portion of the canonical data from the common data model into a portion of data conforming to the data model of the particular SAN component; and sending the portion of data to the particular SAN component to modify one or more attributes of the SAN component.

43. The computer-accessible medium as recited in claim 42, wherein said obtaining, said converting and said storing are performed by a SAN management server.

44. The computer-accessible medium as recited in claim 42, wherein the program instructions are further configured to implement:
accessing a rules file comprising rules for converting the management data from each of the plurality of SAN components to the common data management model; and
converting the management data from the one or more data management models of the SAN components into the canonical management data conforming to the common data management model according to the rules from the rules file.

45. The computer-accessible medium as recited in claim 44, wherein the program instructions are further configured to implement editing the rules file to include rules for converting management data conforming to different data management models of additional SAN components to the common data management model.

46. The computer-accessible medium as recited in claim 42, wherein the program instructions are further configured to implement:
accessing a portion of the canonical management data from the data store; and
displaying management data corresponding to one or more of the SAN components from the portion of the canonical management data.

47. The computer-accessible medium as recited in claim 42, wherein said obtaining, said converting, and said storing are performed by a SAN management server, and wherein the program instructions are further configured to implement:
a SAN manager client of the SAN management server obtaining a portion of the canonical management data from the SAN management server; and
the SAN manager client displaying management data corresponding to one or more of the SAN components from the portion of the canonical management data.

48. The computer-accessible medium as recited in claim 42, wherein, in said obtaining, the program instructions are further configured to implement:
one or more explorers each obtaining a different portion of the management data from one or more of the SAN components conforming to one or more data management models of the one or more SAN components; and
the one or more explorers each providing the different portion of the management data obtained by the particular explorer to a SAN management server;
wherein the SAN management server performs said converting and said storing.

49. The computer-accessible medium as recited in claim 42, wherein said obtaining and said converting are performed by one or more explorers, wherein the program instructions are further configured to implement each explorer communicating with one or more of the SAN components to obtain management data from the one or more SAN components conforming to one or more data management models of the one or more SAN components.

50. The computer-accessible medium as recited in claim 42, wherein eXtensible Markup Language (XML) is used for data representation in the canonical management data.

51. The computer-accessible medium as recited in claim 42, wherein the program instructions are further configured to implement discovering the SAN components coupled to the SAN fabric, wherein the management data obtained from the SAN components comprises discovery data.

52. The computer-accessible medium as recited in claim 42, wherein the program instructions are further configured to implement obtaining the management data from the SAN components over the SAN fabric.

53. The computer-accessible medium as recited in claim 42, wherein the program instructions are further configured to implement obtaining the management data from the SAN components over a network separate from the SAN fabric.

54. The computer-accessible medium as recited in claim 42, wherein the program instructions are further configured to implement:
   obtaining a portion of the management data from the SAN components over the SAN fabric; and
   obtaining another portion of the management data from the SAN components over a network separate from the SAN fabric.

55. The computer-accessible medium as recited in claim 42, wherein, in converting the management data from the one or more data management models of the SAN components into canonical management data, the program instructions are further configured to implement converting the management data from each of the plurality of SAN components into data objects conforming to the common data management model, wherein each data object comprises information about a corresponding one of the heterogeneous SAN components.

* * * * *